US012600331B2

(12) United States Patent　　(10) Patent No.:　US 12,600,331 B2
Eisenberger et al.　　　　　　　(45) **Date of Patent:　*Apr. 14, 2026**

(54) CENTRAL ELECTRO-PNEUMATIC PRESSURE CONTROL MODULE IMPLEMENTED AS A COMPONENT AND HAVING AN INTEGRATED CENTRAL BRAKE CONTROL DEVICE

(71) Applicant: KNORR-BREMSE Systeme fuer Nutzfahrzeuge GmbH, Munich (DE)

(72) Inventors: Andreas Eisenberger, Nuertingen (DE); Michael Herges, Munich (DE); Juergen Steinberger, Groebenzell (DE); Christoph Huber, Munich (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 1222 days.

This patent is subject to a terminal disclaimer.

(21) Appl. No.: 17/280,915

(22) PCT Filed: Sep. 16, 2019

(86) PCT No.: PCT/EP2019/074612
§ 371 (c)(1),
(2) Date: Mar. 28, 2021

(87) PCT Pub. No.: WO2020/064378
PCT Pub. Date: Apr. 2, 2020

(65) Prior Publication Data
US 2021/0339722 A1　　Nov. 4, 2021

(30) Foreign Application Priority Data

Sep. 28, 2018　(DE) ..................... 10 2018 123 996.3

(51) Int. Cl.
*B60T 8/26*　　(2006.01)
*B60T 8/17*　　(2006.01)
(Continued)

(52) U.S. Cl.
CPC .............. *B60T 8/26* (2013.01); *B60T 8/1701* (2013.01); *B60T 8/94* (2013.01); *B60T 13/36* (2013.01);
(Continued)

(58) Field of Classification Search
CPC ......................... B60T 2240/00; B60T 2260/09
See application file for complete search history.

(56) References Cited

U.S. PATENT DOCUMENTS 9,022,350 B2　　5/2015　Jung
11,866,015 B2 *　1/2024　Eisenberger .......... B60T 13/683
(Continued)

FOREIGN PATENT DOCUMENTS

CN　　104487298 A　　4/2015
CN　　106103219 A　　11/2016
(Continued)

OTHER PUBLICATIONS

International Search Report for PCT/EP2019/074612 Issued Dec. 17, 2019.
(Continued)

*Primary Examiner* — Melody M Burch
(74) *Attorney, Agent, or Firm* — NORTON ROSE FULBRIGHT US LLP

(57) ABSTRACT

An electro-pneumatic central pressure control module, having at least two channels, implemented as a structural unit for an electro-pneumatic service brake of a vehicle, having at least two pressure control channels which are electrically controllable with regard to a brake pressure. A central electronic brake control device has a board, carrying elec-
(Continued)

trical and electronic components, in which routines at least for controlling the brake pressure and for controlling the driving dynamics are implemented in the electrical and electronic components. At least one inertial sensor is arranged on or at the at least one board and is electrically conductively connected to at least several of the electrical and electronic components on the board so that the output signals of the at least one inertial sensor are integrated into the at least several electrical and electronic components for carrying out the control of the driving dynamics.

34 Claims, 22 Drawing Sheets

(51) Int. Cl.

| | | |
|---|---|---|
| *B60T 8/94* | (2006.01) | |
| *B60T 13/36* | (2006.01) | |
| *B60T 13/68* | (2006.01) | |
| *B60T 15/02* | (2006.01) | |
| *B60T 17/22* | (2006.01) | |
| *F16F 15/00* | (2006.01) | |
| *G05D 16/20* | (2006.01) | |

(52) U.S. Cl.
CPC .......... *B60T 13/683* (2013.01); *B60T 15/027* (2013.01); *B60T 17/221* (2013.01); *F16F 15/002* (2013.01); *G05D 16/204* (2013.01); *B60T 2240/00* (2013.01); *B60T 2250/00* (2013.01); *B60T 2250/03* (2013.01); *B60T 2260/09* (2013.01); *B60T 2270/10* (2013.01); *B60T 2270/20* (2013.01); *B60T 2270/304* (2013.01); *B60T 2270/402* (2013.01); *B60T 2270/403* (2013.01); *B60T 2270/404* (2013.01); *B60T 2270/82* (2013.01); *B60T 2270/88* (2013.01)

(56) References Cited

U.S. PATENT DOCUMENTS

| | | | |
|---|---|---|---|
| 2009/0250998 | A1 | 10/2009 | Hinz et al. |
| 2010/0066161 | A1 | 3/2010 | Fry et al. |
| 2011/0075384 | A1 | 3/2011 | Yeates |
| 2012/0080935 | A1 | 4/2012 | Steinberger et al. |
| 2014/0055974 | A1 | 2/2014 | Hansen |
| 2016/0217912 | A1 | 7/2016 | Yun |

FOREIGN PATENT DOCUMENTS

| | | | | | |
|---|---|---|---|---|---|
| CN | 107000726 | A | | 8/2017 | |
| CN | 107000729 | A | * | 8/2017 | .............. B60T 13/57 |

| | | | | | |
|---|---|---|---|---|---|
| CN | 107438544 | A | | 12/2017 | |
| DE | 19633224 | A1 | | 2/1998 | |
| DE | 10310235 | A1 | | 9/2004 | |
| DE | 102005023837 | A1 | | 12/2006 | |
| DE | 102007011293 | A1 | | 9/2008 | |
| DE | 102008034654 | A1 | | 2/2010 | |
| DE | 102009009811 | A1 | | 9/2010 | |
| DE | 102011017692 | A1 | | 10/2012 | |
| DE | 102012014407 | A1 | | 1/2014 | |
| DE | 102012022309 | A1 | | 5/2014 | |
| DE | 102015011296 | A1 | | 3/2017 | |
| DE | 102015119054 | A1 | | 5/2017 | |
| DE | 102016005318 | A1 | | 11/2017 | |
| DE | 102016010461 | A1 | | 3/2018 | |
| DE | 102017005980 | A1 | | 9/2018 | |
| EP | 0652145 | A1 | | 5/1995 | |
| EP | 0845397 | A2 | | 6/1998 | |
| EP | 0941905 | A2 | | 9/1999 | |
| EP | 1122142 | A1 | | 8/2001 | |
| EP | 1541437 | A2 | | 6/2005 | |
| EP | 1780087 | A1 | | 5/2007 | |
| EP | 2090481 | A2 | | 8/2009 | |
| EP | 2570314 | A1 | | 3/2013 | |
| GB | 1334903 | A | | 10/1973 | |
| JP | 2008522884 | A | * | 7/2008 | |
| JP | 2011238638 | A | | 11/2011 | |
| JP | 2013035319 | A | | 2/2013 | |
| WO | 0216179 | A2 | | 2/2002 | |
| WO | 0216179 | A3 | | 7/2002 | |
| WO | 2009152982 | A2 | | 12/2009 | |
| WO | 2010094481 | A2 | | 8/2010 | |
| WO | 2017017491 | A1 | | 2/2017 | |
| WO | 2018041384 | A1 | | 3/2018 | |
| WO | 2018046247 | A1 | | 3/2018 | |
| WO | WO-2018077470 | A1 | * | 5/2018 | ........... B60T 13/683 |

OTHER PUBLICATIONS

Publication WABCO, EBS—Electronically controlled braking system: system and functional description, 2nd edition, 2007.

Publication WABCO Europe, EBS3—Electronic braking system: System description, 2016.

Brauninger, J., Schneider, W.: Brake systems, in: Robert Bosch GmbH (ed.), Automotive paperback, 29th edition, Springer Vieweg, 2018 pp. 1086-1125, ISBN 978-3-658-23583-3.

ECE-R13, Agreement concerning the adoption of uniform technical prescriptions for wheeled vehicles, Jan. 14, 2008.

Technical customer document Y486 KOO 021 EBS 2.2, "Electronic braking system", customer: SCANIA.

"EBS3—Electronic Braking System: System Description", 2016, pp. 1-48. English Version.

"Kraftfahrtechnisches Taschenbuch" (Automotive Engineering Paperback), by Robert Bosch GmbH, 2002, pp. 738-767, with English machine translation of p. 738.

* cited by examiner

CENTRAL ELECTRO-PNEUMATIC PRESSURE CONTROL MODULE IMPLEMENTED AS A COMPONENT AND HAVING AN INTEGRATED CENTRAL BRAKE CONTROL DEVICE

FIELD OF THE INVENTION

The present invention proceeds from an at least two-channel electro-pneumatic central pressure control module embodied as a functional unit for an electro-pneumatic service brake installation of a vehicle, having at least two electric pressure control channels that are able to be controlled as separate circuits.

BACKGROUND INFORMATION

An electro-pneumatic service brake installation of a vehicle is discussed in EP 1 122 142 A1 and has a 2-channel pressure control module for the rear axle, wherein one channel supplies in each case one wheel brake of the rear axle with a brake or operating pressure. In contrast, the wheel brake cylinders of the front axle are in each case aerated or vented, respectively, by a dedicated 1-channel pressure control module. These 1-channel pressure control modules moreover have a respective purely pneumatic backup circuit so as to, in the event of a failure of the electrics, still be able to brake on account of the pressure that is supplied by a foot brake valve. The two 1-channel pressure control modules of the front axle and the 2-channel pressure control module of the rear axle are actuated by a central electronic brake control apparatus which is disposed outside the pressure control modules. A disadvantage of such a construction is the relatively large number of individual components which also requires numerous electric and pneumatic connections and lines between the individual components. This leads to a relative high probability of defects, not least because of the numerous connectors in this instance.

The present invention is therefore based on an object of refining a pressure control module such that an electro-pneumatic service brake installation of a vehicle that has such a pressure control module has a simpler, more robust construction which can be upgraded in a flexible manner. Furthermore, an electro-pneumatic service brake installation of a vehicle having such a pressure control module, and a vehicle having such a service brake installation, are also to be made available.

SUMMARY OF THE INVENTION

This object may be achieved according to the invention by the features as described herein.

Provided according to the invention is an at least two-channel electro-pneumatic central pressure control module, embodied as a functional unit, for an electro-pneumatic service brake installation of a vehicle, having at least two pressure control channels which are able to be electrically controlled in terms of a brake pressure, wherein a) for each pressure control channel, a controlled service brake pressure for at least one service brake cylinder of the service brake installation is generated based on an operating air emanating from at least one compressed-air reservoir as a function of electric brake request signals of an electric channel of a foot brake valve; and wherein b) a first electric pressure control channel which is a separate circuit of the at least two pressure control channels controls a first service brake pressure in service brake cylinders on at least one first axle, and a second pressure control channel of the at least two pressure control channels controls a second service brake pressure in service brake cylinders on at least one second axle; and wherein c) the pressure control module has at least the following: at least one reservoir connector for connecting the at least one compressed-air reservoir; at least one first operating connector for connecting at least one service brake cylinder of the at least one first axle; at least one second operating connector for connecting at least one service brake cylinder of the at least one second axle; at least one first electric communications port for feeding the electric brake request signals; and at least one ventilation; as well as at least one first voltage supply connector for supplying the pressure control module with an electric voltage; and wherein d) in the pressure control module d1) a central electronic brake control apparatus of the service brake installation is integrated, said central electronic brake control apparatus being in particular configured as the only electronic control apparatus of the service brake installation and carrying out higher-level functions such as a driving dynamics control or a driving stability control, such that said electronic brake control apparatus, as a function of an electric brake request signal that is present at the first electric communications port, for the first pressure control channel generates a first electric control signal, corresponding to a first nominal brake pressure, for a first electro-magnetic valve installation of the first pressure control channel; and for the second pressure control channel generates a second electric control signal, corresponding to a second nominal brake pressure, for a second electro-magnetic valve installation of the second pressure control channel that is independent of the first electromagnetic valve installation; and d2) the first electro-magnetic valve installation and the second electro-magnetic valve installation are integrated, wherein the first electro-magnetic valve installation, as a function of the first electric control signal from the reservoir pressure of the at least one compressed-air reservoir, modulates a first actual brake pressure at the first operating connector of the first pressure control channel; and the second electro-magnetic valve installation, as a function of the second electric control signal from the reservoir pressure of the at least one compressed-air reservoir, modulates a second actual brake pressure for the second operating connector of the second pressure control channel; and d3) at least one first pressure sensor and at least one second pressure sensor are integrated, wherein the first pressure sensor for a comparison with the first nominal brake pressure feeds into the central electronic brake control apparatus a first pressure measurement signal which represents the measured first actual brake pressure, and the second pressure sensor for a comparison with the second nominal brake pressure feeds into the central electronic brake control apparatus a second pressure measurement signal which represents the measured second actual brake pressure, wherein the central electronic brake control apparatus in this instance is furthermore configured such that said central electronic brake control apparatus for the first pressure control channel performs a reconciliation between the first actual brake pressure and the first nominal brake pressure, and for the second pressure control channel performs a reconciliation between the second actual brake pressure and the second nominal brake pressure and, as a function of this reconciliation, actuates the first and the second electro-magnetic valve installation in such a manner that the first nominal brake pressure is present at the first operating connector, and the second nominal brake pressure is present at the second operating connector; wherein e) the central electronic brake control apparatus is furthermore configured such that said central electronic brake control apparatus, as a function of output signals of at least one inertial sensor, feeds actuating signals into the first electro-magnetic valve installation and/or into the second electro-magnetic valve installation so as to carry out braking corresponding to a driving dynamics or driving stability control system by at least one brake cylinder; and wherein e) the central electronic brake control apparatus has a circuit board which supports electric and electronic components, wherein routines at least for the brake pressure control and for the driving dynamics control are implemented in the electric and electronic components, wherein f) the at least one inertial sensor is disposed in particular directly or indirectly on or at the at least one circuit board or is connected thereto and is connected in an electrically conducting manner to at least some of the electric and electronic components on the circuit board such that the output signals of the at least one inertial sensor are able to be fed into the at least some electric and electronic components for the driving dynamics control to be carried out.

The central pressure control module represents a functional unit in a common housing or in individual housings which are flange-fitted to one another, having at least the connectors mentioned above.

In other words, the central electronic brake control apparatus having the routines for the brake pressure control and for the driving dynamics control is integrated in the pressure control module according to the invention, on the one hand. Because of this integration in the central pressure control module, a central electronic brake control apparatus disposed outside the central pressure control module, as in EP 1 122 142 A1 mentioned at the outset, is therefore no longer present in the electro-pneumatic service brake installation according to the invention. Rather, the central electronic brake control apparatus of the electro-pneumatic service brake installation is integrated in the central pressure control module, said central electronic brake control apparatus, apart from the brake pressure control, potentially also relating to even higher-level functions such as, for example, a brake force distribution to the front and the rear axle, a driving dynamics control system, a driving stability control system (ESC), a traction control system (TCS), a rollover stability system (RPS), an anti-wheel lock control system (ABS), as well as in particular also controls relating to at least partial autonomous driving.

The term "integrated" herein means an inclusion of hardware components and of software components in the central pressure control module.

On the other hand, at least also an inertial sensor (for example a yaw rate sensor, a longitudinal acceleration sensor, a transverse acceleration sensor) is disposed at or on the circuit board of the central electronic brake control apparatus that supports electric and electronic components in which the routines for the brake pressure control and the driving dynamics control system are implemented, the sensor signals of said inertial sensor being utilized as input signals for the driving dynamics control system.

The at least 2-channel central pressure control module, this because the latter controls the brake pressure in the first pressure control circuit (for example the front axle) and the brake pressure in the second pressure control circuit (for example the rear axle) of the vehicle, thus represents a "central module" because the latter carries out all of the braking functions at least for the at least one front axle and the at least one rear axle and thus forms a central integrated building block of an electro-pneumatic service brake installation of a 4×2 or 4×4 vehicle.

For the basic function of "service braking while controlling the brake pressure" in the two pressure control circuits in the electro-pneumatic service brake installation by way of such a central pressure control module, only the foot brake valve having the electric channel (electric brake value transducer) for generating the electric brake request signal formed as a function of the activation, the service brake cylinders on the front and the rear axle, and the at least one compressed-air reservoir therefore still have to be added. Two pneumatic backup service brake circuits for the front and the rear axle can optionally also be provided.

Consequently, in this instance significantly fewer electric and pneumatic lines between components of the electro-pneumatic service brake installation are to be routed in comparison to the prior art. This reduces the complexity for pneumatic piping, installations of cables, as well as for electric contacting. The central pressure control module in this instance can already be built to specifications and tested at the vendor of the brake installation, this increasing the operational reliability.

It is also particularly advantageous that by far the most vehicles in which such an electro-pneumatic brake installation is used are vehicles with the wheel formula 4×2 (4 wheels of which two wheels are driven) and with brake pressure control on the first and the second axle, wherein such a central pressure control module, or the integrated central brake control apparatus thereof, respectively, in such an instance can assume the service brake functions as well as the higher-level functions mentioned above.

In further stages of specification, in which instance at least one further braked axle (further front or rear axle) is present, for example, at least one further pressure control module can then be provided for the respective additional (front and/or rear) axle, a specific brake pressure nominal value which is assigned to the additional axle being then predefined for said further pressure control module by the central pressure control module ("central module"), more specifically by the integrated central electronic brake control apparatus of said central pressure control module, such that, using the central pressure control module ("central module") as a base, various stages of specification of an electro-pneumatic service brake installation for a 4×2 or a 4×4 vehicle, for example, or else for a 6×2, a 6×4, a 6×6, or else an 8×8 vehicle, are possible in the manner of a parts kit without any major complexity.

ABS pressure control valves can optionally be disposed between the central pressure control module as the "central module" and the brake cylinders on the wheels of the first axle and the second axle, said ABS pressure control valves also permitting the brake pressure in these brake cylinders to be controlled/regulated in a wheel-individual manner even when the wheel brake cylinders on the left and the right wheels of the first and the second axle are in each case connected to a single channel of the "central module", and the service brake pressure in this instance would be able to be controlled only in an axle-wise manner. Therefore, not only a usual ABS control but also a wheel-individual adaptation/control/regulation of the service brake pressure in the wheel brake cylinders could be performed by the ABS pressure control valves that are controlled by the central electronic brake control apparatus in order for the driving dynamics control system to be implemented should the latter require this. Wheel-individual brake pressures in this instance can be additionally generated with the aid of the, for example, only 2-channel central pressure control module which controls separately the service brake pressures for the front and the rear axle, for example.

Likewise optionally, ABS pressure control valves can be disposed between the further pressure control module for the further axle and the brake cylinders on the wheels of the further axle, said ABS pressure control valves permitting wheel-individual controlling/regulating of the brake pressure in these wheel brake cylinders even when the wheel brake cylinders on the left and the right wheels of the further axle are connected to a single pressure control channel of the further pressure control module and the service brake pressure in this instance would actually be able to be controlled only in an axle-wise manner.

The optional measures described above widen the specifications potentials of an electro-pneumatic service brake installation as a "modular parts kit" which is based on the central pressure control module.

Advantageous refinements and improvements of the invention as described herein are possible on account of the measures set forth in the further descriptions herein.

For configuring pressure control channels having separate pneumatic circuits, a dedicated first reservoir pressure connector can be provided for the first pressure control channel and a dedicated second reservoir pressure connector which is separate in terms of the first reservoir pressure connector can be provided for the second pressure control channel, wherein at least one first compressed-air reservoir is able to be connected to the first reservoir pressure connector, and at least one second compressed-air reservoir which is separate in terms of the first compressed-air reservoir is able to be connected to the second reservoir pressure connector, wherein the pneumatic flow paths of the first pressure control channel, proceeding from the first reservoir pressure connector up to the first operating connector, are configured so as to be pneumatically separate from the pneumatic flow paths of the second pressure control channel, proceeding from the second reservoir pressure connector up to the second operating connector.

In this case, pressure control channels having pneumatically completely separate circuits and having in each case a dedicated reservoir air supply are therefore present, proceeding from the respective compressed-air reservoir up to the assigned service brake cylinders, such that the failure of the reservoir area assigned to one pressure control channel cannot lead to a functional failure of the entire pressure control module since the further pressure control channels, by virtue of the separate supply thereof with reservoir air, continue to be functional. Last but not least, apart from the pressure control channels which are anyway assigned to the compressed-air reservoirs, no additional compressed-air reservoir is required.

This is particularly advantageous when a central pressure control module according to the invention has two pneumatically separate pressure control channels of which one pressure control channel is assigned to an axle, here for example a front axle, and one pressure control channel is assigned to a further axle, here for example a rear axle. Such two-axle vehicles having four braked wheels represent the large majority, in particular in the commercial vehicle sector. In the event of a failure of one pressure control channel and thus of the brakes of one axle, braking in this instance can still take place using the wheel brakes on the other axle.

In the central pressure control module a first operating connector therefore may be provided for connecting at least one service brake cylinder of the front axle, and at least one second operating connector is provided for connecting at least one service brake cylinder of at least a second axle of the vehicle. A first pressure control channel with a pneumatically separate circuit can be assigned at least to a front axle, and a second pressure control channel with a pneumatically separate circuit can be assigned at least to a rear axle, for example.

According to a refinement, in the case of the central pressure control module, a first backup connector of a first pneumatic backup circuit which is assigned to at least one first axle, and a second backup connector of a second pneumatic backup circuit which is assigned to at least one second axle, can be provided, wherein a first backup pressure which is emitted by the first compressed-air reservoir and supplied by a first pneumatic channel of the front brake valve, and a second backup pressure which is emitted by the second compressed-air reservoir and is supplied by a second pneumatic channel of the foot brake valve, are able to be fed into the first backup connector, wherein the brake pressures at the operating connectors are formed with the aid of the first backup circuit and the second backup circuit in the event of the failure or a malfunction of the electric pressure control channels that are able to be controlled as separate circuits.

In this case, a first pneumatic backup flow path of the first backup circuit, proceeding from the first backup connector up to the first operating connector, can be configured so as to be pneumatically separate in terms of a second pneumatic backup flow path of the second backup connector circuit, proceeding from the second backup connector up to the second operating connector in order to further increase the failsafe performance of the electropneumatic service brake installation.

In this case, a first electro-pneumatic backup valve of the first electro-magnetic valve installation can be disposed in the first pneumatic backup flow path, and a second electro-pneumatic backup valve of the second electro-magnetic valve installation can be disposed in the second pneumatic backup flow path, wherein the electro-pneumatic backup valves are configured and actuated by the central electronic brake control apparatus such that said backup valves lock the first and the second backup flow path in the case of intact electric pressure control channels, and activate the first and the second backup flow path in the event of an error or of a malfunction of the electric pressure control channels.

The driving dynamics control system can particularly may include at least one of the following controls: a driving stability control system (ESC); an anti-wheel lock control systems (ABS); a traction control system (TCS); rollover stability system (RPS); a control system for at least partially autonomous driving. Conceivable is any type of driving dynamics control system which in this instance is implemented in the central electronic brake control apparatus of the central pressure control module ("central module") and which can in particular process signals of at least one inertial sensor.

The central pressure control module particularly may include oscillation-decoupling arrangement/apparatus for at least partially decoupling the at least one inertial sensor from oscillations or impact sound to which the circuit board or components of the central pressure control module that are connected thereto is/are exposed during operation. Such undesirable oscillations are generated above all by the switching impacts of armatures of solenoid valves that move back and forth for example at a high frequency, said solenoid valves being integrated in the central pressure control module ("central module"). The oscillation-decoupling arrangement/apparatus in this instance include, for example, resilient or "soft" elements which by virtue of the relatively high excitation frequencies of the solenoid valves from the at least one inertial sensor decouple the impact sound.

The oscillation-decoupling arrangement/apparatus may comprise a decoupling portion of a circuit board body of the circuit board on which the at least one inertial sensor is held or disposed, wherein the decoupling portion is separated from the remainder of the circuit board body of the circuit board, with the exception of at least one circuit board bridge portion which connects the decoupling portion to the remainder of the circuit board body, by at least one clearance that completely penetrates the circuit board body of the circuit board, wherein at least one electrical connection between the at least one inertial sensor and the electric and electronic components on the remainder of the circuit board body is routed along the circuit board bridge, said electrical connection directing the output signals of the at least one inertial sensor to the electric and electronic components for the driving dynamics control to be carried out.

According to a refinement, the at least one clearance includes at least one (continuous) slot in the circuit board body, said slot at least partially surrounding the decoupling portion with the exception of the at least one circuit board bridge portion. The circuit board bridge portion in this instance forms a type of resilient "spring tongue" on which the decoupling portion of the circuit board body, conjointly with the at least one inertial sensor, is resiliently mounted in this instance. Because of the circuit board bridge portion, the slot herein can partially surround the decoupling portion of the circuit board body, for example.

According to a further refining measure, the at least one clearance can at least be partially filled with a damping mass. The damping mass in the at least one slot, for example, likewise ensures a decoupling of oscillations in this instance.

The circuit board bridge portion at least in portions can also have a smaller thickness than the remainder of the circuit board body and/or the decoupling portion.

According to a further embodiment, an electric contacting device for resiliently electrically contacting the circuit board by way of the at least one inertial sensor or by way of at least one solenoid valve of the first or the second electro-magnetic valve installation can be provided, said electric contacting device comprising at least one spring element which extends from the circuit board up to the at least one inertial sensor or up to the at least one solenoid valve, the circuit board on the one hand and the at least one inertial sensor or the at least one solenoid valve on the other hand being mounted by said spring element so as to be sprung in relation to one another in at least one degree of freedom of movement and at the same time being connected to one another in an electrically conducting manner. This sprung mounting is resilient and therefore ensures a decoupling of oscillations between the circuit board on the one hand and the at least one inertial sensor or the at least one solenoid valve on the other hand.

In one case, a transmission of oscillations from the at least one solenoid valve to the circuit board by the at least one spring element is thus minimized or prevented, respectively, said solenoid valve causing oscillations in the operation thereof. In this one case, the at least one inertial sensor is disposed directly on the circuit board, for example, and because of the resilient connection between the circuit board and the solenoid valve in this instance is exposed to lower oscillations that are caused by the at least one solenoid valve, such that said inertial sensor can deliver better measurement results to the electric and electronic components on the circuit board for the driving dynamics or driving stability control to be carried out.

In another case, the at least one inertial sensor is not situated directly on the circuit board but by way of the at least one spring element is connected to the circuit board in a resilient manner, on the one hand, and an electrically conducting manner, on the other hand, so as to transmit the sensor signals of said inertial sensor to the electric and electronic components on the circuit board which then carry out the routines of the driving dynamics or driving stability control. In this other case, a transmission of oscillations of the circuit board, for example excited by a solenoid valve in the central pressure control module, to the at least one inertial sensor is reduced by the at least one spring element such that said inertial sensor in turn can deliver better measured results.

The at least one degree of freedom of movement herein can include a translatory and/or a rotary degree of freedom of movement.

The at least one spring element can include, for example, a coil spring or be formed by such a coil spring which is mounted so as to be clamped between the circuit board, on the one hand, and the at least one inertial sensor or the at least one solenoid valve, on the other hand. Such a clamped mounting of the coil spring can be implemented in that, for example, the circuit board is fastened to a face of a cover of the central pressure control module that points into the interior of the pressure control module, and the coil spring which is centered on the circuit board, for example, is compressed between the circuit board and the at least one inertial sensor or the at least one solenoid valve, respectively, when the cover is then placed on said circuit board.

According to a further embodiment of the central pressure control module, at least one electro-magnetic valve of the first electro-magnetic valve installation and/or of the second electro-magnetic valve installation can be formed by an electro-magnetic tilting armature valve or include such an electro-magnetic tilting armature valve, respectively. Such tilting armature valves when in operation cause less excitation of oscillations than usual solenoid valves having an armature which moves in a reciprocating translatory manner.

The tilting armature valve can in particular comprise the following:

a) a half shell;

b) a cover element which covers the half shell in a fluid-tight manner so as to form a valve chamber, wherein the cover element has at least one control aperture and a passage for directing a fluid through the valve chamber;

c) a magnetically conducting tilting armature having at least one sealing element, wherein the tilting armature in the valve chamber is mounted so as to be movable between an opening position and a closing position, wherein the sealing element in the closing position closes the control aperture in a fluid-tight manner and in the opening position releases the latter; and d) a coil installation which is disposed on a base of the half shell that is outside the valve chamber and opposite the cover element and is configured so as to move the tilting armature between the opening position and the closing position; wherein e) the coil installation has a magnetically conducting coil core and at least one coil that is wound about the coil core, wherein the coil core in the longitudinal direction is disposed so as to be substantially parallel to the base.

According to a refinement of this embodiment, a damper element which is disposed on a side of the tilting armature that faces the base or on a side of the base that faces the tilting armature so as to attenuate a mechanical oscillation, in particular a vibration and/or a shock and/or an impact, of the tilting armature when the tilting armature moves to the opening position thereof, in particular wherein the damper element is fastened to the tilting armature or to the base while using an adhesive material. The damper element in this instance ensures an even more attenuated movement of the tilting armature.

For configuring a parts kit on the basis of the above-described central pressure control module ("central module"), said central pressure control module can have at least one second electric voltage supply connector for supplying an electric voltage to at least one further pressure control module and at least one second communications port for communicating with the at least one further pressure control module, wherein a) the at least one further pressure control module controls the brake pressure in service brake cylinders of at least one further rear axle and/or at least one further axle; and wherein b) the central electronic brake control apparatus of the service brake installation that is integrated in the central pressure control module, as a function of the brake request signals that are present at the first communications port, feeds into the second communications port a third electric control signal, corresponding to a nominal brake pressure, for the at least one further pressure control module so as to control the brake pressure in service brake cylinders that are connected to the at least one further pressure control module.

The at least one further pressure control module can then control in an open loop/closed loop the brake pressure in an axle which in terms of the first and the second axle is a further axle (for example a further front or rear axle), while the brake request signals are fed into the central pressure control module ("central module") by the electric channel of the foot brake valve, for example, and in the central electronic brake control apparatus integrated in said central pressure control module, as a function of the brake request signals, the third control signal which represents at least one nominal brake pressure for the corresponding axle or the corresponding wheel of the corresponding axle, is then formed and then fed into the at least one further pressure control module by way of a CAN brake bus that is connected to the second communications port of the central pressure control module ("central module"), for example. Such a nominal brake pressure for the corresponding axle or the corresponding wheel of the corresponding axle can in particular be a function of the load to which the further axle is exposed.

Furthermore, the central pressure control module can have at least one electric voltage supply connector for supplying a voltage to at least one trailer control module, and at least one third communications port for communicating with the trailer control module, wherein a) the trailer control module with the aid of integrated electronic trailer brake control electronics controls the brake pressure in service brake cylinders of a trailer; and wherein b) the central electronic brake control apparatus of the service brake installation, as a function of the electric brake request signals which are present at the first electric communications port, feeds into the third communications port a fourth electric control signal, corresponding to a nominal brake pressure, for the trailer control module or into the integrated trailer brake control electronics thereof, respectively, so as to control the brake pressure in service brake cylinders of the trailer that are connected to the trailer control module.

This applies in the case of the trailer control module having "intelligence" in the form of the trailer brake control electronics by way of which the controlling to the brake pressure nominal value for the trailer takes place.

In the case of the trailer control module not having any "intelligence" in the form of trailer brake control electronics, the central pressure control module has at least one control connector for solenoid valves of a trailer control module and at least one sensor connector for at least one pressure sensor of the trailer control module, for example, wherein the central electronic brake control apparatus of the central pressure control module in this instance feeds a fourth electric control signal into the control connector for the solenoid valves of the trailer control module so as to control the brake pressure in service brake cylinders of a trailer to a nominal brake pressure for the service brake cylinders of the trailer. On the other hand, the central electronic brake control apparatus receives from the at least one pressure sensor of the trailer control module a signal which represents the actual brake pressure in the service brake cylinders of the trailer generated on account of the actuation of the solenoid valves, and in this case carries out the controlling of the brake pressure to the nominal brake pressure.

In general, the inertial sensor can comprise at least one of the following sensors:

An acceleration sensor which measures the acceleration in one axis, in two or in three axes (x, y, z), and/or a yaw rate sensor. In general, any sensor or else any sensor combination which directly or indirectly measures a velocity and/or an acceleration is conceivable as an inertial sensor.

The central pressure control module can in particular have at least one vehicle data bus connector for connecting to a vehicle data bus. In this instance, it is possible for the central electronic brake control apparatus that is connected to the vehicle data bus connector to communicate with other control apparatuses, said central electronic brake control apparatus in this instance being able to check information present on the vehicle data bus, such as specific vehicle parameters and/or propulsion machine parameters and/or vehicle state data, or said electrical brake control apparatus receiving control signals from other control apparatuses such as a control apparatus having routines for at least partially autonomous driving, so as to be able to perform automatic braking actions with the aid of the electro-pneumatic service brake installation independently of the driver, for example.

The pressure control module can also have output stages for ABS pressure control valves that are provided for being disposed between the first operating connector of the first axle and the service brake cylinders of the first axle, and between the second operating connector of the second axle and the service brake cylinders of the second axle, wherein routines are implemented in the central electronic brake control apparatus, by way of which routines control signals for the ABS pressure control valves are emitted and by way of which, based on the service brake pressures which are controlled only in an axle-wise manner in the pressure control channels of the first axle and of the second axle, service brake pressures which are individual for each wheel on the first axle and on the second axle are in each case generated with the aid of the ABS pressure control valves, in particular for carrying out ABS control and/or the driving dynamics control. The service brake pressure in a wheel brake cylinder of a braked wheel of the first axle and/or of the second axle can in this instance be adapted/controlled or regulated by an ABS pressure control valve which is controlled by the central electronic brake control apparatus so as to carry out wheel-individual service braking of the respective wheel even when the service brake pressure in wheel brakes of wheels on different sides of one axle is controlled by a common pressure control channel. The central electronic brake control apparatus in the central pressure control module in this case includes corresponding routines, which enable the brake pressure to be set/controlled/regulated in a wheel-individual manner on wheels on different sides of an axle which by way of the respective pressure control channel is actually controlled by a uniform brake pressure. Such a wheel-individual brake pressure on at least one braked wheel of the first axle and/or of the second axle in this instance is set by the central electronic brake control apparatus of the central brake control module for carrying out controlling or regulating for which such a wheel-individual brake pressure is necessary or expedient, respectively, such as, for example, for an anti-wheel lock control system (ABS); a traction control system (TSC); a driving stability control system (ESC); a rollover stability system (RPS); and/or for controlling at least partially autonomous driving of the vehicle.

According to a refinement, in the central pressure control module, the first electro-magnetic valve installation and the second electro-magnetic valve installation can in each case have a relay valve installation which is pneumatically controlled by an electro-magnetic inlet/outlet valve combination, wherein the relay valve installations on the output side are controlled by way of the first and second operating connectors, and the electro-magnetic inlet/outlet valve combinations are controlled by the central electronic brake control apparatus. The inlet/outlet valve combination can include, for example, at least one 2/2-way solenoid valve and/or at least one 3/2-way solenoid valve, and the relay valve installation can include at least one relay valve having an integrated double-seated valve.

The central pressure control module can have inputs for wheel rotating speed sensors of the wheels of the vehicle and/or for brake wear sensors so as to be based on the signals of wheel rotating speed sensors, for example, carry out driving dynamics control or driving stability control (ESC); traction control (TSC); or anti-wheel lock control (ABS) by the central electronic brake control apparatus.

The invention also relates to an electro-pneumatic service brake installation of a vehicle, having at least two electric pressure control channels which are able to be controlled as separate circuits, including a central pressure control module as described above.

In the case of the service brake installation herein, the electric channel of the foot brake valve can be connected to the first communications port of the central pressure control module, for example by a data bus or at least one analog signal line.

Additionally, a control apparatus of a system for at least partial autonomous driving can be connected to the at least one first communications port of the central pressure control module, for example by way of a data bus, said control apparatus by way of the first communications port feeding brake request signals into the central electronic brake control apparatus of the central pressure control module. Based on the central pressure control module, the parts kit already mentioned above is implemented in this manner for upgrading a service brake installation.

In the service brake installation, at least one further pressure control module can also be connected to the second communications port of the central pressure control module, for example by way of a data bus or by way of at least one analog signal line, wherein the at least one further pressure control module is one of the following pressure control modules: a 1-channel pressure control module which adjusts the same brake pressure on wheels on different sides of at least one axle; a 2-channel pressure control module which adjusts a side-individual brake pressure on wheels on different sides of at least one axle.

According to a refinement, a trailer control module which with the aid of electronic integrated trailer control electronics controls the brake pressure in the service brake cylinders of a trailer can be connected to the third communications port of the pressure control module, for example by a data bus or at least one analog signal line.

According to a refinement, in the service brake installation, at least one first compressed-air reservoir can be connected to the first reservoir pressure connector, and at least one second compressed-air reservoir, which is separate in terms of the first compressed-air reservoir, can be connected to the second reservoir pressure connector in order to make available pressure control channels which have pneumatically separated circuits.

In the case of the service brake installation, at least one service brake cylinder of the at least one first axle can also be connected to the first operating connector, and at least one service brake cylinder of the at least one second axle can be connected to the second operating connector. According to a refinement, the central pressure control module in the service brake installation can have output stages for ABS pressure control valves that are disposed between the first operating connector of the first axle and the service brake cylinders of the first axle, and between the second operating connector of the second axle and the service brake cylinders of the second axle, wherein routines are implemented in the central electronic brake control apparatus, by way of which routines control signals for the ABS pressure control valves are emitted and by way of which, based on the service brake pressures which are controlled in an axle-wise manner in the pressure control channels of the first axle and of the second axle, service brake pressures which are individual for each wheel on the first axle and on the second axle are in each case generated with the aid of the ABS pressure control valves, in particular for carrying out ABS control and/or driving dynamics control.

The service brake pressure in a wheel brake cylinder of a braked wheel of the first axle and/or of the second axle in this instance can be adapted/controlled or regulated by an ABS pressure control valve which is controlled by the central electronic brake control apparatus, so as to carry out wheel-individual service braking of the respective wheel, even when the service brake pressure in wheel brakes of wheels on different sides of an axle is controlled by a common pressure control channel. The central electronic brake control apparatus in the central pressure control module in this instance includes corresponding routines which permit wheel-individual setting/controlling/regulating of wheels on different sides of an axle which in terms of brake pressure is actually controlled in a uniform manner by the respective pressure control channel. Such a wheel-individual brake pressure on at least one braked wheel of the first axle and/or of the second axle is then set by the central electronic brake control apparatus of the central pressure control module for carrying out controlling or regulating for which such a wheel-individual brake pressure is necessary or expedient, respectively, such as, for example, for an anti-wheel lock control system (ABS); a traction control system (TCS); a driving stability control system (ESC); a rollover stability system (RPS); and/or for controlling at least partially autonomous driving of the vehicle.

The invention also relates to a vehicle, in particular to a commercial vehicle, having an electropneumatic service brake installation described above.

More details are derived from the following description of exemplary embodiments.

Exemplary embodiments of the invention are illustrated in the drawing and explained in more detail in the description hereunder.

DETAILED DESCRIPTION

Figure 1:
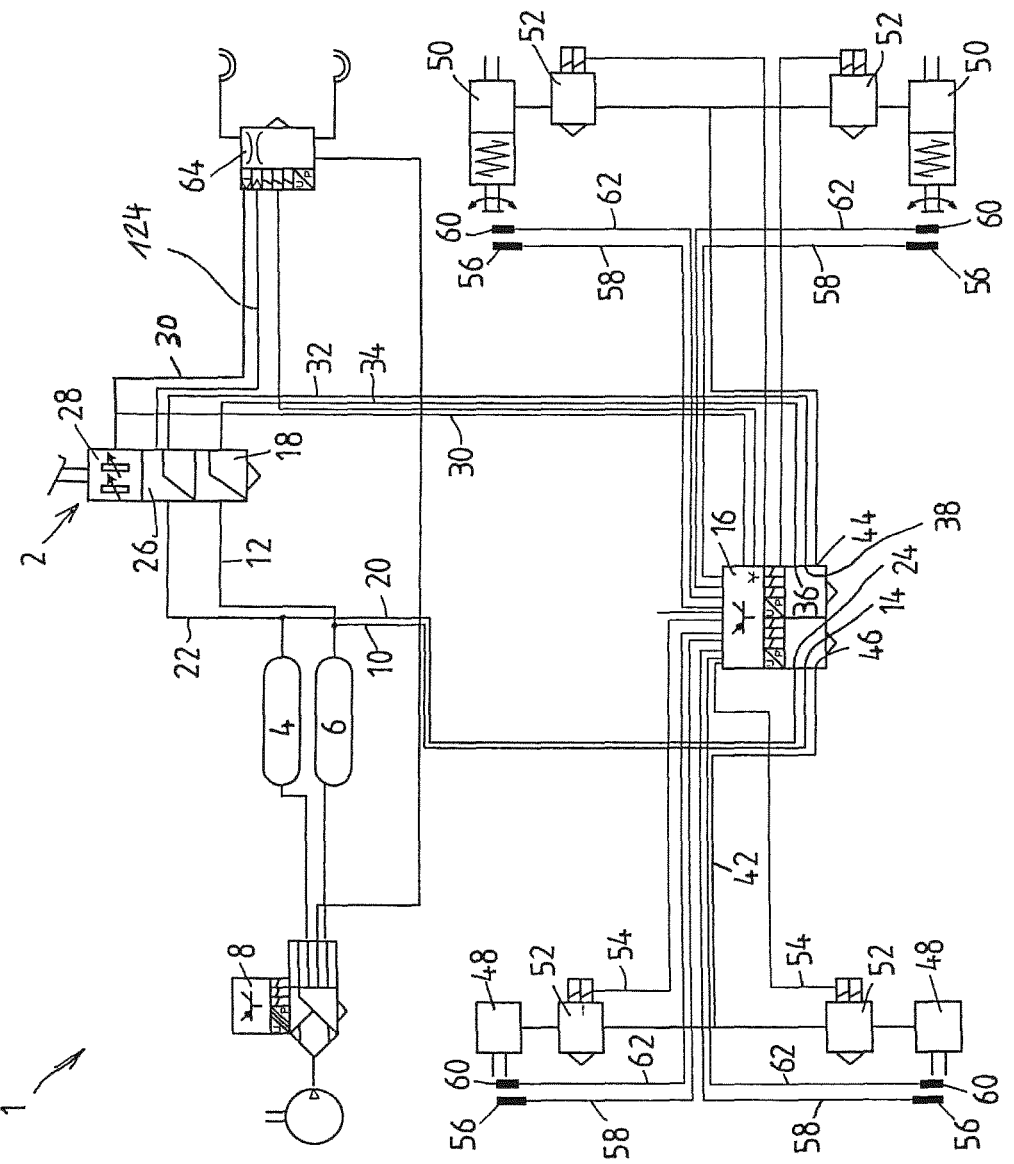
FIG. 1 shows a schematic circuit diagram of an electro-pneumatic service brake installation of a commercial vehicle, having a central pressure control module according to an exemplary embodiment of the invention.

FIG. 1 shows a circuit diagram of an electro-pneumatic service brake installation 1, for example of a heavy commercial vehicle, having a foot brake value valve or a foot brake module 2, a first (front axle) reservoir pressure vessel 4 for supplying a first (front axle) pressure control channel 9, and a second (rear axle) reservoir pressure vessel 6 for supplying a second (rear axle) pressure control channel 11.

The provision of air, the treatment of air, and the safety measures here are embodied as prescribed by legislation by way of an air treatment module 8 which is not described in more detail here.

The second (rear axle) reservoir pressure vessel 6 by way of pneumatic supply lines 10, 12 is connected to a second (rear axle) reservoir connector 14 of a central, for example dual-channel, pressure control module 16, on the one hand, as well as to a second (rear axle) channel 26 of the foot brake valve 2.

In an analogous manner, the first (front axle) reservoir pressure vessel 4 by way of pneumatic supply lines 20, 22 is connected to a first (front axle) reservoir connector 24 of the central pressure control module 16, as well as to a first (front axle) channel 18 of the foot brake valve 2.

The foot brake valve 2 as a brake value transducer therefore comprises two pneumatic channels 18, 26 having in each case one brake valve in which, as a function of a brake requirement predefined by the foot of the driver, a pneumatic backup pressure or control pressure is generated in each case at the outputs of the two channels 18, 26. In parallel thereto, an electric front axle channel and an electric rear axle channel are combined in an electric channel 28 of the foot brake valve 2, said electric channel 28 as a function of the brake requirement feeding an electric brake requirement signal into an electric connection that may be configured as a data bus 30 between the foot brake valve 2 and the central pressure control module 16, the latter converting the brake requirement signal in different ways for the front axle and the rear axle, for example for reasons of distributing load.

Furthermore, the front axle channel 18 and the rear axle channel 26 of the foot brake valve 2 are in each case connected to assigned backup connectors 36, 38 of the central pressure control module 16 by way of a pneumatic control line 32, 34. Finally, one pneumatic brake line 40, 42 leads in each case from one operating connector 44, 46 of the central pressure control module 16 to pneumatic service brake cylinders 48, 50 for each wheel of the front axle or the rear axle, respectively, wherein one pressure control valve 52 for the ABS operation of each wheel may be disposed in these pneumatic brake lines 40, 42. These ABS pressure control valves 52 are actuated by the central pressure control module 16 by electric control lines 54.

Rotating speed sensors 56 by electric signal lines 58 report the current rotating speed of the wheels of the two-axle vehicle to the central pressure control module 16. Wear sensors 60 may likewise be provided for each wheel brake, said wear sensors as a function of the current wear on the brakes feeding signals into the central pressure control module 16 by way of electric signal lines 62.

Not least, a trailer control module 64 which is known per se and into which a pneumatic control pressure is fed from the rear axle channel 26 of the foot brake valve 2 by way of a pneumatic control line 124, on the one hand, and an electric control signal is fed from the central pressure control module 16, for example by way of the data bus 30, on the other hand.

The brake clamping installations 50 of the rear axle may be configured as known combination cylinders, that is to say as a combination of an active service brake cylinder and a passive spring brake cylinder. "Active" in this context means that the service brake cylinders clamp when aerated, and release when ventilated, and "passive" means that the spring brake cylinders clamp when ventilated and release when aerated. In contrast, only active service brake cylinders 48 are provided on the wheels of the front axle.

The central electro-pneumatic pressure control module 16 which is embodied as a functional unit, for example in a common module housing 92, has two pressure control channels which are able to be separately controlled, wherein, based on an operating air that emanates from one assigned compressed-air reservoir (front axle compressed-air reservoir 4, or rear axle compressed-air reservoir 6), a controlled operating pressure for the service brake cylinders 48, 50 of the front axle or the rear axle, respectively, is generated for each pressure control channel 9, 11 as a function of the electric brake request signals of the electric channel 28 of the foot brake valve 2, said operating pressure being present at the assigned operating connectors 44, 46.

In order for pressure control channels with pneumatically separated circuits to be configured (here: front axle pressure control channel 9 and rear axle pressure control channel 11), each pressure control channel 9, 11 is consequently assigned a dedicated compressed-air reservoir 4, 6 as well as a dedicated ventilation 5, 7, wherein the pneumatic flow paths of each of the pressure control channels 9, 11, proceeding from the assigned compressed-air reservoir 4, 6 by way of the assigned operating connectors 44, 46 up to the assigned service brake cylinders 48, 50, are configured so as to be pneumatically separate from the pneumatic flow path of a respective other pressure control channel. In particular, one separate compressed-air reservoir 4, 6 is provided for each of the pressure control channels that is able to be controlled in a separate circuit (front axle pressure control channel 9 and rear axle pressure control channel 11), and one separate reservoir connector 14, 24 for connecting the respective assigned compressed-air reservoir 4, 6 as well as a dedicated ventilation 5, 7 are in each case provided on the 2-channel pressure control module 16.

In order for an electro-pneumatic service brake installation having primarily electrically activated pressure control channels (front axle pressure control channel 9 and rear axle pressure control channel 11) and a secondary pneumatic fallback solution in the event of a failure of the electrics to be configured, each pressure control channel 9, 11 may particularly be assigned a dedicated pneumatic backup circuit having a dedicated backup connector 36, 38 on the central pressure control module 16 for feeding pneumatic backup or control pressures which are emitted by the reservoir pressure of the compressed-air reservoir 4, 6 that is assigned to the respective pressure control channel 9, 11 and formed by the front axle channel 18 and the rear axle channel 26 of the foot brake valve 2, from which backup or control pressures the brake pressures are formed in a channel-wise manner at the operating connectors 44, 46 of the pressure control channels 9, 11 in the event of a failure of electric components of the primarily electric service brake circuit.

Alternatively, in the case of service brake installations 1 in which the foot brake valve 2 has only one pneumatic channel and which are to be equipped with the central two-channel pressure control module 16, the central pressure control module 16 could also have only a single backup connector for feeding only one pneumatic backup pressure which is generated by the pneumatic channel of the foot brake valve 2 and from which, in the event of a failure of electric components, separate brake pressures at the operating connectors 44, 46 of the central pressure control module 16 are then formed with the aid of integrated circuit-separation arrangement/apparatus. In this variant, the same backup pressure acts on relay pistons of relay valves of both pressure control channels, for example. In countries with brake requirements according to ECE R13, a suitable circuit separation between the backup pressure or control pressure of the one pneumatic brake circuit and the brake pressure emitted from the reservoir pressure of the other pneumatic brake circuit can be provided by a double piston seal with intermediate ventilation on the relay pistons, for example. The circuit separation 128 in FIG. 4 is symbolized by a thick solid line that runs so as to be centric through the central pressure control module 16.

Figure 2:
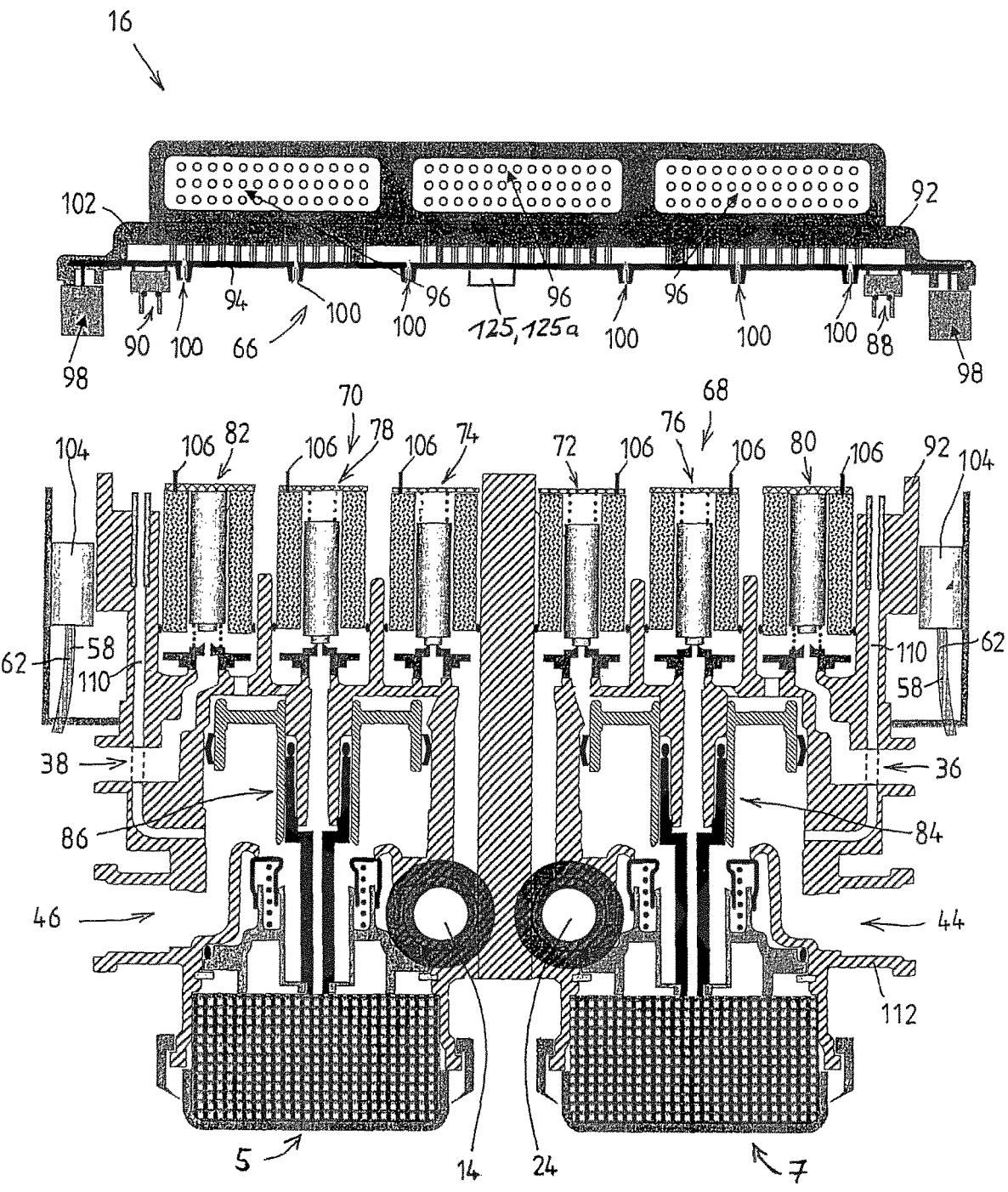
FIG. 2 shows a schematic cross-sectional view of the central pressure control module of FIG. 1 in an exploded illustration.
Figure 4:
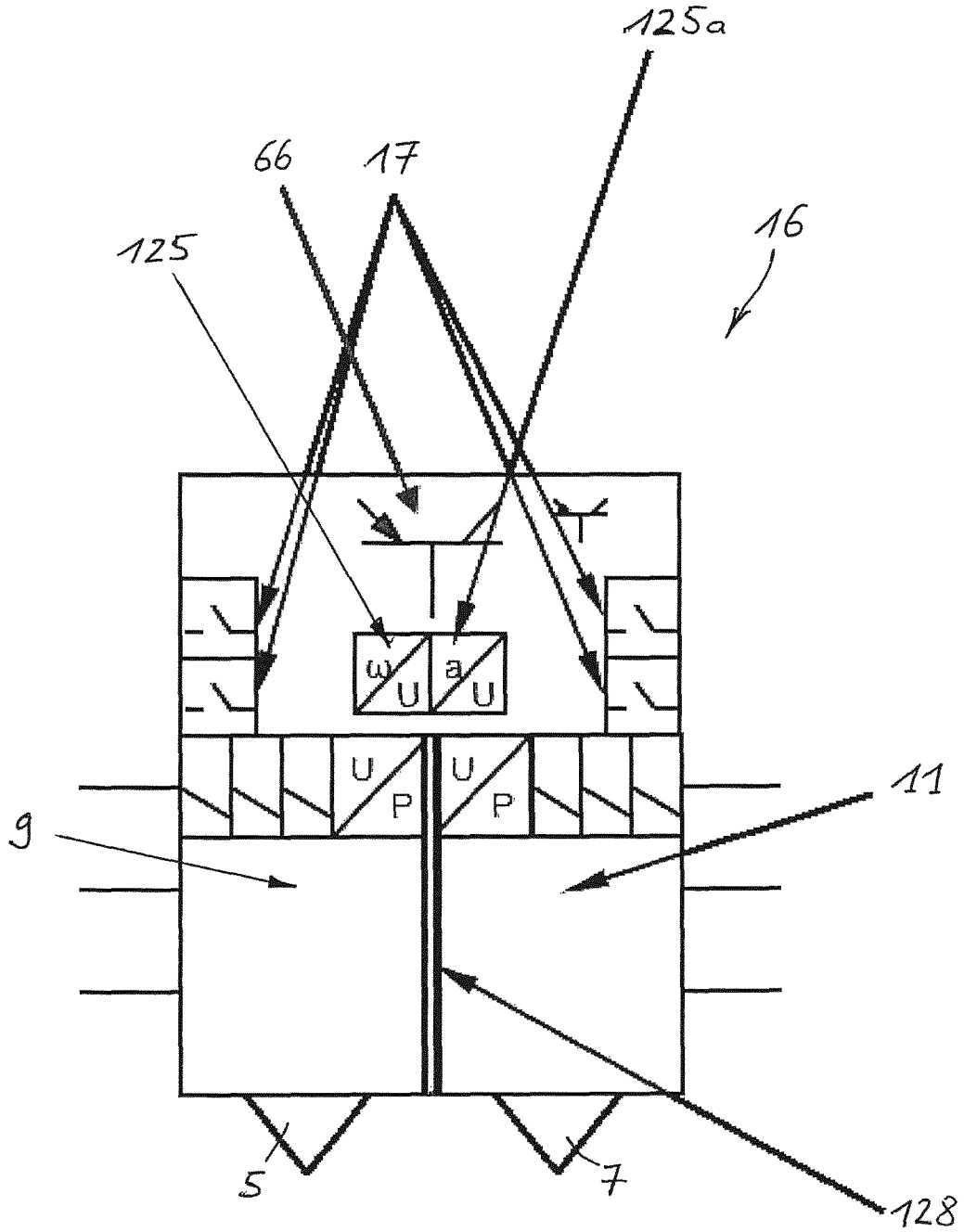
FIG. 4 shows a schematic illustration of the central pressure control module of FIG. 1.

According to FIG. 2 and FIG. 4, the central, here two-channel, pressure control module 16 includes a central electronic brake control apparatus 66 which carries out at least all of the routines required for controlling the pressure of the pressure control channels (front axle pressure control channel 9 or rear axle pressure control channel 11, respectively) and for each pressure control channel, as a function of the electric brake request signals of the electric channel 28 of the foot brake valve 2, generates a first electric control signal, corresponding to a first nominal brake pressure, for the front axle control pressure channel 9, and a second electric control signal, corresponding to a second nominal brake pressure, for the rear axle pressure control channel 11. Furthermore present in the central pressure control module 16 are one dedicated electro-magnetic valve installation 68, 70 for each pressure control channel (front axle pressure control channel 9 or rear axle pressure control channel 11, respectively), said dedicated electro-magnetic valve installation 68, 70, as a function of the electric control signals of the electronic control installation 66, generating from the reservoir pressure of the assigned compressed-air reservoir 4, 6 an actual operating pressure for the operating pressure connector 44, 46 which is assigned to the respective pressure control channel 9, 11.

Such an electro-magnetically activated valve installation 68, 70 may include in each case one inlet valve 72, 74, one outlet valve 76, 78 as well as one backup or fallback valve 80, 82. In order for comparatively large quantities of air to be handled, the inlet valve 72, 74 and the outlet valve 76, 78 could in each case also actuate a control connector of a relay valve 84, 86 which then generates the brake pressure. The operating mode of such electro-magnetically activated valve installations 68, 70 is well known, for example from EP 0 845 397 A2, so that the matter is not discussed in more detail here.

Furthermore, one dedicated pressure sensor 88, 90 for each pressure control channel (front axle pressure control channel 9 or rear axle pressure control channel 11) is disposed in the central pressure control module 16, said dedicated pressure sensor 88, 90, as a function of the actual brake pressure emitted from the assigned electro-magnetic valve installation 68, 70, feeds into the central electronic brake control apparatus 66 a pressure measurement signal for comparison with the respective nominal brake pressure which for the front axle pressure control channel is represented by the first electric control signal and for the rear axle pressure control channel is represented by the second electric control signal, so as to aerate and ventilate in a controlled manner the service brake cylinders 48, 50 that are connected to the respective pressure control channel 9, 11. The operating connectors 44, 46 and thus the service brake cylinders 48, 50 that are connected thereto are ventilated by way of ventilations 5, 7 (FIG. 4). Ventilating the service brake cylinders 48, 50 however takes place by way of the reservoir connectors 14, 24.

The common central electronic brake control apparatus 66 then controls the pressure in the pressure control channels (front axle pressure control channel 9 or rear axle pressure control channel 11, respectively); consequently, all of the controlling and regulating routines, or the entire control electronics, respectively, of the electric pressure control channels are integrated in the central electronic brake control apparatus 66 of the central pressure control module 16. Furthermore, routines of a driving stability control system ESC (electronic stability control system) of a TCS (traction control system), of an ABS system (anti-wheel lock control system), and/or of a RSP system (rollover protection control system) may also be implemented in the central electronic brake control apparatus 66 which then can also intervene in an engine control unit of an engine of the vehicle, or in a steering control mechanism of an electric steering system of the vehicle, respectively.

At least the electoral-magnetically activated valve installations 68, 70 that are assigned to the pressure control channels (front axle pressure control channel 9 or rear axle pressure control channel 11, respectively), the pressure sensors 88, 90 as well as the central electronic brake control apparatus 66 particularly may be accommodated in a common module housing 92.

As is derived from FIG. 2, the central pressure control module 16 may be embodied such that a circuit board 94 that supports electric and electronic components of the central electronic brake control apparatus 66; electric first, second, and third communications ports 96 for connecting the electric/electronic components such as, for instance, microprocessors and electronic circuits on the circuit board 94 to the data bus 30, for example; the pressure sensors 88, 90; electric plug contacts 98, 100 that are connected to the circuit board 94 are disposed in or on a housing part 102 which is embodied as a head part, for example, but the electro-magnetically activated valve installations 68, 70 having electric plug contacts 104, 106 that are complementary to the electric plug contacts 98, 100 of the one housing part 102, as well as pressure channels 108, 110 that are connected to the operating connectors 44, 46 therein are disposed in a further, here for example a lower, housing part 112. The two housing parts 102, 112 are releasably connected to one another, wherein, when the housing parts 102, 112 are being connected, the mutually assigned electric plug contacts 98, 104, or 100, 106, respectively, are electrically connected to one another, and the pressure sensors 88, 90 are pneumatically connected to the pressure-measuring side thereof, on the one hand, and to ports of the pressure channels 108, 110, on the other hand, in order to measure the actual operating pressure that is present at the operating pressure connectors 44, 46 by the pressure sensors 88, 90.

The plug contacts 100 may be configured on the circuit board 94 and when assembling the housing parts 102, 112 are automatically joined to the plug contacts 106 which are in each case configured on the head side on the electro-magnetically activated valves 72, 74, or 76, 78 or 80, 82, respectively. On account thereof, these valves can be actuated by the central electronic brake control apparatus 66, or by the electric and electronic components such as microprocessors or electric circuits on the circuit board 94, respectively. On the other hand, the plug contacts 98 and 104 in this instance also engage with one another in a conducting manner, said plug contacts 98 and 104 from the rotating speed sensors 56 or the wear sensors 60, respectively, directing wheel-related signals such as the wheel rotating speed and the pad wear by way of the signal lines 58, 62 into the lower housing part 112, for example, said signals then being fed from there into the circuit board 94 by way of the plug contacts 98, 104 so that the central electronic brake control apparatus 66 is supplied with corresponding data in order to be able to carry out the ESC, ABS, TCS and RPS functions, which may be integrated, as well as potentially even further functions.

Alternatively, the pressure sensors 88, 90 could also be accommodated in the lower housing part 112 in which the electro-magnetic valve installations 68, 70 are also disposed, wherein the pneumatic connections between the operating connectors 44, 46 and the pressure sensors 88, 90 in this instance are already configured in the respective housing part 112. In this instance however, electric contacts which are able to connect when assembling the housing points 102, 112 are to be additionally provided on both housing parts 102, 112 so that the pressure sensors 88, 90 by way of the electric signal connection which is then fired can feed the signals representing the actual operating pressure into the central electronic brake control apparatus 66.

The central pressure control module 16 furthermore has first, second and third voltage supply connectors which are not explicitly shown here, wherein the first voltage supply connector serves for supplying the central pressure control module with electric power, the second voltage supply connector serves for supplying at least one further pressure control module 122 with electric power from the central pressure control module 16, and the third voltage supply connector serves for supplying the trailer control module 64 with electric power from the central pressure control module 16.

The central pressure control module 16 has a third communications port 96 for communicating with the trailer control module 64, wherein the trailer control module 64 controls the brake pressure in the service brake cylinders of a trailer with the aid of integrated electronic trailer brake control electronics. The central electronic brake control apparatus 66 of the central pressure control module 16, as a function of the electric brake request signals that are present at the first electric communications port 94, then feeds a fourth electric control signal for the trailer control module 64 into the third communications port 94, said fourth electric control signal corresponding to a nominal brake pressure, whereupon the trailer control module 64 by way of an integrated pressure sensor, an integrated electronic control apparatus and an integrated electro-pneumatic valve installation adjusts the nominal brake pressure in the service brake cylinders connected to the trailer control module. To this extent, the trailer control module 64 is constructed like a one-channel pressure control module. The third communications port 94 for transmitting data can in this instance be connected in particular to the data bus 30 to which the trailer control module 64 is also connected.

Should the trailer control module 64 not possess any integrated electronic control apparatus and thus any dedicated "intelligence", the central pressure control module 16 can alternatively have at least one control connector for transmitting control signals for the integrated solenoid valves of the trailer control module 64, and at least one sensor connector for receiving sensor signals of at least one integrated pressure sensor of the trailer control module 64, wherein in this instance trailer brake pressure control routines which, based on the control signals and the sensor signals, adjust the brake pressure in service brake cylinders of the trailer to the nominal brake pressure are implemented in the central electronic brake control apparatus 66.

Figure 3B:
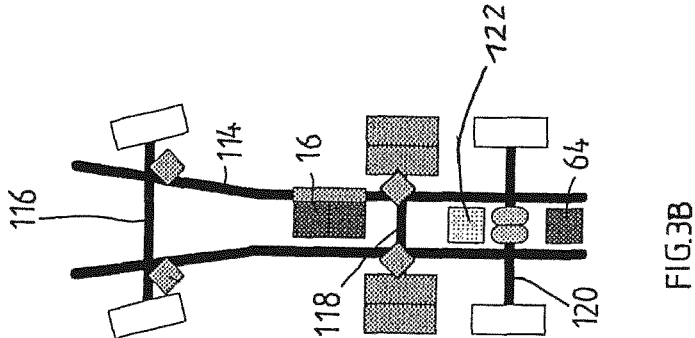
FIGS. 3A and 3B show highly schematic views of system architectures of electro-pneumatic service brake installations including a central pressure control module according to FIG. 2.
Figure 3A:
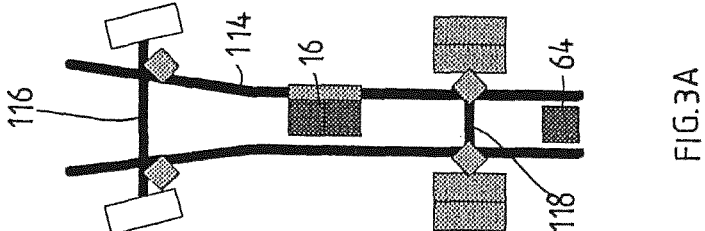

The central pressure control module 16 may be disposed on a chassis 114 of a commercial vehicle, so as to be substantially centric between the front axle 116 and the rear axle 118, as is derived in particular from FIG. 3A.

In the case of an electro-pneumatic service brake installation 1, having a two-channel central pressure control module 16 as described above, which may be two pressure control channels with pneumatically separate circuits (front axle pressure control channel 9 and rear axle pressure control channel 11) are therefore provided for the service brake cylinders 48, 50 of the front axle 116 and of the rear axle 118, wherein for the service brake cylinders of each further axle 120, for example a second rear axle or a lifting axle as shown in FIG. 3B, one further pressure control module 122, here for example a one-channel pressure control module 122, can be provided, the integrated electronic control apparatus of the latter in this instance communicating with the central electronic brake control apparatus 66 of the central pressure control module 66 by way of a data bus and also being centrally controlled by said central electronic brake control apparatus 66.

Instead of a front axle 116 and a rear axle 118, a pressure control channel 9 with a separate pneumatic circuit of at least one rear axle, and a pressure control channel 11 with a separate pneumatic circuit of at least one further rear axle can be configured in the central pressure control module 16. The central pressure control module 16 is also not limited to two pressure control channels but may also have more than two pressure control channels.

In the normal operation, the central pressure control module 16 by way of the data bus 30 is actuated by a brake request signal of the electric channel 28 of the foot brake valve 2, whereupon the central electronic brake control apparatus 66 thereof in a manner corresponding to this demand generates the first electric control signal and the second electric control signal for the pressure control channels of the front axle 116 and of the rear axle 118, said control signals in each case representing a specific nominal brake pressure and being fed into the electro-magnetic valve installations 68, 70. The latter, based on the respective reservoir pressure in the respective compressed-air reservoir 4, 6, then electrically generate an actual brake pressure which is fed into the service brake cylinders 48, 50. The pneumatic channels 18, 26 of the foot brake value valve 2 continue to feed the backup or control pressures for each pressure control channel (front axle pressure control channel 9 or rear axle pressure control channel 11, respectively) separately into the two backup connectors 36, 38 of the central pressure control module 16, wherein the backup or fallback valves 80, 82 therein are switched to the blocking position because the electric actuation has priority.

In the event of a failure of the electronics, compressed air from the two compressed-air reservoirs 4, 6 is fed by way of the two backup brake circuits, that is to say by way of the two pneumatic channels 18, 26 of the foot brake valve 2 and the two pneumatic control lines 32, 34, into the service brake cylinders 48, 50 by way of the backup or fallback valves 80, 82 which in the central pressure control module 16 are now switched to the open position. These two backup brake circuits then form the fallback for the electronic control and suffice for generating the legally prescribed auxiliary braking effect.

As has already been indicated above, the central electronic brake control apparatus 64 is furthermore configured such that the latter, as a function of output signals, for example here of an inertial sensor in the form of a yaw rate sensor 125, feeds actuating signals into the first electro-magnetic valve installation 68 and/or into the second electro-magnetic valve installation 70 so as to carry out driving dynamics control. The actuating signals by way of which the central electronic brake control apparatus 66 controls the first electro-magnetic valve installation 68 and/or the second electro-magnetic valve installation 70, then represent brake actuating signals for activating the wheel brakes on the front axle 116 and/or the rear axle 118 if required, for example in order to establish a vehicle stability in the context of an ESC system while driving. In the context of controlling driving stability, the ABS pressure control valves 52 here may be also actuated by the central pressure control module 16 so as to perform wheel-individual controlling of the brake pressure in the wheel brakes on the front axle 116 and/or on the rear axle 118, because the wheel brakes on the front axle 116 or on the rear axle, respectively, would otherwise be able to be in each case impinged only with a uniform brake pressure in the respective brake control channel 9, 11.

As is shown in particular in FIG. 4, the central pressure control module 16 has output stages 17 for the ABS pressure control valves 52, said output stages 17 being disposed between the first operating connector 44 of the first axle 116 and the service brake cylinders 48 of the first axle 116, and between the second operating connector 46 of the second axle 118 and the service brake cylinders 50 of the second axle 118, wherein routines are implemented by way of which control signals for the ABS pressure control valves 52 are emitted, in the central electronic brake control apparatus 66, wheel-individual service brake pressures on the wheels of the first axle 116 and on the second axle 118, in particular for carrying out ABS controlling and/or the driving dynamics control, being generated, based on the service brake pressures, which in the pressure control channels of the first axle 116 and the second axle 118 are controlled only in an axle-wise manner, by said control signals with the aid of the ABS pressure control valves 52.

The service brake pressure in a wheel brake cylinder of a braked wheel of the first axle 116 and/or of the second axle 118 can then be adapted/controlled or regulated by an ABS pressure control valve 52 which for carrying out wheel-individual service braking of the respective wheel is controlled by the central electronic brake control apparatus 66, even when the service brake pressure in wheel brakes of wheels on different sides of an axle 116 or 118 is controlled by a common pressure control channel 9 or 11.

The central electronic brake control apparatus 66 in the central pressure control module 16 in this instance includes corresponding routines which enable the brake pressure on wheels on different sides of an axle 116, 118, which in terms of brake pressure is actually uniformly controlled by the respective pressure control channel 9 or 11, to be set/controlled/regulated in a wheel-individual manner. Such a wheel-individual brake pressure on at least one braked wheel of the first axle 116 and/or of the second axle 118 is then set by the central electronic brake control apparatus 66 of the central pressure control module 16 in order to carry out controlling or regulating for which such a wheel-individual brake pressure is necessary or expedient, respectively, such as, for example, an anti-wheel lock control system (ABS); a traction control system (TCS); a driving stability control system (ESC); rollover protection control system (RPS), and/or for control for at least partially autonomous driving of the vehicle.

For a driving stability or driving dynamics control system ESC which here is implemented by corresponding routines in the central electronic brake control apparatus 66, for example, the yaw rate sensor 125 and, in an exemplary manner here, also an acceleration sensor 125a are disposed on or at the circuit board 94 and connected in an electrically conducting manner to at least some of the electric and electronic components on the circuit board 94 in such a manner that the output signals of the yaw rate sensor 125 and of the acceleration sensor 125a are able to be fed into the at least some electric and electronic components on the circuit board 94 in order to carry out the driving stability control ESC. In other words, electric contacts of the inertial sensor which here in an exemplary manner is embodied as a yaw rate sensor 125 and as an acceleration sensor 125a are connected, for example bonded, to conductor paths and/or electric contacts on the circuit board 94.

As is already derived from FIG. 3B, at least one further pressure control module 122 can be connected to the second communications port 96 of the central pressure control module 16. The second communications port 94 for transmitting data in this instance can be connected in particular to the data bus 30 to which the further pressure control module 122 is also connected.

The further pressure control module 122 can in particular be formed by a 1-channel pressure control module which adjusts the same brake pressure on wheels on different sides of at least one further axle 120, or by a 2-channel pressure control module which adjusts a side-individual brake pressure on wheels on different sides of at least one further axle 120.

In the case of a 1-channel pressure control module being the further pressure control module 122, the central pressure control module 16, or the central electronic brake control apparatus 66 thereof, respectively, based on the electric brake request signals of the electric channel 28 of the foot brake valve 2, then controls a specific brake pressure nominal value for the further pressure control module 122 of the further axle 120 of the vehicle, for example for all wheel brake cylinders of this further axle 120, so that the further pressure control module 122, by way of an integrated electro-pneumatic valve installation, feeds into the connected service brake cylinders a service brake pressure which is measured by an integrated pressure sensor and by an integrated electronic control apparatus is then adjusted to the brake pressure nominal value provided for the further axle 120. The central pressure control module 16 therefore predefines for the further pressure control module 122 the specific brake pressure nominal value for the service brake cylinders that are connected to the further pressure control module, said brake pressure nominal value being adapted to a load of the further axle 120, for example.

In the case of a 1-channel pressure control module being the further pressure control module 122, the central electronic brake control apparatus 66 of the central brake control module 16 can also predefine two brake pressure nominal values which are specific to the further axle 120 and feed said brake pressure nominal values into the further pressure control module 122, wherein, in an approach which is analogous to that of the central pressure control module 16, one ABS pressure control valve is disposed on each side between the further pressure control module 122 and the wheel brake cylinders connected thereto, the brake pressure that is controlled by way of one channel by the further pressure control module then by way of said ABS pressure control valve being able to be adapted for each side by the electronic control apparatus which is integrated in the further pressure control module.

In the case of a 2-channel pressure control module being the further pressure control module 122, the central pressure control module 16, or the central electronic brake control apparatus 66 thereof, respectively, based on the electric brake request signals of the electric channel 28 of the foot brake valve 2, for the further pressure control module 122 of the further axle 120 of the vehicle then controls in each case one specific brake pressure nominal value for each pressure control channel of the further pressure control module 122 so as to control the service brake pressure on the further axle 120 in a side-wise manner, for example.

In a manner analogous to that of the central pressure control module 16, one electro-magnetic valve installation, optionally including a relay valve and a pressure sensor, is in this instance integrated in the further pressure control module 122 for each of the pressure control channels thereof (1-channel or 2-channel embodiment). Furthermore integrated is an electronic control apparatus which, with the aid of the respective electro-magnetic valve installation and of the respective pressure sensor, performs controlling of the pressure of the service brake pressure in at these one pressure control channel.

Such a further pressure control module 122, or the integrated electronic control apparatus thereof, respectively, in this instance is connected to the second communications port 96 of the central pressure control module 16 by way of the data bus 30, for example, so as to transmit brake control signals from the central electronic brake control apparatus 66 of the central pressure control module 16 to the further pressure control module. Feedback and sensor signals of the further pressure control module 122, for example sensor signals of a pressure sensor which is integrated in the further pressure control module 122 and which measures the service brake pressure in at least one pressure control channel of the further pressure control module 122, are likewise transmitted to the central pressure control module 16 by way of the data bus 30. Moreover, the supply of the additional pressure control module 122 with electric power takes place by way of the second voltage supply connector of the second pressure control module 16, for example.

FIG. 5 to FIG. 9 show examples of embodiments of electropneumatic brake installations which build upon the central pressure control module 16 in various specification levels. Identical and identically-acting components are denoted using the same reference numbers therein.

Figure 5:
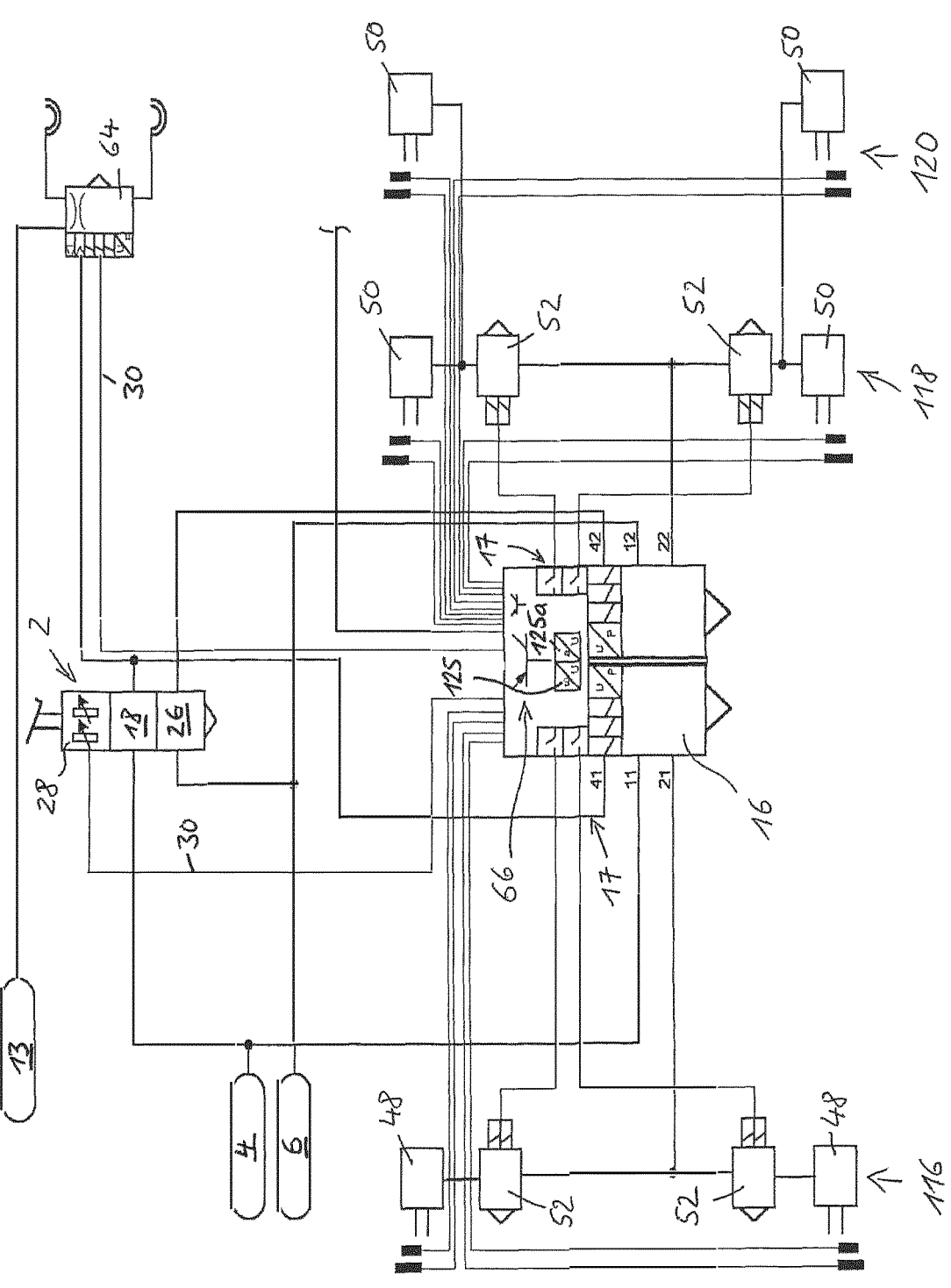
FIG. 5 shows a schematic circuit diagram of an electro-pneumatic service brake installation of a commercial vehicle, having a central pressure control module according to a further embodiment of the invention for a 6×4 vehicle.

The circuit diagram of an embodiment of an electro-pneumatic service brake installation, for example for a 6×4 vehicle, which is based on the central pressure control module 16 is shown in FIG. 5. Apart from the second axle 118 as the first rear axle herein, a further axle 120 is provided as a second rear axle, for example, wherein the brake pressure in the wheel brake cylinders on the second rear axle 120 is initially controlled conjointly with the service brake pressure in the wheel brake cylinders of the first rear axle 118 because no further pressure control module is present here. The conjoint controlling of the service brake pressure in the wheel brake cylinders of the two rear axles 118, 120 takes place by the second (rear axle) pressure control channel 11 of the central 2-channel pressure control module 16 and then in a side-wise manner by the ABS pressure control valves 52 which are common to the two rear axles 118, 120, so as to carry out the driving dynamics or driving stability control, for example. Furthermore, the trailer control module 64 is supplied with compressed air by a dedicated third reservoir pressure vessel 13 and is pneumatically controlled by the pneumatic first pneumatic backup circuit and by the first channel 18 of the foot brake valve 2. The electric control of the trailer control module 64 takes place as in FIG. 1 by the central electronic brake control apparatus 66, for example by way of the data bus 30.

Figure 6:
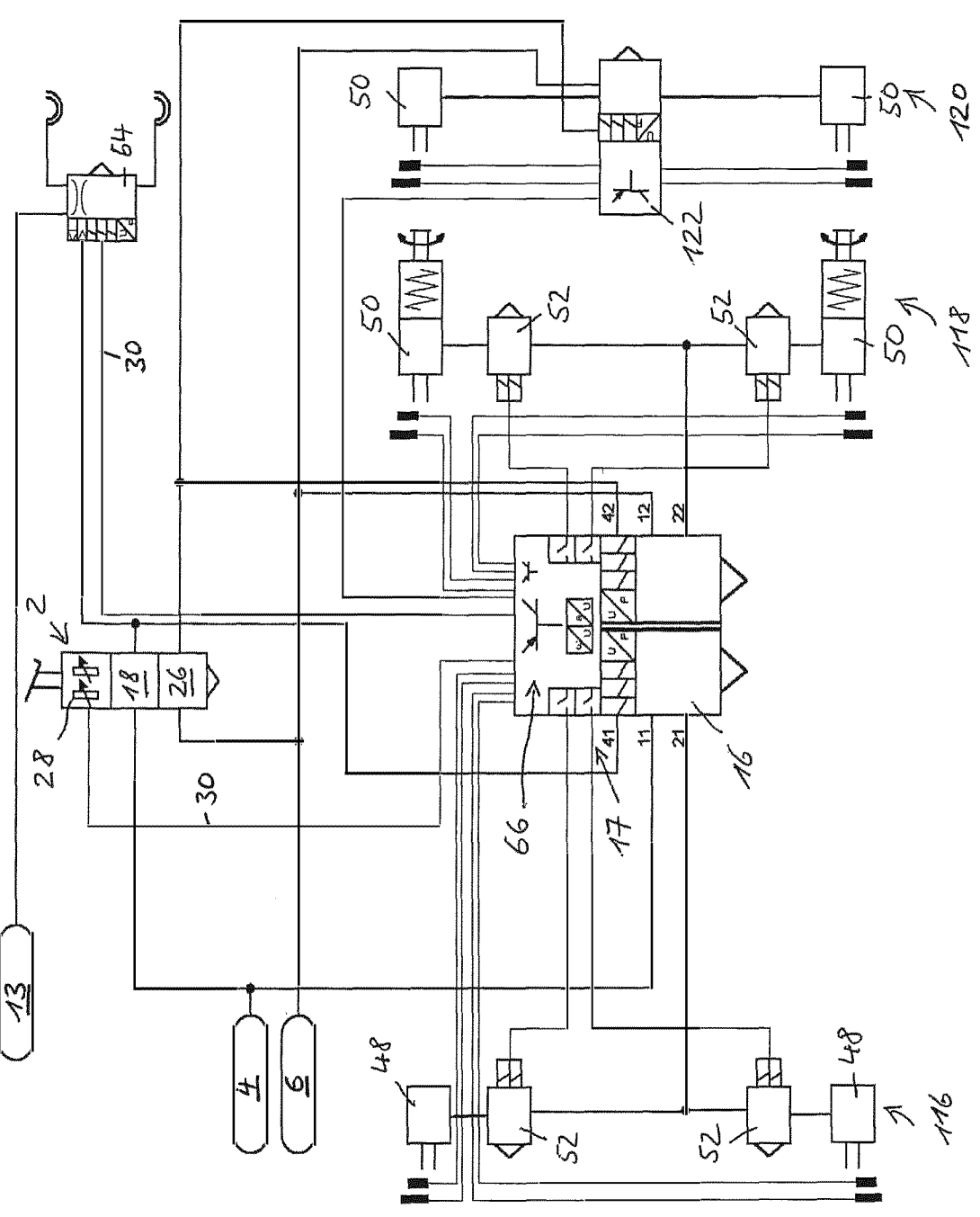
FIG. 6 shows a schematic circuit diagram of an electro-pneumatic service brake installation of a commercial vehicle, having a central pressure control module according to a further embodiment of the invention for a 6×2 vehicle.

The circuit diagram of a further embodiment of an electro-pneumatic service brake installation, for example for a 6×2 vehicle, which is based on the central pressure control module 16 is shown in FIG. 6. Apart from the second axle

118 as the first rear axle herein, a further axle 120 is again provided as the second rear axle, for example, wherein the brake pressure in the wheel brake cylinders on the second rear axle 120 is controlled by a further, for example one-channel, pressure control module 122 which by way of a specific brake pressure nominal value that is assigned to one of the further axles 120 is controlled by the central electronic brake control apparatus 66 of the central pressure control module, wherein the further one-channel brake control module 122 in an exemplary manner here adjusts the predefined brake pressure nominal value in an axle-wise manner for all braked wheels of the further axle 120. However, by virtue of the ABS pressure control valves 52 which are provided on the second axle (first rear axle) 118, controlling/regulating the brake pressures in a side-individual manner is possible.

Figure 7:
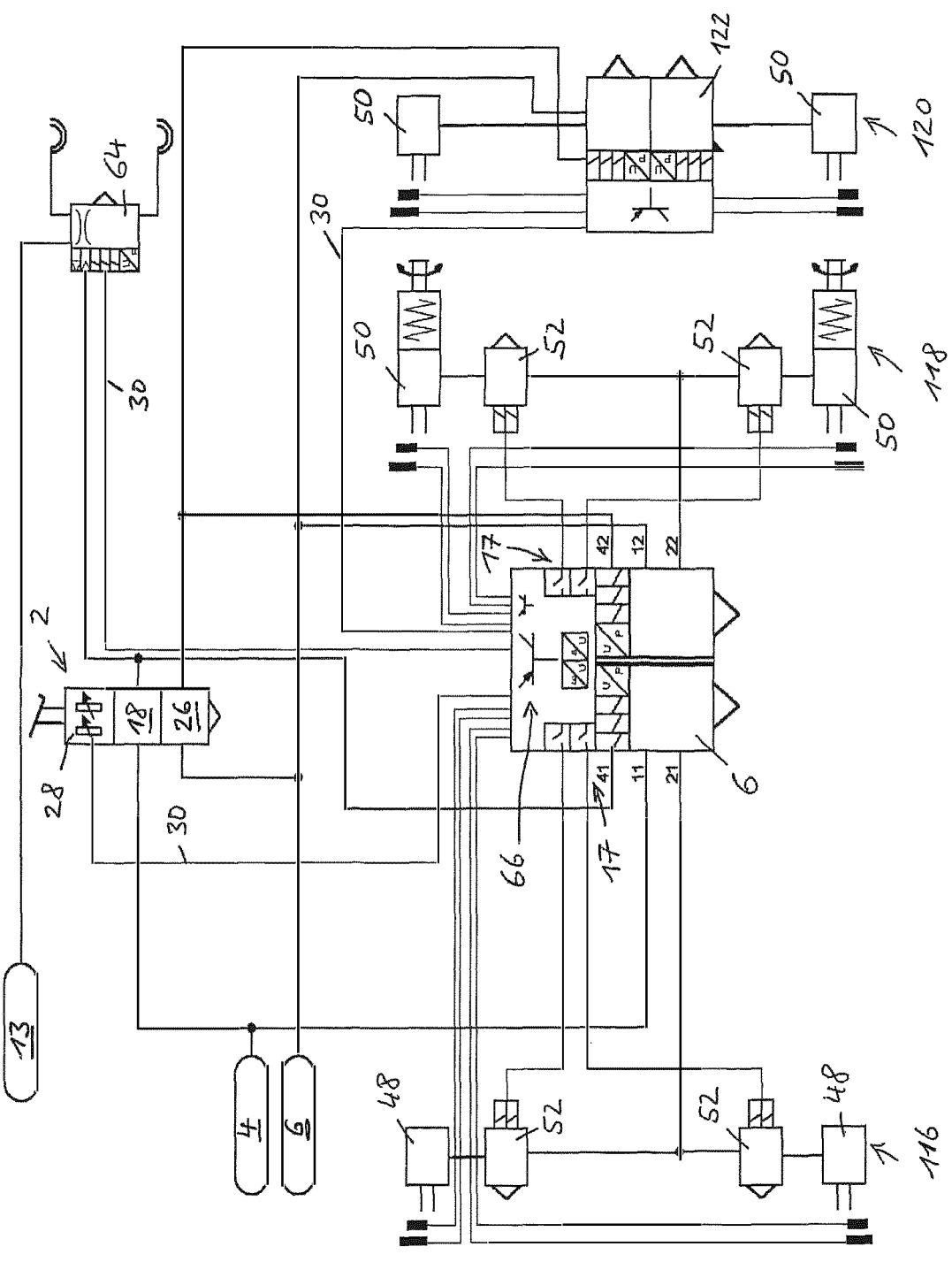
FIG. 7 shows a schematic circuit diagram of an electro-pneumatic service brake installation of a commercial vehicle, having a central pressure control module according to a further embodiment of the invention for a 6×2 vehicle.

The circuit diagram of a further embodiment of an electro-pneumatic service brake installation, for example for a 6×2 vehicle, which is based on the central pressure control module 16 is shown in FIG. 7. Apart from the second axle 118 as the first rear axle, a further axle 120 is again provided as a second rear axle, for example, wherein the brake pressure in the wheel brake cylinders on the second rear axle 120 is controlled by a further, for example two-channel, pressure control module 122 which by way of two specific brake pressure nominal values that are assigned to the further axle 120 is controlled by the central electronic brake control apparatus 66 of the central pressure control module, wherein the additional two-channel pressure control module 122 adjusts in a side-wise manner the respective predefined brake pressure nominal value, here for example for the wheel brake cylinders on the right side and for the wheel brake cylinders on the left side of the further axle 120, in each case in one pressure control channel (right, left). By virtue of the ABS pressure control valves 52 which are provided on the second axle (first rear axle) 118, controlling/regulating the brake pressures in a side-individual manner is furthermore also possible on the second axle 118.

Figure 8:
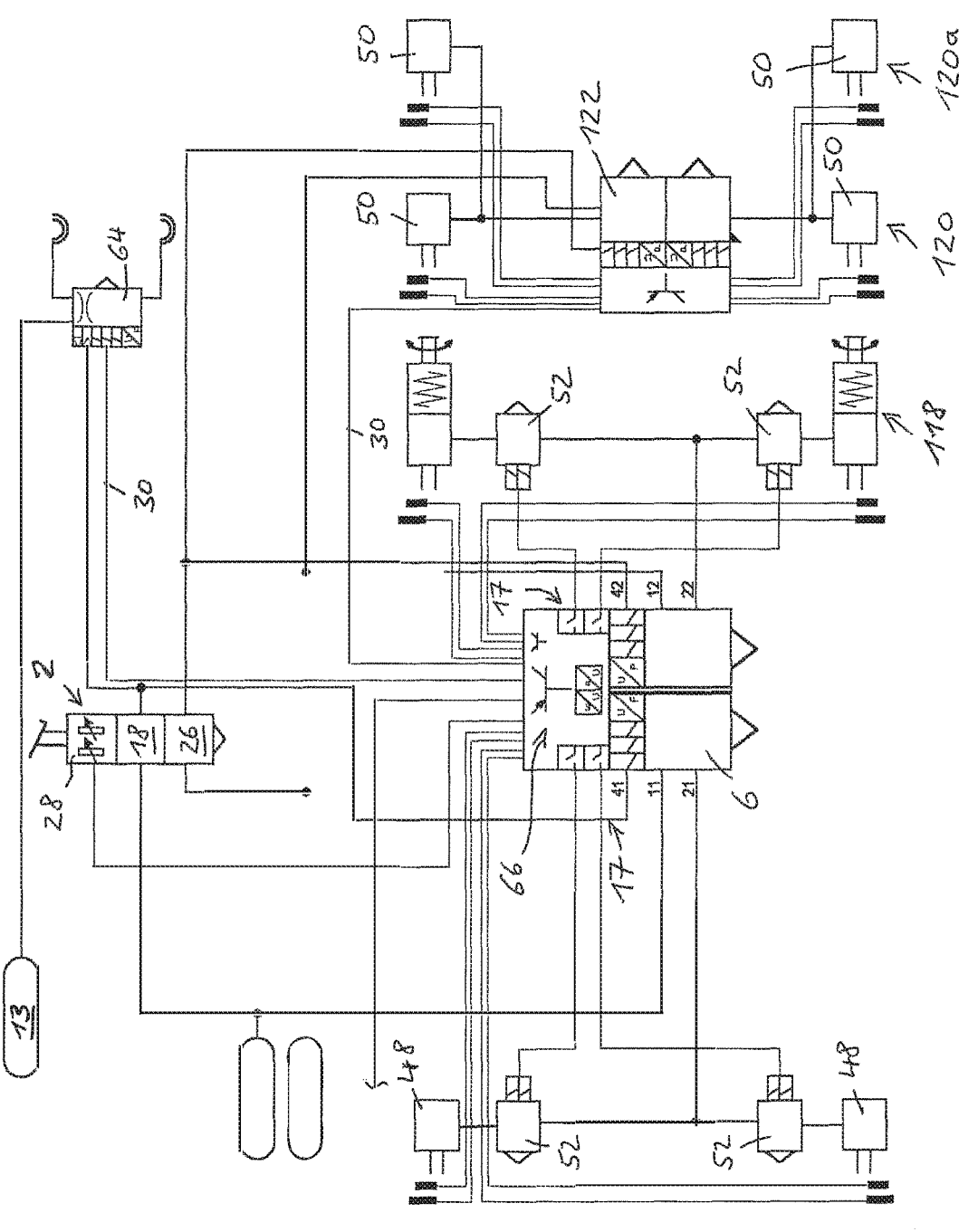
FIG. 8 shows a schematic circuit diagram of an electro-pneumatic service brake installation of a commercial vehicle, having a central pressure control module according to a further embodiment of the invention for an 8×8 vehicle.

The circuit diagram of a further embodiment of an electro-pneumatic service brake installation, for example for an 8×8 vehicle, which is based on the central pressure control module 16 is shown in FIG. 8. Apart from the second axle 118 as the first rear axle herein, a first further axle 120 is again provided as the second rear axle, for example, and a second further axle 120a is provided as the third rear axle, wherein the brake pressure in the wheel brake cylinders on the second rear axle 120 and also on this third rear axle 120a is again controlled by a further, for example two-channel, pressure control module 122 which by way of two specific brake pressure nominal values that are assigned to the second rear axle 120 and to the third rear axle 120a is controlled by the central electronic brake control apparatus 66 of the central pressure control module, wherein the additional two-channel pressure control module 122 adjusts in a sidewise manner the respective predefined brake pressure nominal value, here in an exemplary manner for the wheel brake cylinders on the right side and for the wheel brake cylinders on the left side of the second and the third rear axle 120, 120a, in each case in one pressure control channel (right, left). By virtue of the ABS pressure control valves 52 which are provided on the second axle (first rear axle) 118, side-individual controlling/regulating of the brake pressures is furthermore also possible on the second axle 118 (first rear axle).

Figure 9:
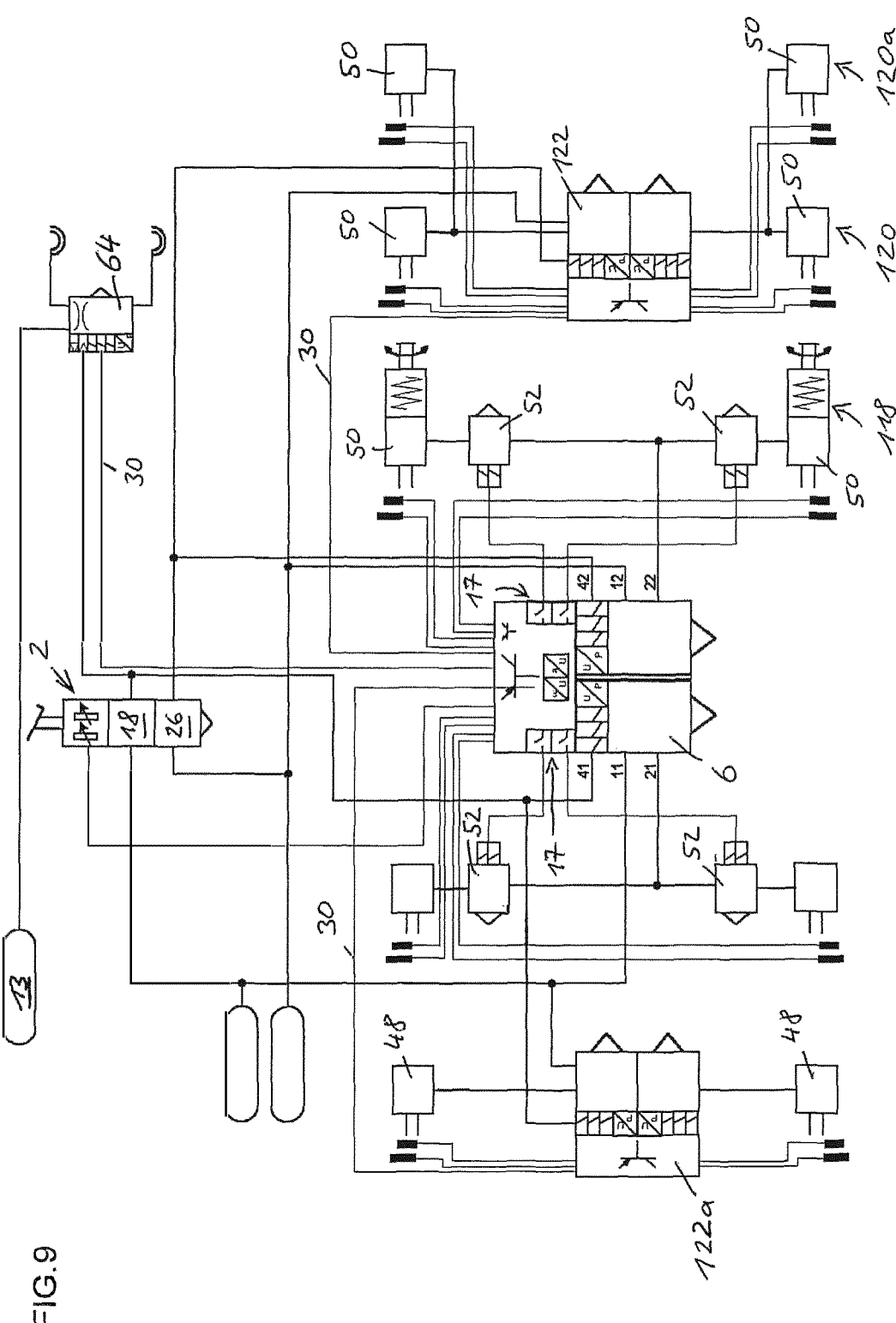
FIG. 9 shows a schematic circuit diagram of an electro-pneumatic service brake installation of a commercial vehicle, having a central pressure control module according to a further embodiment of the invention for a 10×10 vehicle.

The circuit diagram of a further embodiment of an electro-pneumatic service brake installation, for example for a 10×10 vehicle, which is based on the central pressure control module 16 is shown in FIG. 9. As opposed to FIG. 9, a second further, for example 2-channel, pressure control module 116a is provided for a further front axle 116a, wherein the brake pressures in the right and left wheel brake cylinders of the further front axle 116a are able to be controlled in a side-wise manner on account thereof.

Figure 10:
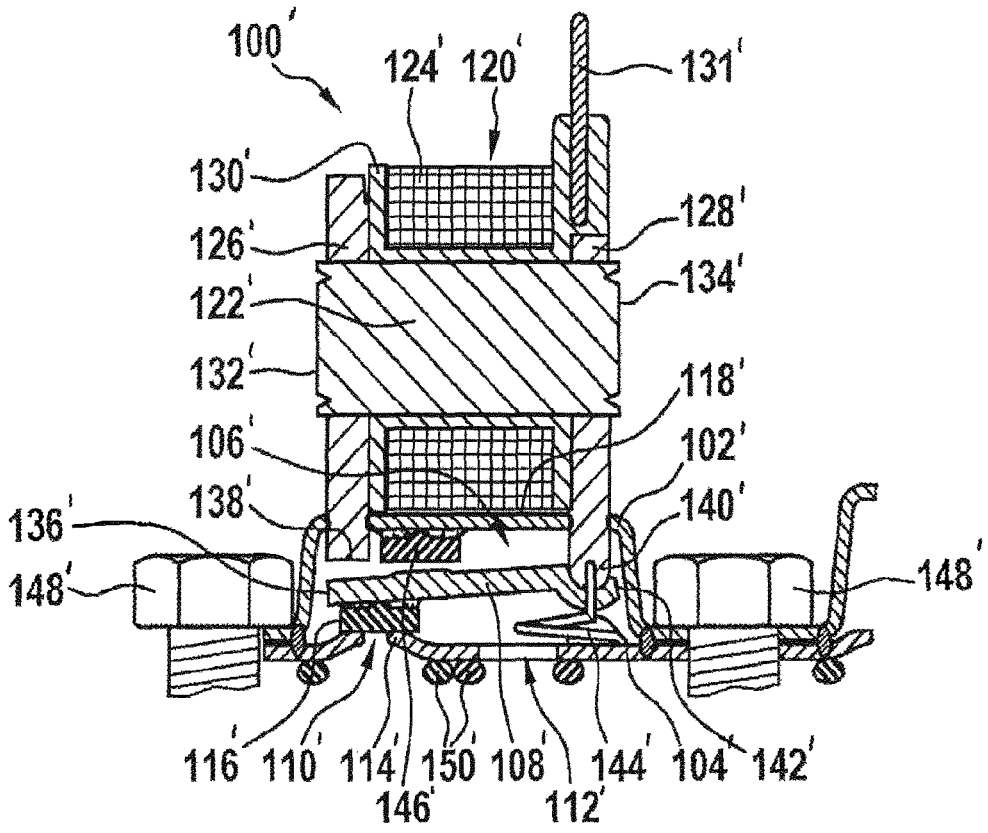
FIG. 10 shows a schematic sectional illustration of a tilting armature valve, as is used individually or in multiples as an electro-magnetic valve in an electro-magnetic valve installation of the central pressure control module.

At least one electro-magnetic valve (inlet valve 72, inlet valve 74, outlet valve 76, outlet valve 78) of the first electro-magnetic valve installation 68 and/or of the second electro-magnetic valve installation 70 may be formed by a tilting armature valve 100' which is illustrated in a schematic cross-sectional illustration in FIG. 10.

The tilting armature valve 100' has a half shell 102' which is closed in a fluid-tight manner by a cover element 104' so as to form a valve chamber 106'. A tilting armature 108' from a magnetically conducting material is disposed in the valve chamber 106'. The tilting armature 108' is mounted so as to be rotatable between a closing position and an opening position. The tilting armature 108' in 1 is situated in the closing position. The cover element 104' has a control aperture 110' and a passage 112'. Compressed air can be directed through the valve chamber 106' by way of the control aperture 110' and the passage 112'. The cover element 104 in FIG. 10 is illustrated in the region of the control aperture 110', having a concavity which functions as a valve seat 114'. A sealing element 116', which in the closing position shown in FIG. 10 bears on the valve seat 114' and thus closes the control aperture 110' in a fluid-tight manner, is fastened on the lower side of the tilting armature 108' that faces the cover element 104'.

A coil installation 120' for activating the tilting armature 108' is disposed on a base 118' of the half shell 102' that lies opposite the cover element 104'. The coil installation 120' comprises a magnetically conducting coil core 122', a magnetic coil 124' being wound about the latter. The coil installation 120' is placed on the base 118' so as to lie outside the valve chamber 106' such that the coil core 122' in the longitudinal direction extends so as to be substantially parallel to the base 118'. The coil installation 120' serves for switching the tilting armature 108' between the opening position and the closing position.

According to the exemplary embodiment shown in FIG. 10, the coil installation 120' comprises a first lateral wall 126' and a second lateral wall 128' from a magnetically conducting material. The coil 124' is wound about a coil carrier 130' which is situated between the two lateral walls 125', 128', wherein the coil core 122' is routed through the coil carrier 130'. A connector contact 131' for electrically contacting the coil 124' is integrated in the coil carrier 130'. Furthermore, a first end 132' of the coil core 122' protrudes through an opening in the first lateral wall 125', and a second and 134' of the coil core 120' protrudes through an opening in the second lateral wall 128'. Depending on the embodiment, the two ends 132', 134' can be connected to the respective lateral wall in a force-fitting, form-fitting or materially integral manner.

The base 118' in a region that lies opposite a first armature end 136' of the tilting armature 108' has a first slot through which an end portion 138' of the first lateral wall 125' that faces the base 118' is routed. The end portion 138' that is situated in the valve chamber 106' thus lies opposite the first armature end 136'. In the closing position, the end portion 138' is separated from the first armature end 136' by an air gap. In the manner analogous thereto, an end portion 140' of the second lateral wall 128' that faces the base 118' is routed through a second slot in the base 118', wherein the second slot is configured in the region of the base 118' that lies opposite a second armature end 142' of the tilting armature 108'. The end portion 140' thus lies opposite the second armature end 142'. The lateral walls 125', 128' in the region of the slots are connected to the base 118' in a fluid tight manner by a suitable joining method, for instance by laser welding or an adhesive bonding.

According to this exemplary embodiment, the sealing element 116' in the region of the first armature end 136' is adhesively bonded to the tilting armature 108'. The second armature end 142' is shaped having a groove which by a spring 144' anchored to the cover element 104' is pushed against the end portion 140'. The end portion 140' is shaped so having a mating contour that corresponds to a contour of the groove, more specifically having a rounded feature on account of which mounting of the tilting armature 108' so as to be rotatable about the end portion 140' is enabled. The spring 144' can furthermore be configured for impinging the rotatably mounted tilting armature 108' which serves as a valve support with a torque that acts in a direction of the closing position such that the sealing element 116' in the closing position is pushed against the valve seat 114'. In order for the tilting armature 108' to be moved to the closing position, a current flowing through the coil installation 120' is interrupted, for example, such that no magnetic force, or only a minor residual magnetic force, acts on the tilting armature 108'. The tilting armature 108' herein is pushed into the closing position by the spring 144'. In order for the tilting armature 108' to be moved to the opening position, the coil installation 120' can be switched on. On account thereof, a magnetically attracting force acts on the first armature end 136', this magnetically attractive force being greater than a spring force exerted on the tilting armature 108' by the spring 144'.

A damper element 146' which according to this exemplary embodiment is fastened to a portion of the base 118' that lies opposite the tilting armature 108' is disposed between the end portions 138', 140' that are situated in the valve chamber 106'. The damper element 146' can be adhesively bonded to the base 118', for example. The damper element 146' serves as an elastically deformable detent for the tilting armature 108'. Oscillations of the tilting armature 108', such as can be initiated by impacts or shocks, for example, or in a rapid movement of the tilting armature 108 to the opening position, can be prevented by the damper element 146. According to an exemplary embodiment described further below, the damper element 146' can be implemented as a damper cushion, and the sealing element 116' as a valve cushion from a cost-effective sheet metal cup having a valve rubber vulcanized therein as a sealing or damping material, respectively, wherein the damper cushion and the valve cushion can be of identical construction.

On account of the damper element 146' and the sealing element 116' being adhesively bonded, loss angles emanating from individual tolerances can be compensated for; that is to say that a component tolerance can be increased by adhesively bonding the damper element 146' and the sealing element 116'.

The solenoid valve 100' having a tilting armature 108' (tilting armature valve) shown in FIG. 10 offers the advantage of a robust, simple fundamental construction as well as a low tendency toward exciting oscillations in components that are adjacent to the central pressure control module 16, such as in particular the yaw rate sensor 125 which in this instance has a lower tendency toward measuring errors in the yaw rate. Moreover, the tilting armature valve 100' offers better temperature resistance since the solenoid in the form of the coil installation 120' can be disposed outside the valve chamber 106'. For example, the tilting armature valve 100' can be installed in the module housing 92 by a clamping screw fitting 148' (FIG. 2). The clamping screw fitting 148' can be locked in relation to being released by a dry adhesive. A contact region between the cover element 104' and the housing in the region of the control aperture 110' and the passage 112' can be sealed in a fluid-tight manner by O-rings 150'. As can be seen from FIG. 10, all pneumatic connectors of the tilting armature valve 100' are situated on a lower side of the tilting armature valve 100' that lies opposite the coil installation 120'. This enables a particularly simple installation of the tilting armature valve 100'.

According to the embodiments of FIG. 11 to FIG. 21, the central pressure control module 16 can include oscillation-decoupling arrangement/apparatus for at least partially decoupling the yaw rate sensor 125 or the acceleration sensor 125a, respectively, from oscillations or impact sound to which the circuit board 94, or components of the central pressure control module 16 that are connected to said circuit board 94, is/are exposed during operation.

Figure 11:
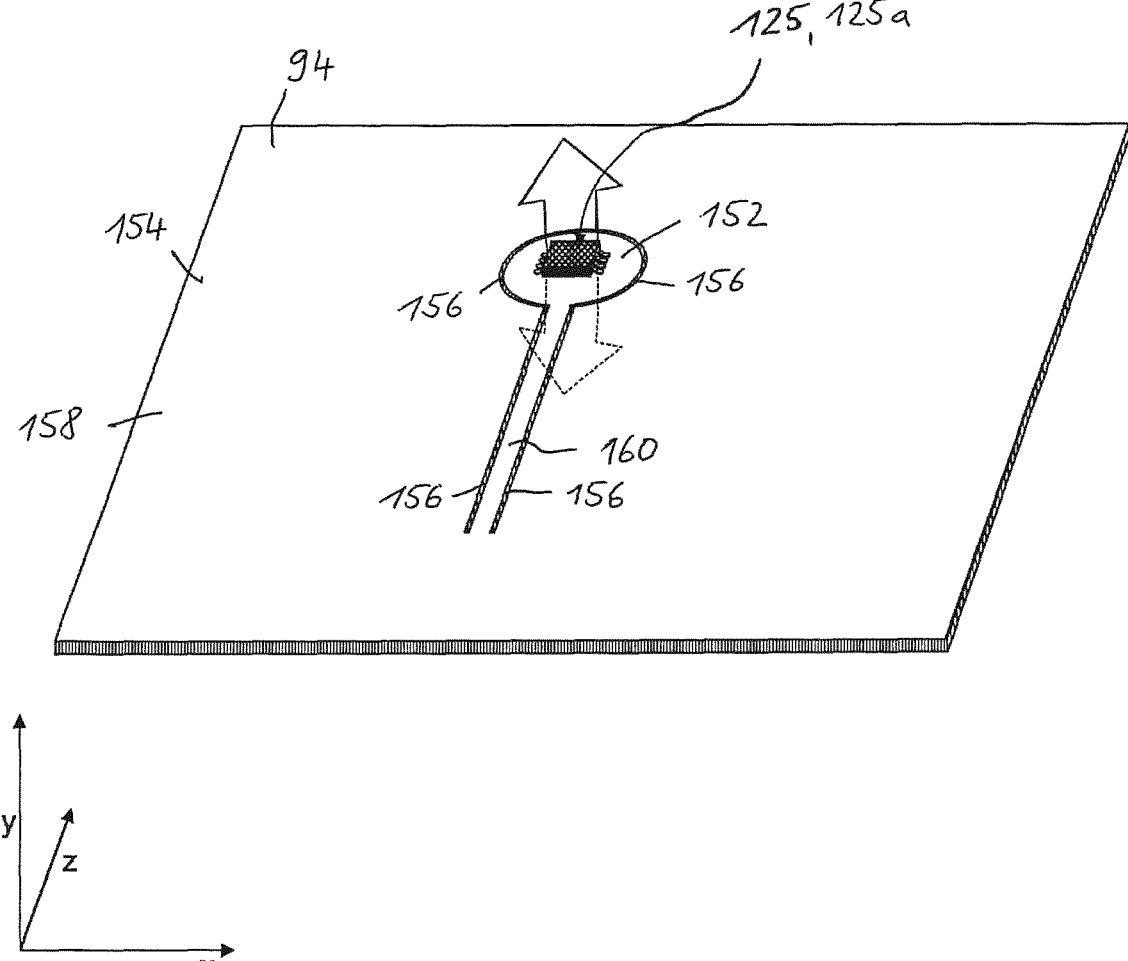
FIGS. 11-21 show schematic illustrations of oscillation-decoupling arrangements/apparatuses according to example embodiments of the present invention.
Figure 12:
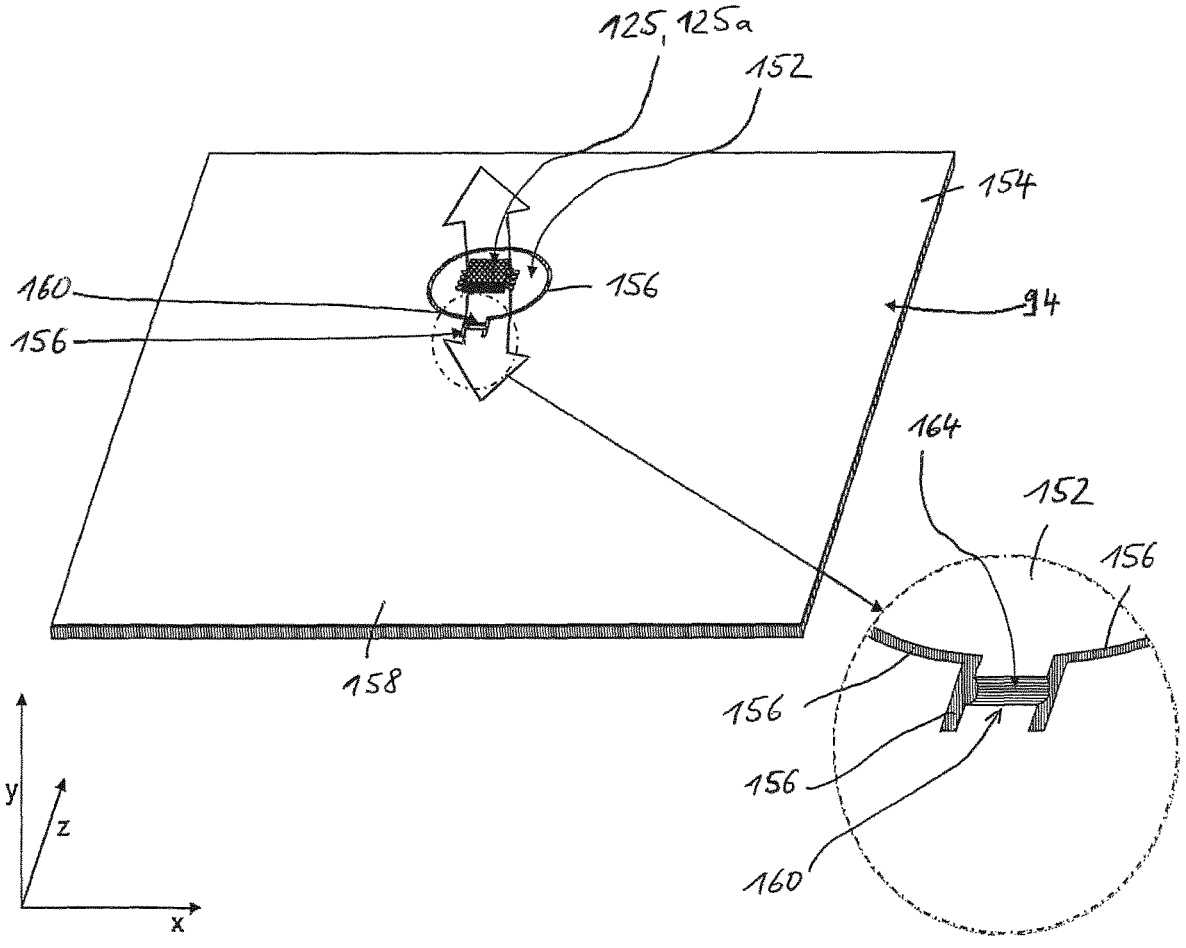

The oscillation-decoupling arrangement/apparatus here may comprise a decoupling portion 152 of a circuit board body 154 of the circuit board 94, the yaw rate sensor 125 being held or disposed on said decoupling portion 152. The decoupling portion 152 of the circuit board body 154 herein is separated from the remainder of the circuit board body 158 of the circuit board body 154, with the exception of at least one circuit board bridge portion 160 which connects the decoupling portion 152 to the remainder of the circuit board body 158, by at least one clearance 156 that partially or completely penetrates the circuit board body 154 of the circuit board 94, as is shown in FIG. 11, for example.

In this instance, at least one electric connection between the yaw rate sensor 125 and the electric and electronic components on the remainder of the circuit board body 158 is drawn along the circuit board bridge portion 160, said electric connection directing the output signals of the yaw rate sensor 125 to the electric and electronic components in order for the driving dynamics or driving stability control to be carried out.

As is shown in the embodiments as per FIG. 11 to FIG. 21, such a clearance 156 is composed of at least one slot in the circuit board body 154, said slot at least partially surrounding the decoupling portion 152 with the exception of the at least one circuit board bridge portion 160. Two straight or curved slots which run in parallel herein can in particular be provided as a clearance 156 in the circuit board body 154 (FIG. 11 to FIG. 17).

The coordinates X, Y and Z in FIGS. 11 to 21 symbolize degrees of translatory freedom and, as imaginary rotation axes also degrees of the rotary freedom, of the decoupling portion 152 on which the yaw rate sensor 125 is disposed. The slots 156 in this instance permit mounting of the decoupling portion 152 conjointly with the yaw rate sensor 125 so as to be sprung relative to the remainder of the circuit board body 158 in the Y direction, for example, that is to say perpendicular to the plane of the circuit board body 158 (FIG. 11, FIG. 12, FIG. 13, FIG. 14) and/or in the X or Z direction (FIG. 15, FIG. 16), that is to say in the plane of the circuit board body 158. Additionally, the slots 156 can also enable a rotatable mounting of the decoupling portion 152 so as to be sprung and oscillation-damped in relation to the remainder of the circuit board body 158, as is indicated by the arrows in FIG. 17, FIG. 18 and FIG. 19.

Figure 21:
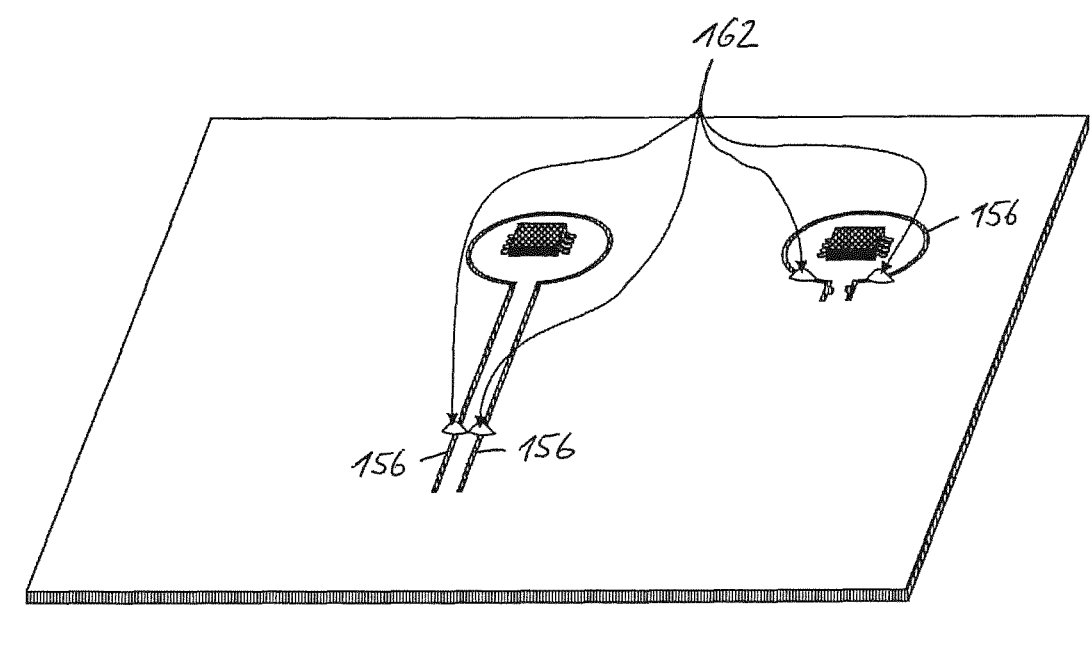

For even better damping of oscillations of the decoupling portion 152 conjointly with the yaw rate sensor 125 in relation to the remainder of the circuit board body 158, at least one slot 156 can also be at least partially filled, or filled at least in portions, with a damping mass 162 (FIG. 21).

Figure 13:
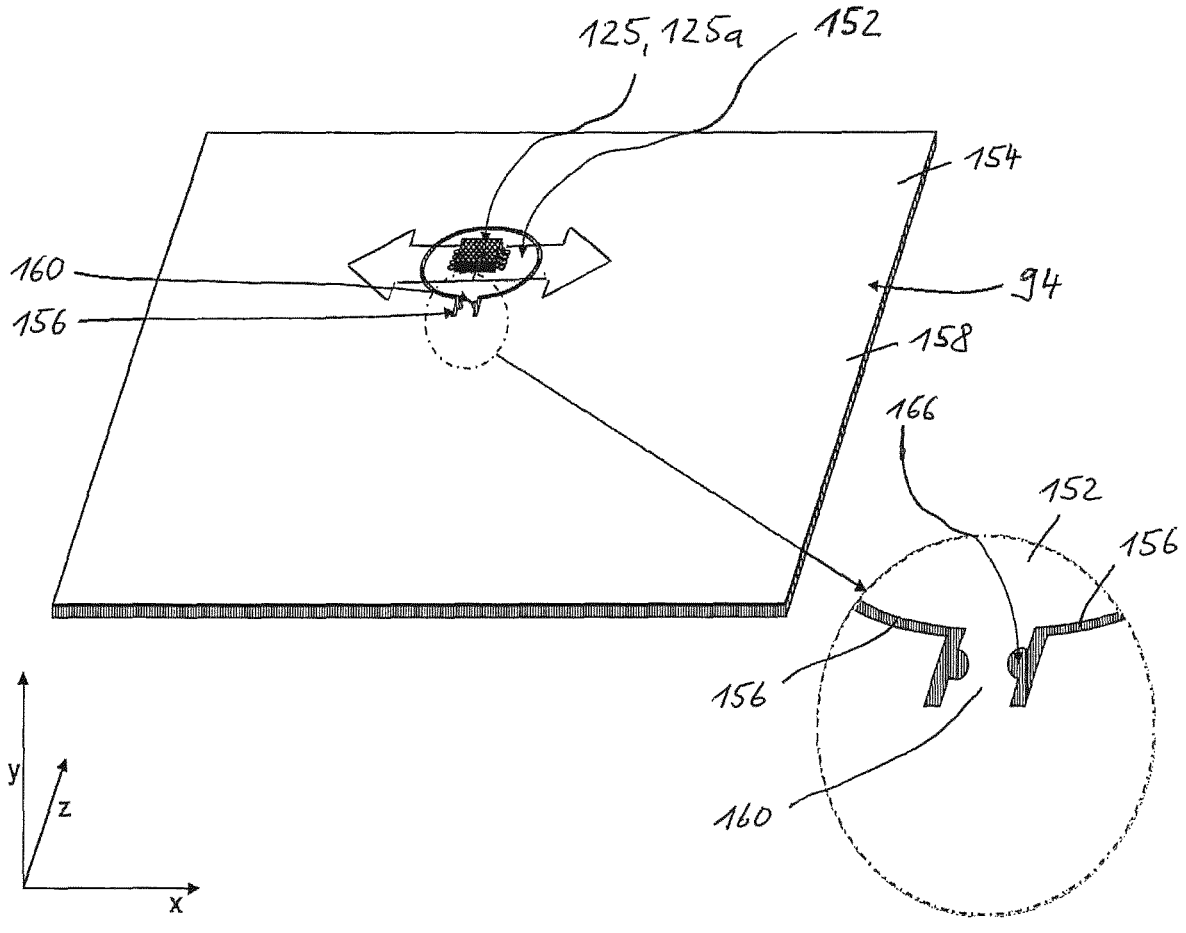
Figure 14:
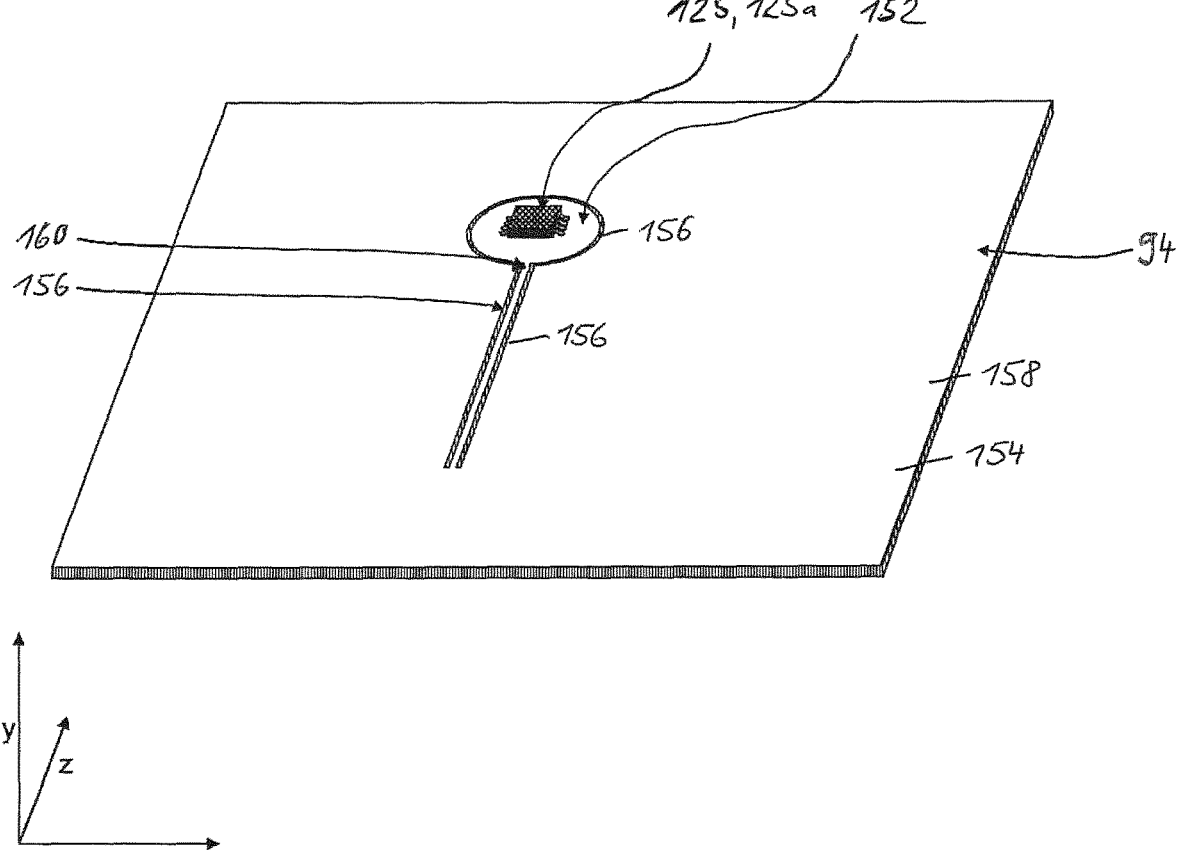
Figure 15:
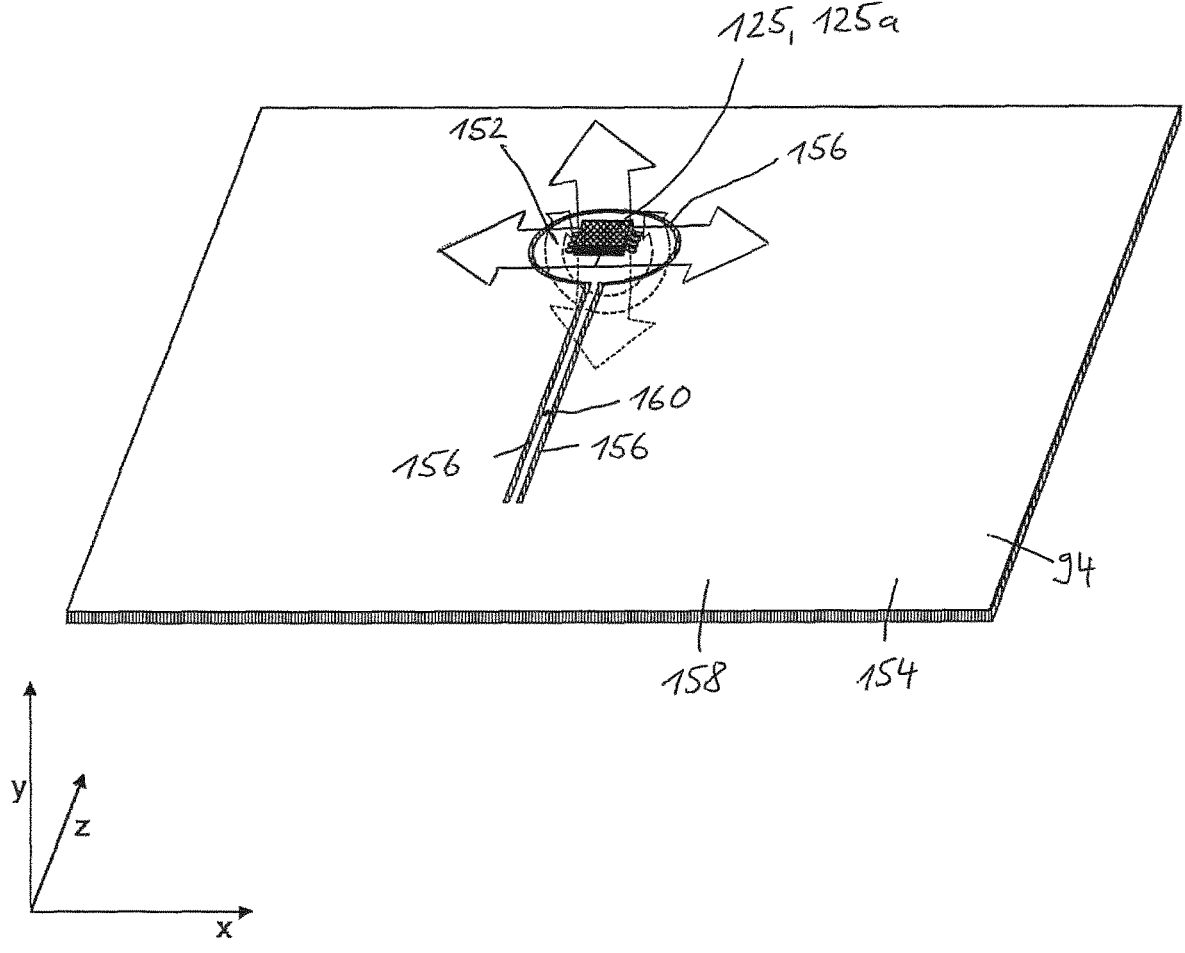
Figure 16:
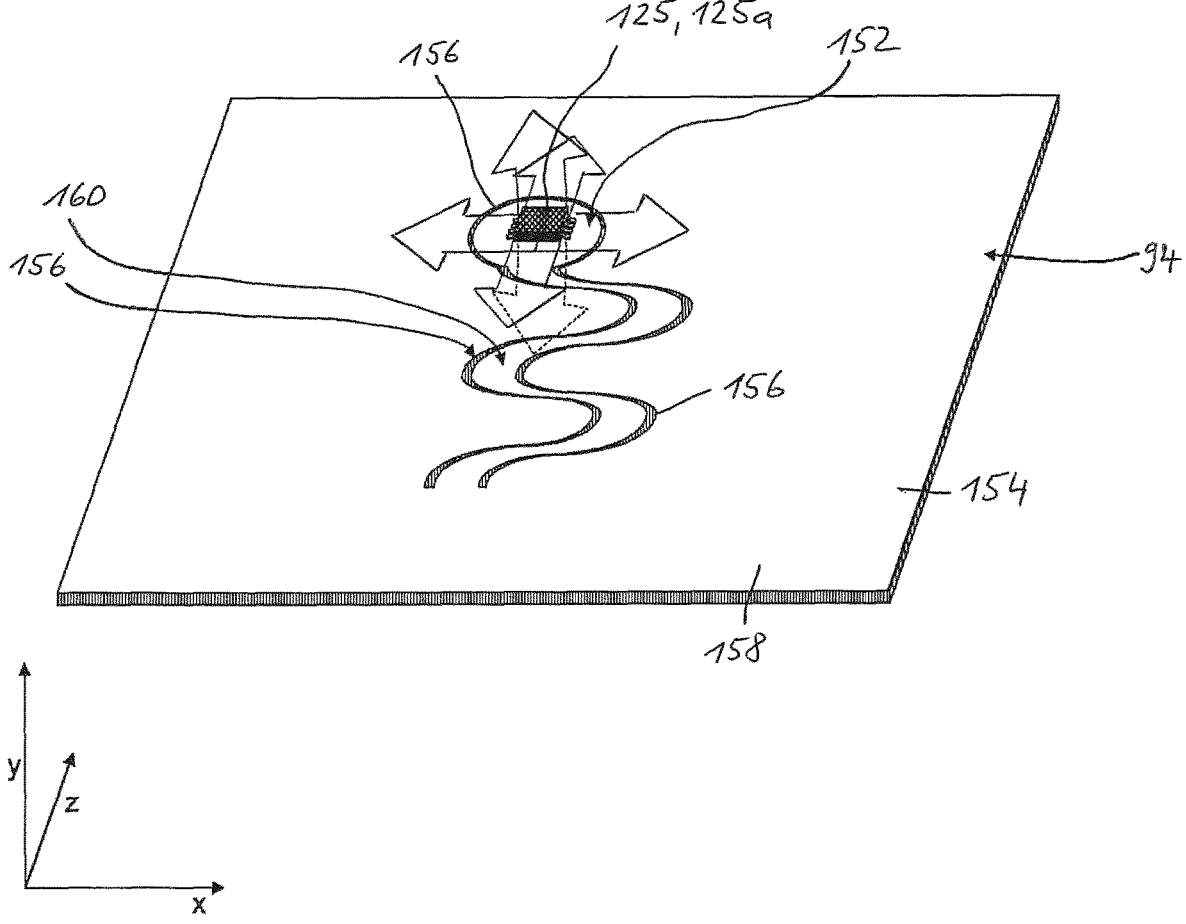
Figure 17:
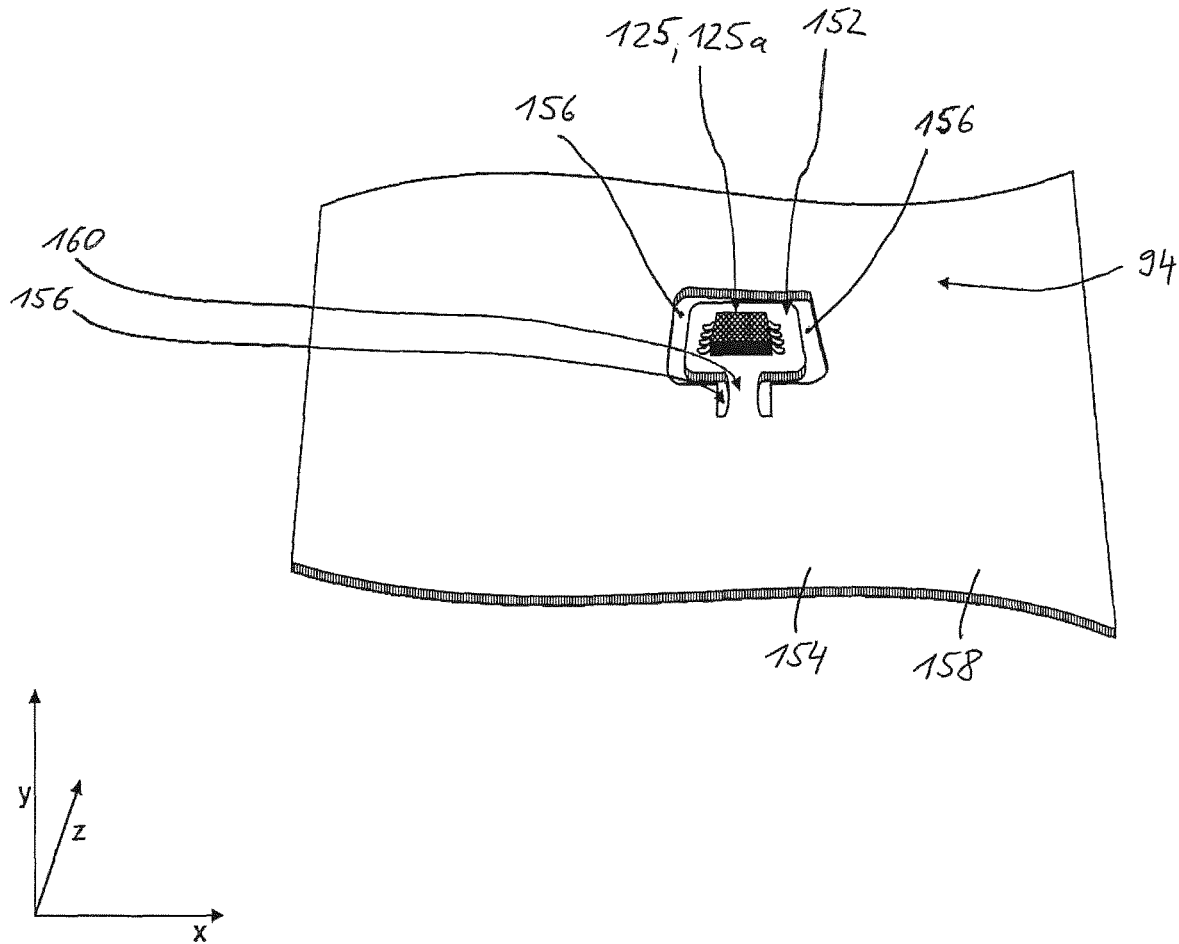
Figure 18:
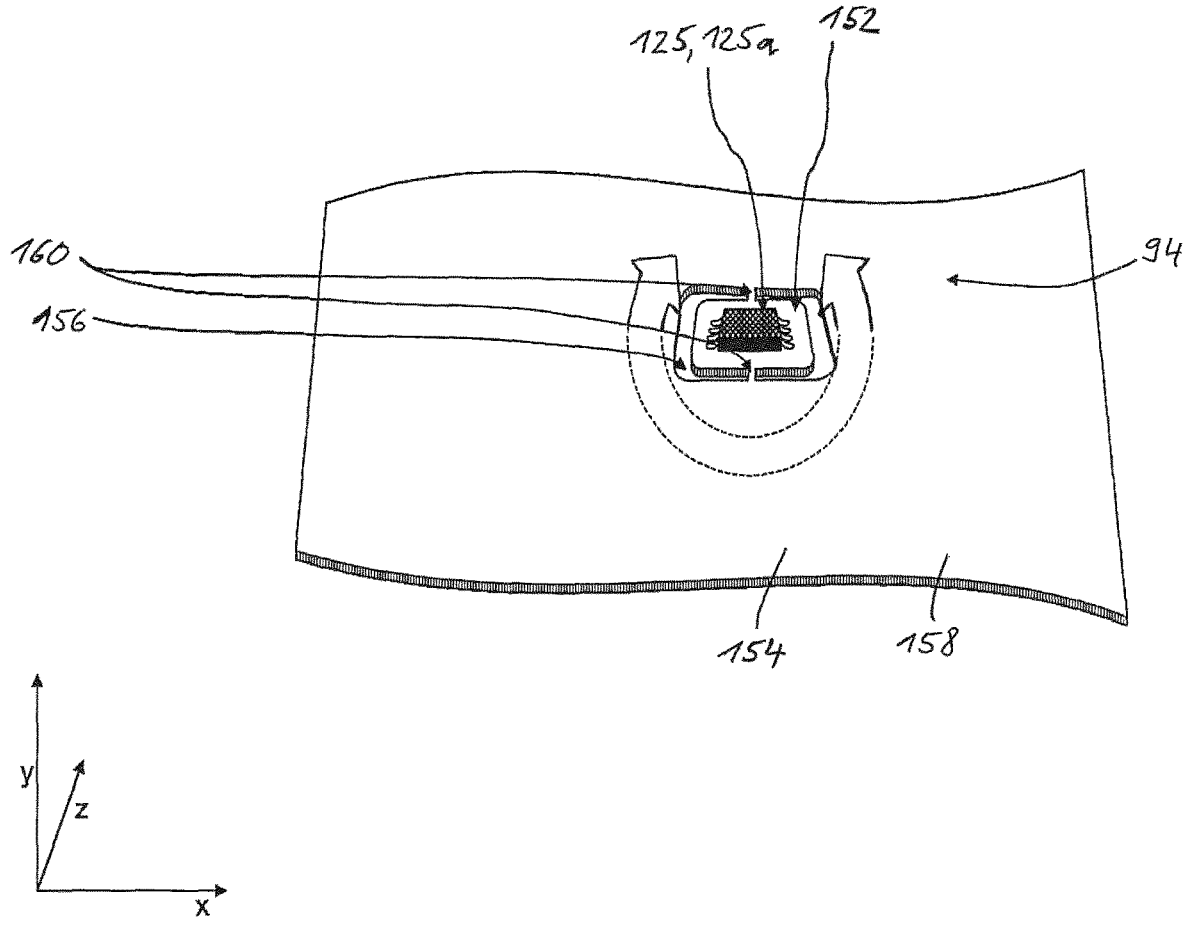
Figure 19:
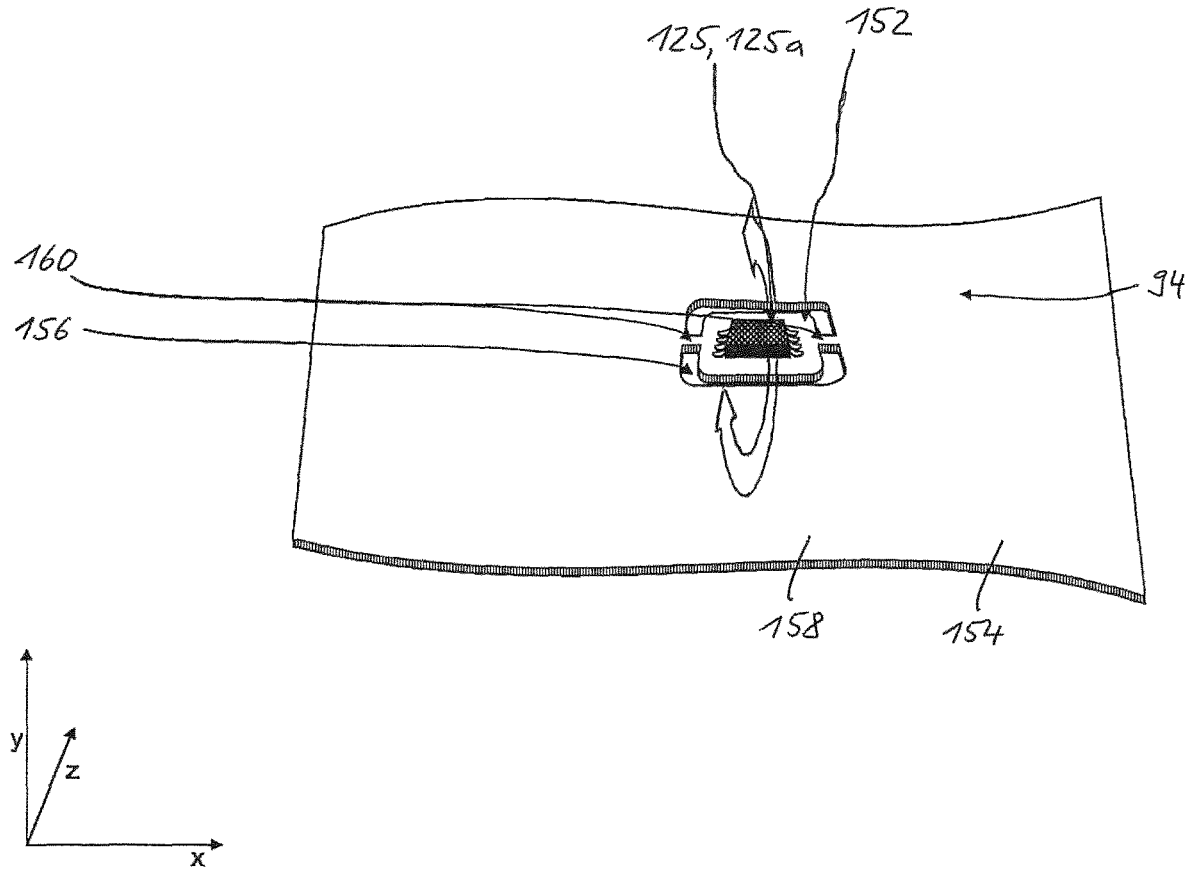
Figure 20:
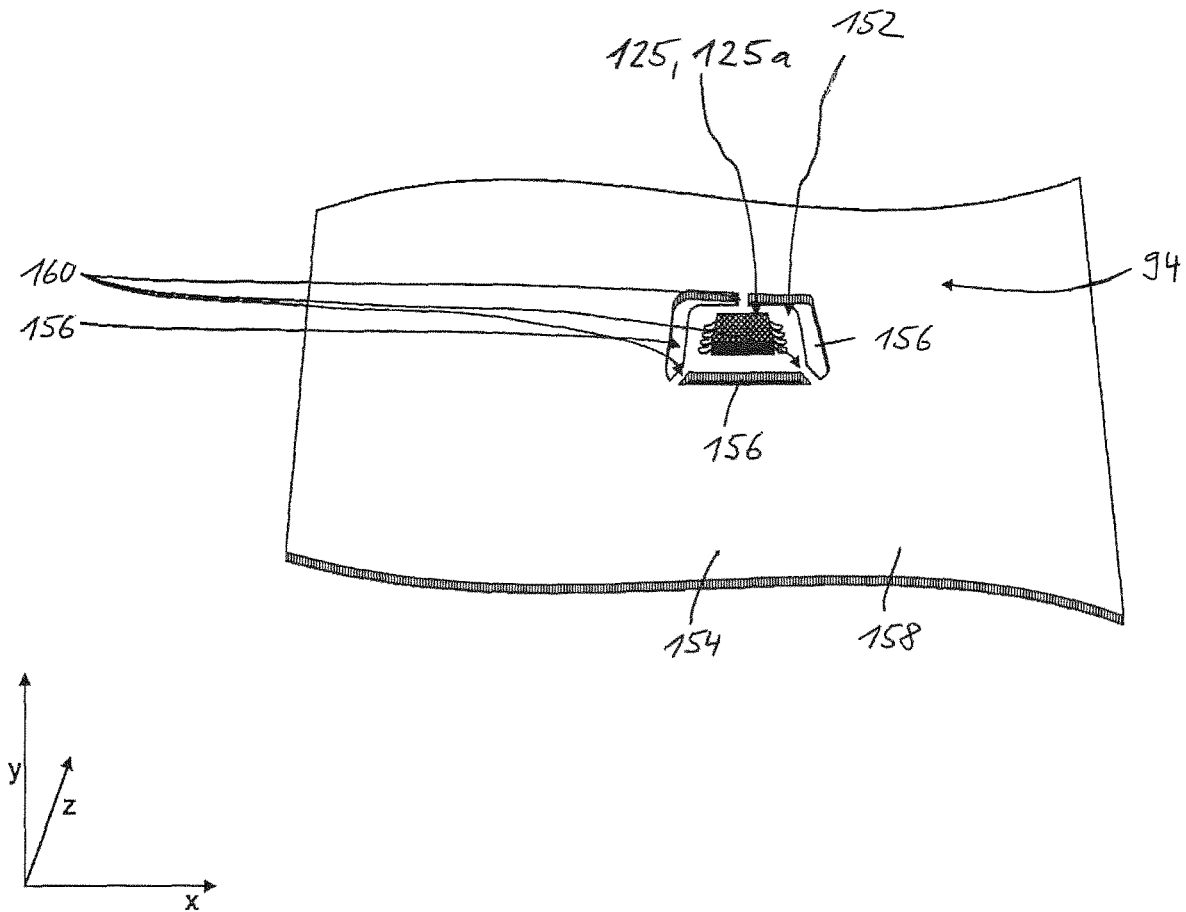

Additionally or alternatively, the circuit board bridge portion 160 can at least in portions have a smaller thickness than the remainder of the circuit board body 154 and/or the decoupling portion 152, for example in that the circuit board bridge portion 160, when viewed perpendicularly to the plane of the circuit board body 154, is provided with a transverse groove 164 (FIG. 12), or in that the circuit board bridge portion 160, when viewed in the plane of the circuit board body 154, is provided with at least one lateral notch that weakens the cross section (FIG. 13).

More than only one circuit board bridge portion 160, for example two circuit board bridge portions 160, can also be provided (FIG. 18, FIG. 19, FIG. 20) by way of which the decoupling portion 152 conjointly with the yaw rate sensor 125 in this instance is resiliently held on the remainder of the circuit board body 158.

A desired rotary or translatory resilience of the decoupling portion 152 conjointly with the yaw rate sensor 125 in relation to the remainder of the circuit board body 154 can be achieved in this instance by a selective or suitable disposal and configuration of the at least one circuit board bridge portion 160 and the at least one clearance 156, this resulting in decoupling the oscillations of the yaw rate sensor 125 from the remainder of the circuit board body 154 and thus also from oscillation-exciting parts and components such as, for instance, solenoid valves of the central pressure module 16 that can excite the circuit board 94 in terms of oscillations.

Figure 22:
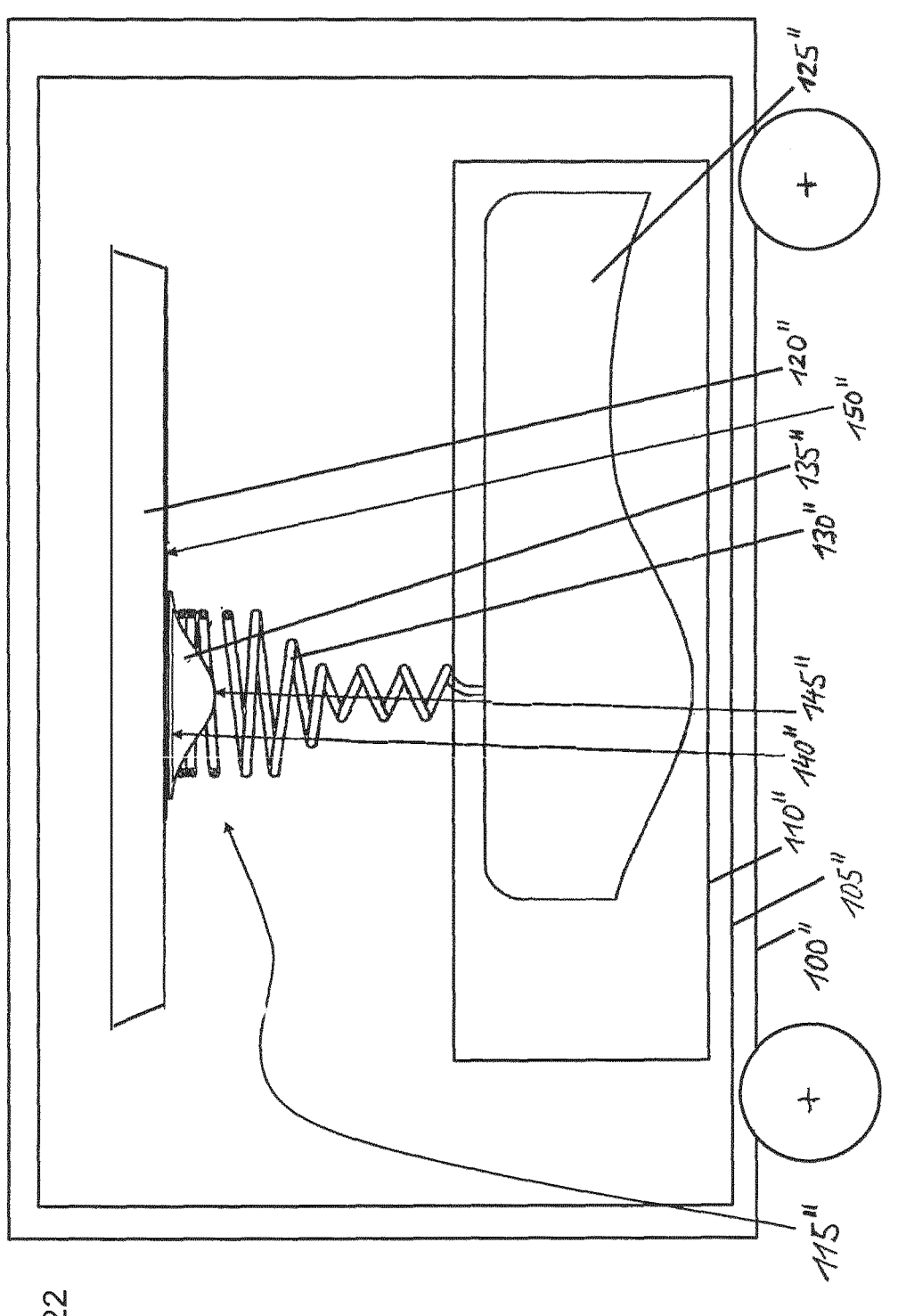
FIG. 22 shows a schematic illustration of a vehicle including a central pressure control module according to an example embodiment of the present invention.

According to a further embodiment of the central pressure control module 105" of FIG. 22, an electric contacting device 115" for resiliently electrically contacting the circuit board 120" by way of the yaw rate sensor 110" or by way of a solenoid valve 110" of the first or the second electromagnetic valve installation 68, 70 can be provided. This electric contacting device 115" comprises, for example, a spring element 130" which extends from the circuit board 120" up to the yaw rate sensor 110" or up to the solenoid valve 110" and by way of which the circuit board 120", on the one hand, and the yaw rate sensor 110" or the solenoid valve 110", on the other hand, are mutually mounted so as to be sprung in at least one degree of freedom of movement and at the same time are connected to one another in an electrically conducting manner. This sprung mounting is resilient and therefore ensures that oscillations are decoupled between the circuit board 120", on the one hand, and the yaw rate sensor 110" or the solenoid valve 110", on the other hand.

In one case, the transmission of oscillations from the solenoid valve 110", which causes oscillations on account of its operation, to the circuit board 120" is thus minimized or prevented, respectively, by the spring element 130". In this one case, for example the yaw rate sensor 125 is disposed directly on the circuit board 120", and in this instance exposed to oscillations which are caused by the solenoid valve 110" and lower because of the absent sprung connection between the circuit board 120" and the solenoid valve 110" such that said yaw rate sensor can deliver better measured results to the electric and electronic components on the circuit board 120", in order to carry out the driving dynamics or driving stability control.

In another case, the yaw rate sensor 110" is not situated directly on the circuit board but by way of the spring element 130" is resiliently connected to the circuit board 120", on the one hand, and connected to the latter in an electrically conducting manner, on the other hand, so as to transmit the sensor signals of said yaw rate sensor 110" to the electric and electronic components on the circuit board 120", said electric and electronic components then carrying out the routines of the driving dynamics or driving stability control system. In this other case, by way of the spring element 130" a transmission of oscillations of the circuit board 120", excited by a solenoid valve in the central pressure control module 105", for example, to the yaw rate sensor 110" is reduced such that the latter can in turn deliver improved measurement results.

The degree of freedom of movement enabled by the spring element 130" can in principle include a translatory and/order a rotary degree of freedom of movement.

The spring element 130" in the example of FIG. 22 is in an exemplary manner formed by a coil spring which is mounted so as to be clamped between the circuit board 120", on the one hand, and the yaw rate sensor 110" or the solenoid valve 110", on the other hand. Such a clamped mounting of the coil spring 130" can be implemented in that, for example, the circuit board 120" is fastened on a face of the housing part 102 (FIG. 2), configured as a cover of the central pressure control module 105", that points into the interior of the pressure control module 105", and the coil spring 130" which is centered on the circuit board 120" is compressed between the circuit board 120" and the yaw rate sensor 110" or the solenoid valve 110", respectively, when the cover is placed on top, for example.

More specifically, FIG. 22 shows a schematic illustration of the vehicle 100" having the central pressure control module 105" having a solenoid valve 110" or a yaw rate sensor 110" and having a contacting device 115" for resiliently electrically contacting the circuit board 120" by way of the solenoid valve 110" or by way of the yaw rate sensor 110". The circuit board 120", the yaw rate sensor 110", the solenoid valve 110" and the electric contacting device 115" are therefore parts of the central pressure control module 105".

The electric contacting device 115" has the spring element 130" and a circuit board fastening element 135". The spring element 130" in an exemplary manner here as a coil spring is helical and clamped between the circuit board 120" and a contact element 125" of the solenoid valve 110" or of the yaw rate sensor 110".

A circuit board fastening element 135" has a fastening surface 114" and a centering surface 145" which lies opposite the fastening surface 140", wherein the fastening surface 140" is fastened to the circuit board 120", and at least one portion of the centering surface 145" in an operative state of the contacting device 115" is disposed so as to protrude into an interior space portion of an interior space of the spring element 130" in order to guide and/or centre the spring element 130".

According to this exemplary embodiment, the centering surface 145" has an elevation or convexity which in the operative state protrudes into the interior space portion. According to this exemplary embodiment, the elevation or convexity of the circuit board fastening element 135" longitudinal extends across a longitudinal portion of a primary length of the interior space, wherein the longitudinal portion within a tolerance range from 1 to 20% deviation is $\frac{1}{5}^{th}$ of the length of the primary length. The primary length according to this exemplary embodiment corresponds to a spacing between the circuit board 120" and the contact element 125". According to this exemplary embodiment, a central axis or a longitudinal axis of the spring element 130" extends so as to be perpendicular to a primary surface of the circuit board 130" and a primary surface of the contact element 125".

A first spring portion of the spring element 130" has according to this exemplary embodiment a first radius, and a second spring portion of the spring element 130" has a second radius, wherein the first radius is larger than the second radius. The second spring portion according to this exemplary embodiment is disposed so as to face the contact element 125", and the first spring portion so as to face the circuit board 120". In the operative state of the contacting device 115" shown here, the circuit board fastening element 135" is disposed as a detent for a spring end of the spring element 130".

The contact element 125" according to this exemplary embodiment is shaped as a magnet and/or a coil wire and/or a magnet housing of the solenoid valve 110" and/or as a sensor housing of the yaw rate sensor 110". According to this exemplary embodiment, the circuit board fastening element 135" is fastened to the circuit board 120" in a materially integral manner, for example. The spring element 130" according to this exemplary embodiment is fastened to the contact element 125". According to this exemplary embodiment, the spring end is shaped as a free end of the first spring portion and is contacted by an encircling circumferential peripheral portion of the centering surface 145" of the circuit board fastening element 135". A further spring end that lies opposite the spring end is according to this exemplary embodiment shaped as a free end of the second spring portion and fastened to the contact element 125". According to this exemplary embodiment, the further spring end is soldered to a coil wire of the contact element 125".

Exemplary embodiments of the contacting device 115" proposed here will be described once more in other words hereunder.

The contacting device 115" is configured so as to enable electric contacting of a solenoid valve 110" or alternatively of a sensor 110" that is configured for example as a yaw rate sensor by way of a circuit board 120".

The, for example helical, spring element 130 which can also be referred to as a coil spring, according to the exemplary embodiment shown in FIG. 22, is pushed against the circuit board fastening element 135" in the form of a conical hat. When assembling the contacting device 115" in the operative state shown here, the coil spring 130" is advantageously automatically centered thanks to the hat. A compensation of tolerances also takes place on account thereof. The spring element 130" in the operative state advantageously does not transmit any or hardly any impact sound and/or vibrations from the solenoid valve 110" to the circuit board 120" or from the circuit board 120" to the yaw rate sensor 110". The spring element 130" is advantageously fixed or at least centered and cannot travel in a lateral manner. No wear, or only minor wear, is thus created on or at the circuit board 120" and/or at the spring element 130". Even movements or micro movements of the components in relation to one another lead to hardly any wear. Moreover, no through contacts through the circuit board 120" in which intermediate layers would be penetrated are required thanks to the circuit board fastening element 135". According to this exemplary embodiment a conductor path 150" is disposed or impressed between the fastening surface 140" and the circuit board 120". According to this exemplary embodiment, the circuit board fastening element 135" comprises a metallic material and/or is soldered to the circuit board 150". According to one exemplary embodiment, the circuit board fastening element 135" is disposed so as to be soldered to the circuit board 120" by a soft-flow method such as reflow soldering.

The central pressure control module 105" of FIG. 22 is otherwise constructed like the previously described pressure control module 16, for example according to FIG. 2 or FIG. 4.

THE LIST OF REFERENCE SIGNS IS AS FOLLOWS

1 Service brake installation
2 Foot brake valve
4 First reservoir pressure vessel
5 Ventilation
6 Second reservoir pressure vessel
7 Ventilation
8 Air treatment module
9 First pressure control channel
10 Supply line
11 Second pressure control channel
12 Supply line
13 Third reservoir pressure vessel
14 Second reservoir connector
16 Central pressure control module
17 Output stages
18 First channel
20 Supply line
22 Supply line
24 First reservoir connector
26 Second channel
28 Electric channel
30 Data bus
32 Control line
34 Control line
36 Backup connector
38 Backup connector
40 Brake line
42 Brake line
44 First operating connector
46 Second operating connector
48 First service brake cylinders
50 Second service brake cylinders
52 ABS pressure control valve
54 Electric control line
56 Rotating speed sensors
58 Electric signal lines
60 Wear sensors
62 Electric signal lines
64 Trailer control module
66 Central electronic brake control apparatus
68 First electromagnetic valve installation
70 Second electromagnetic valve installation
72 Inlet valve
74 Inlet valve
76 Outlet valve
78 Outlet valve
80 Backup valve
82 Backup valve
84 Relay valve
86 Relay valve
88 Pressure sensor
90 Pressure sensor
92 Module housing
94 Circuit board
96 First, second and third communications ports
98 Plug contacts
100 Plug contacts
100' Tilting armature valve
100" Vehicle 102 Housing part
102' Half shell
104 Plug contacts
105" Central pressure control module
106 Plug contacts
106' Valve chamber
108 Pressure channel
108' Tilting armature
100" Vehicle
110 Pressure channel
110' Control aperture
110" Inertial sensor/solenoid valve
112 Housing part
112' Passage
114 Chassis
114' Valve seat
115" Contacting device
116 First axle
116' Sealing element
116a Second front axle
118 Second axle
118' Base
120 Further axle
120' Coil installation
120" Circuit board
120a Third rear axle
122 Further pressure control module
122a Further pressure control module
122' Coil core
124 Control line
124' Coil
125 Yaw rate sensor
125a Acceleration sensor
125" Contact element
126' First lateral wall
128 Circuit separator
128' Second lateral wall
130' Coil carrier
130" Spring element
131' Connector contact
132' First end
135" Circuit board fastening element
134' Second end
136' First armature end
138' End portion
140' End portion
140" Fastening surface
142' Second armature end
145" Centering surface
146' Damper element
148' Clamping screw fitting
150' O-ring
150" Conductor path
152 Decoupling portion
154 Circuit board body
156 Clearance/slot
158 Remainder of circuit board body
160 Circuit board bridge portion
162 Damping mass
164 Transverse groove
166 Notch

The invention claimed is:

1. An electro-pneumatic central pressure control module, comprising:

an electro-pneumatic central pressure control device hav- ing at least two-channels, embodied as a functional unit, for an electro-pneumatic service brake installation of a vehicle, having at least two pressure control channels which are electrically controllable in terms of a brake pressure;

wherein a) for each pressure control channel, a controlled service brake pressure for at least one service brake cylinder of the service brake installation is generated based on an operating air emanating from at least one compressed-air reservoir as a function of electric brake request signals of an electric channel of a foot brake valve; and wherein b) a first pressure control channel of the at least two electric pressure control channels that are able to be controlled as separate circuits controls a first service brake pressure in service brake cylinders on at least one first axle, and a second pressure control channel of the at least two electric pressure control channels that are able to be controlled as separate circuits controls a second service brake pressure in service brake cylinders on at least one second axle; and wherein c) the pressure control module has at least the following: at least one reservoir connector for connecting the at least one compressed-air reservoir; at least one first operating connector for connecting at least one service brake cylinder of the at least one first axle; at least one second operating connector for connecting at least one service brake cylinder of the at least one second axle; at least one first electric communications port for feeding the electric brake request signals;

and at least one ventilation; as well as at least one first voltage supply connector for supplying the pressure control module with an electric voltage; and wherein d) in the pressure control module:

d1) a central electronic brake control apparatus of the service brake installation is integrated, the central electronic brake control apparatus being configured such that the electronic brake control apparatus, as a function of an electric brake request signal that is present at the first electric communications port, for the first pressure control channel generates a first electric control signal, corresponding to a first nominal brake pressure, for a first electro-magnetic valve installation of the first pressure control channel; and for the second pressure control channel generates a second electric control signal, corresponding to a second nominal brake pressure, for a second electro-magnetic valve installation of the second pressure control channel that is independent of the first electromagnetic valve installation; and d2) the first electro-magnetic valve installation and the second electro-magnetic valve installation are integrated, wherein the first electro-magnetic valve installation, as a function of the first electric control signal from the reservoir pressure of the at least one compressed-air reservoir, modulates a first actual brake pressure at the first operating connector of the first pressure control channel; and the second electro-magnetic valve installation, as a function of the second electric control signal from the reservoir pressure of the at least one compressed-air reservoir, modulates a second actual brake pressure for the second operating connector of the second pressure control channel; and d3) at least one first pressure sensor and at least one second pressure sensor are integrated, wherein the first pressure sensor for a comparison with the first nominal brake pressure feeds into the central electronic brake control apparatus a first pressure measurement signal which represents the measured first actual brake pressure, and the second pressure sensor for a comparison with the second nominal brake pressure feeds into the central electronic brake control apparatus a second pressure measurement signal which represents the measured second actual brake pressure, wherein the central electronic brake control apparatus in this instance is furthermore configured such that the central electronic brake control apparatus for the first pressure control channel performs a reconciliation between the first actual brake pressure and the first nominal brake pressure, and for the second pressure control channel performs a reconciliation between the second actual brake pressure and the second nominal brake pressure and, as a function of this reconciliation, actuates the first and the second electromagnetic valve installation so that the first nominal brake pressure is present at the first operating connector, and the second nominal brake pressure is present at the second operating connector;

wherein:

e) the central electronic brake control apparatus is furthermore configured such that the central electronic brake control apparatus, as a function of output signals of at least one inertial sensor, feeds actuating signals into the first electro-magnetic valve installation and/or into the second electro-magnetic valve installation so as to carry out braking corresponding to a driving dynamics or driving stability control system by at least one service brake cylinder; and wherein f) the central electronic brake control apparatus has a circuit board which supports electric and electronic components, wherein routines at least for the brake pressure control and for the driving dynamics control are implemented in the electric and electronic components, wherein g) the at least one inertial sensor is disposed on the circuit board and is connected in an electrically conducting manner to at least some of the electric and electronic components on the circuit board such that the output signals of the at least one inertial sensor are able to be fed into the at least some electric and electronic components for the driving dynamics control to be carried out, and wherein h) the pressure control module has at least one third electric voltage supply connector for supplying a voltage to at least one trailer control module, and at least one third communications port for communicating with the at least one trailer control module, wherein the at least one trailer control module, with the aid of integrated electronic trailer brake control electronics, controls the brake pressure in service brake cylinders of a trailer, and wherein the central electronic brake control apparatus of the service brake installation, as a function of the electric brake request signals which are present at the first electric communications port, feeds into the at least one third communications port a fourth electric control signal, corresponding to a nominal brake pressure, for the at least one trailer control module so as to control the brake pressure in the service brake cylinders of the trailer that are connected to the at least one trailer control module.

2. The pressure control module of claim 1, wherein, for configuring pressure control channels having separate pneumatic circuits, a dedicated first reservoir pressure connector is provided for the first pressure control channel and a dedicated second reservoir pressure connector which is separate in terms of the first reservoir pressure connector is provided for the second pressure control channel, wherein at least one first compressed-air reservoir is able to be connected to the first reservoir pressure connector, and at least one second compressed-air reservoir which is separate in terms of the first compressed-air reservoir is able to be connected to the second reservoir pressure connector, wherein the pneumatic flow paths of the first pressure control channel, proceeding from the first reservoir pressure connector up to the first operating connector are configured so as to be pneumatically separate from the pneumatic flow paths of the second pressure control channel, proceeding from the second reservoir pressure connector up to the second operating connector.

3. The pressure control module of claim 1, wherein a first backup connector of a first pneumatic backup circuit, and a second backup connector of a second pneumatic backup circuit, are provided, wherein a first backup pressure which is emitted by the first compressed-air reservoir and supplied by a first pneumatic channel of the foot brake valve is able to be fed into the first backup connector, and a second backup pressure which is emitted by the second compressed-air reservoir and is supplied by a second pneumatic channel of the foot brake valve, is able to be fed into the second backup connector, wherein the brake pressures at the operating connectors are formed with the first backup circuit and the second backup circuit in the event of a failure or a malfunction of the electric pressure control channels that are able to be controlled as separate circuits.

4. The pressure control module of claim 3, wherein a first pneumatic backup flow path of the first backup circuit, proceeding from the first backup connector up to the first operating connector, is configured so as to be pneumatically separate in terms of a second pneumatic backup flow path of the second backup circuit, proceeding from the second backup connector up to the second operating connector.

5. The pressure control module of claim 4, wherein a first electro-pneumatic backup valve of the first electro-magnetic valve installation is disposed in the first pneumatic backup flow path, and a second electro-pneumatic backup valve of the second electro-magnetic valve installation is disposed in the second pneumatic backup flow path, wherein the electro-pneumatic backup valves are configured and actuated by the central electronic brake control apparatus such that the backup valves block the first and the second backup flow path in the case of intact electric pressure control channels, and activate the first and the second backup flow path in the event of an error or of a malfunction of the electric pressure control channels.

6. The pressure control module of claim 1, wherein the driving dynamics or driving stability control system includes at least one of the following controls: a driving stability control system (ESP); an anti-wheel lock control system (ABS); a traction control system (TCS); a rollover stability system (RPS); a control system for at least partially autonomous driving.

7. The pressure control module of claim 1, wherein the pressure control module includes oscillation-decoupling means for at least partially decoupling the at least one inertial sensor from oscillations or impact sound to which the circuit board or components of the central pressure control module that are connected thereto is/are exposed during operation.

8. The pressure control module of claim 7, wherein the oscillation-decoupling means include a decoupling portion of a circuit board body of the circuit board on which the at least one inertial sensor is held or disposed, wherein the decoupling portion by at least one clearance that partially or completely penetrates the circuit board body of the circuit board is separated from a remainder of the circuit board body of the circuit board with the exception of at least one circuit board bridge portion which connects, in the manner of a bridge, the decoupling portion to the remainder of the circuit board body, wherein at least one electric connection between the at least one inertial sensor and the electric and electronic components on the remainder of the circuit board body is routed along the at least one circuit board bridge portion, the electric connection directing the output signals of the at least one inertial sensor to the electric and electronic components for the driving dynamics control to be carried out.

9. An electro-pneumatic central pressure control module, comprising:

an electro-pneumatic central pressure control device having at least two-channels, embodied as a functional unit, for an electro-pneumatic service brake installation of a vehicle, having at least two pressure control channels which are electrically controllable in terms of a brake pressure;

wherein:

a) for each pressure control channel, a controlled service brake pressure for at least one service brake cylinder of the service brake installation is generated based on an operating air emanating from at least one compressed-air reservoir as a function of electric brake request signals of an electric channel of a foot brake valve; and wherein b) a first pressure control channel of the at least two electric pressure control channels that are able to be controlled as separate circuits controls a first service brake pressure in service brake cylinders on at least one first axle, and a second pressure control channel of the at least two electric pressure control channels that are able to be controlled as separate circuits controls a second service brake pressure in service brake cylinders on at least one second axle; and wherein c) the pressure control module has at least the following: at least one reservoir connector for connecting the at least one compressed-air reservoir; at least one first operating connector for connecting at least one service brake cylinder of the at least one first axle; at least one second operating connector for connecting at least one service brake cylinder of the at least one second axle; at least one first electric communications port for feeding the electric brake request signals;

and at least one ventilation; as well as at least one first voltage supply connector for supplying the pressure control module with an electric voltage; and wherein d) in the pressure control module:

d1) a central electronic brake control apparatus of the service brake installation is integrated, the central electronic brake control apparatus being configured such that the electronic brake control apparatus, as a function of an electric brake request signal that is present at the first electric communications port, for the first pressure control channel generates a first electric control signal, corresponding to a first nominal brake pressure, for a first electro-magnetic valve installation of the first pressure control channel; and for the second pressure control channel generates a second electric control signal, corresponding to a second nominal brake pressure, for a second electro-magnetic valve installation of the second pressure control channel that is independent of the first electromagnetic valve installation; and d2) the first electro-magnetic valve installation and the second electro-magnetic valve installation are integrated, wherein the first electro-magnetic valve installation, as a function of the first electric control signal from the reservoir pressure of the at least one compressed-air reservoir, modulates a first actual brake pressure at the first operating connector of the first pressure control channel; and the second electro-magnetic valve installation, as a function of the second electric control signal from the reservoir pressure of the at least one compressed-air reservoir, modulates a second actual brake pressure for the second operating connector of the second pressure control channel; and d3) at least one first pressure sensor and at least one second pressure sensor are integrated, wherein the first pressure sensor for a comparison with the first nominal brake pressure feeds into the central electronic brake control apparatus a first pressure measurement signal which represents the measured first actual brake pressure, and the second pressure sensor for a comparison with the second nominal brake pressure feeds into the central electronic brake control apparatus a second pressure measurement signal which represents the measured second actual brake pressure, wherein the central electronic brake control apparatus in this instance is furthermore configured such that the central electronic brake control apparatus for the first pressure control channel performs a reconciliation between the first actual brake pressure and the first nominal brake pressure, and for the second pressure control channel performs a reconciliation between the second actual brake pressure and the second nominal brake pressure and, as a function of this reconciliation, actuates the first and the second electro-magnetic valve installation so that the first nominal brake pressure is present at the first operating connector, and the second nominal brake pressure is present at the second operating connector;

wherein:

e) the central electronic brake control apparatus is furthermore configured such that the central electronic brake control apparatus, as a function of output signals of at least one inertial sensor, feeds actuating signals into the first electro-magnetic valve installation and/or into the second electro-magnetic valve installation so as to carry out braking corresponding to a driving dynamics or driving stability control system by at least one service brake cylinder; and wherein f) the central electronic brake control apparatus has a circuit board which supports electric and electronic components, wherein routines at least for the brake pressure control and for the driving dynamics control are implemented in the electric and electronic components, wherein g) the at least one inertial sensor is disposed on the circuit board and is connected in an electrically conducting manner to at least some of the electric and electronic components on the circuit board such that the output signals of the at least one inertial sensor are able to be fed into the at least some electric and electronic components for the driving dynamics control to be carried out;

wherein the pressure control module includes oscillation-decoupling means for at least partially decoupling the at least one inertial sensor from oscillations or impact sound to which the circuit board or components of the central pressure control module that are connected thereto is/are exposed during operation, wherein the oscillation-decoupling means include a decoupling portion of a circuit board body of the circuit board on which the at least one inertial sensor is held or disposed, wherein the decoupling portion by means of at least one clearance that partially or completely penetrates the circuit board body of the circuit board is separated from a remainder of the circuit board body of the circuit board with the exception of at least one circuit board bridge portion which connects, in the manner of a bridge, the decoupling portion to the remainder of the circuit board body, wherein at least one electric connection between the at least one inertial sensor and the electric and electronic components on the remainder of the circuit board body is routed along the at least one circuit board bridge portion, the electric connection directing the output signals of the at least one inertial sensor to the electric and electronic components for the driving dynamics control to be carried out, and wherein the clearance includes at least one slot in the circuit board body, the slot at least partially surrounding the decoupling portion with the exception of the at least one circuit board bridge portion.

10. An electro-pneumatic central pressure control module, comprising:

an electro-pneumatic central pressure control device having at least two-channels, embodied as a functional unit, for an electro-pneumatic service brake installation of a vehicle, having at least two pressure control channels which are electrically controllable in terms of a brake pressure;

wherein:

a) for each pressure control channel, a controlled service brake pressure for at least one service brake cylinder of the service brake installation is generated based on an operating air emanating from at least one compressed-air reservoir as a function of electric brake request signals of an electric channel of a foot brake valve; and wherein b) a first pressure control channel of the at least two electric pressure control channels that are able to be controlled as separate circuits controls a first service brake pressure in service brake cylinders on at least one first axle, and a second pressure control channel of the at least two electric pressure control channels that are able to be controlled as separate circuits controls a second service brake pressure in service brake cylinders on at least one second axle; and wherein c) the pressure control module has at least the following: at least one reservoir connector for connecting the at least one compressed-air reservoir; at least one first operating connector for connecting at least one service brake cylinder of the at least one first axle; at least one second operating connector for connecting at least one service brake cylinder of the at least one second axle; at least one first electric communications port for feeding the electric brake request signals;

and at least one ventilation; as well as at least one first voltage supply connector for supplying the pressure control module with an electric voltage; and wherein d) in the pressure control module:

d1) a central electronic brake control apparatus of the service brake installation is integrated, the central electronic brake control apparatus being configured such that the electronic brake control apparatus, as a function of an electric brake request signal that is present at the first electric communications port, for the first pressure control channel generates a first electric control signal, corresponding to a first nominal brake pressure, for a first electro-magnetic valve installation of the first pressure control channel; and for the second pressure control channel generates a second electric control signal, corresponding to a second nominal brake pressure, for a second electro-magnetic valve installation of the second pressure control channel that is independent of the first electromagnetic valve installation; and d2) the first electro-magnetic valve installation and the second electro-magnetic valve installation are integrated, wherein the first electro-magnetic valve installation, as a function of the first electric control signal from the reservoir pressure of the at least one compressed-air reservoir, modulates a first actual brake pressure at the first operating connector of the first pressure control channel; and the second electro-magnetic valve installation, as a function of the second electric control signal from the reservoir pressure of the at least one compressed-air reservoir, modulates a second actual brake pressure for the second operating connector of the second pressure control channel; and d3) at least one first pressure sensor and at least one second pressure sensor are integrated, wherein the first pressure sensor for a comparison with the first nominal brake pressure feeds into the central electronic brake control apparatus a first pressure measurement signal which represents the measured first actual brake pressure, and the second pressure sensor for a comparison with the second nominal brake pressure feeds into the central electronic brake control apparatus a second pressure measurement signal which represents the measured second actual brake pressure, wherein the central electronic brake control apparatus in this instance is furthermore configured such that the central electronic brake control apparatus for the first pressure control channel performs a reconciliation between the first actual brake pressure and the first nominal brake pressure, and for the second pressure control channel performs a reconciliation between the second actual brake pressure and the second nominal brake pressure and, as a function of this reconciliation, actuates the first and the second electro-magnetic valve installation so that the first nominal brake pressure is present at the first operating connector, and the second nominal brake pressure is present at the second operating connector;

wherein:

e) the central electronic brake control apparatus is furthermore configured such that the central electronic brake control apparatus, as a function of output signals of at least one inertial sensor, feeds actuating signals into the first electro-magnetic valve installation and/or into the second electro-magnetic valve installation so as to carry out braking corresponding to a driving dynamics or driving stability control system by at least one service brake cylinder; and wherein f) the central electronic brake control apparatus has a circuit board which supports electric and electronic components, wherein routines at least for the brake pressure control and for the driving dynamics control are implemented in the electric and electronic components, wherein g) the at least one inertial sensor is disposed on the circuit board and is connected in an electrically conducting manner to at least some of the electric and electronic components on the circuit board such that the output signals of the at least one inertial sensor are able to be fed into the at least some electric and electronic components for the driving dynamics control to be carried out;

wherein the pressure control module includes oscillation-decoupling means for at least partially decoupling the at least one inertial sensor from oscillations or impact sound to which the circuit board or components of the central pressure control module that are connected thereto is/are exposed during operation, wherein the oscillation-decoupling means include a decoupling portion of a circuit board body of the circuit board on which the at least one inertial sensor is held or disposed, wherein the decoupling portion by means of at least one clearance that partially or completely penetrates the circuit board body of the circuit board is separated from a remainder of the circuit board body of the circuit board with the exception of at least one circuit board bridge portion which connects, in the manner of a bridge, the decoupling portion to the remainder of the circuit board body, wherein at least one electric connection between the at least one inertial sensor and the electric and electronic components on the remainder of the circuit board body is routed along the at least one circuit board bridge portion, the electric connection directing the output signals of the at least one inertial sensor to the electric and electronic components for the driving dynamics control to be carried out, and wherein the at least one clearance is at least partially filled with a damping mass.

11. An electro-pneumatic central pressure control module, comprising:

an electro-pneumatic central pressure control device having at least two-channels, embodied as a functional unit, for an electro-pneumatic service brake installation of a vehicle, having at least two pressure control channels which are electrically controllable in terms of a brake pressure;

wherein:

a) for each pressure control channel, a controlled service brake pressure for at least one service brake cylinder of the service brake installation is generated based on an operating air emanating from at least one compressed-air reservoir as a function of electric brake request signals of an electric channel of a foot brake valve; and wherein b) a first pressure control channel of the at least two electric pressure control channels that are able to be controlled as separate circuits controls a first service brake pressure in service brake cylinders on at least one first axle, and a second pressure control channel of the at least two electric pressure control channels that are able to be controlled as separate circuits controls a second service brake pressure in service brake cylinders on at least one second axle; and wherein c) the pressure control module has at least the following: at least one reservoir connector for connecting the at least one compressed-air reservoir; at least one first operating connector for connecting at least one service brake cylinder of the at least one first axle; at least one second operating connector for connecting at least one service brake cylinder of the at least one second axle; at least one first electric communications port for feeding the electric brake request signals;

and at least one ventilation; as well as at least one first voltage supply connector for supplying the pressure control module with an electric voltage; and wherein d) in the pressure control module:

d1) a central electronic brake control apparatus of the service brake installation is integrated, the central electronic brake control apparatus being configured such that the electronic brake control apparatus, as a function of an electric brake request signal that is present at the first electric communications port, for the first pressure control channel generates a first electric control signal, corresponding to a first nominal brake pressure, for a first electro-magnetic valve installation of the first pressure control channel; and for the second pressure control channel generates a second electric control signal, corresponding to a second nominal brake pressure, for a second electro-magnetic valve installation of the second pressure control channel that is independent of the first electromagnetic valve installation; and d2) the first electro-magnetic valve installation and the second electro-magnetic valve installation are integrated, wherein the first electro-magnetic valve installation, as a function of the first electric control signal from the reservoir pressure of the at least one compressed-air reservoir, modulates a first actual brake pressure at the first operating connector of the first pressure control channel; and the second electro-magnetic valve installation, as a function of the second electric control signal from the reservoir pressure of the at least one compressed-air reservoir, modulates a second actual brake pressure for the second operating connector of the second pressure control channel; and d3) at least one first pressure sensor and at least one second pressure sensor are integrated, wherein the first pressure sensor for a comparison with the first nominal brake pressure feeds into the central electronic brake control apparatus a first pressure measurement signal which represents the measured first actual brake pressure, and the second pressure sensor for a comparison with the second nominal brake pressure feeds into the central electronic brake control apparatus a second pressure measurement signal which represents the measured second actual brake pressure, wherein the central electronic brake control apparatus in this instance is furthermore configured such that the central electronic brake control apparatus for the first pressure control channel performs a reconciliation between the first actual brake pressure and the first nominal brake pressure, and for the second pressure control channel performs a reconciliation between the second actual brake pressure and the second nominal brake pressure and, as a function of this reconciliation, actuates the first and the second electro-magnetic valve installation so that the first nominal brake pressure is present at the first operating connector, and the second nominal brake pressure is present at the second operating connector;

wherein:

e) the central electronic brake control apparatus is furthermore configured such that the central electronic brake control apparatus, as a function of output signals of at least one inertial sensor, feeds actuating signals into the first electro-magnetic valve installation and/or into the second electro-magnetic valve installation so as to carry out braking corresponding to a driving dynamics or driving stability control system by at least one service brake cylinder; and wherein f) the central electronic brake control apparatus has a circuit board which supports electric and electronic components, wherein routines at least for the brake pressure control and for the driving dynamics control are implemented in the electric and electronic components, wherein g) the at least one inertial sensor is disposed on the circuit board and is connected in an electrically conducting manner to at least some of the electric and electronic components on the circuit board such that the output signals of the at least one inertial sensor are able to be fed into the at least some electric and electronic components for the driving dynamics control to be carried out;

wherein the pressure control module includes oscillation-decoupling means for at least partially decoupling the at least one inertial sensor from oscillations or impact sound to which the circuit board or components of the central pressure control module that are connected thereto is/are exposed during operation, wherein the oscillation-decoupling means include a decoupling portion of a circuit board body of the circuit board on which the at least one inertial sensor is held or disposed, wherein the decoupling portion by means of at least one clearance that partially or completely penetrates the circuit board body of the circuit board is separated from a remainder of the circuit board body of the circuit board with the exception of at least one circuit board bridge portion which connects, in the manner of a bridge, the decoupling portion to the remainder of the circuit board body, wherein at least one electric connection between the at least one inertial sensor and the electric and electronic components on the remainder of the circuit board body is routed along the at least one circuit board bridge portion, the electric connection directing the output signals of the at least one inertial sensor to the electric and electronic components for the driving dynamics control to be carried out, and wherein the circuit board bridge portion at least in portions has a smaller thickness than the remainder of the circuit board body and/or the decoupling portion.

12. An electro-pneumatic central pressure control module, comprising:

an electro-pneumatic central pressure control device having at least two-channels, embodied as a functional unit, for an electro-pneumatic service brake installation of a vehicle, having at least two pressure control channels which are electrically controllable in terms of a brake pressure;

wherein:

a) for each pressure control channel, a controlled service brake pressure for at least one service brake cylinder of the service brake installation is generated based on an operating air emanating from at least one compressed-air reservoir as a function of electric brake request signals of an electric channel of a foot brake valve; and wherein b) a first pressure control channel of the at least two electric pressure control channels that are able to be controlled as separate circuits controls a first service brake pressure in service brake cylinders on at least one first axle, and a second pressure control channel of the at least two electric pressure control channels that are able to be controlled as separate circuits controls a second service brake pressure in service brake cylinders on at least one second axle; and wherein c) the pressure control module has at least the following: at least one reservoir connector for connecting the at least one compressed-air reservoir; at least one first operating connector for connecting at least one service brake cylinder of the at least one first axle; at least one second operating connector for connecting at least one service brake cylinder of the at least one second axle; at least one first electric communications port for feeding the electric brake request signals;

and at least one ventilation; as well as at least one first voltage supply connector for supplying the pressure control module with an electric voltage; and wherein d) in the pressure control module:

d1) a central electronic brake control apparatus of the service brake installation is integrated, the central electronic brake control apparatus being configured such that the electronic brake control apparatus, as a function of an electric brake request signal that is present at the first electric communications port, for the first pressure control channel generates a first electric control signal, corresponding to a first nominal brake pressure, for a first electro-magnetic valve installation of the first pressure control channel; and for the second pressure control channel generates a second electric control signal, corresponding to a second nominal brake pressure, for a second electro-magnetic valve installation of the second pressure control channel that is independent of the first electromagnetic valve installation; and d2) the first electro-magnetic valve installation and the second electro-magnetic valve installation are integrated, wherein the first electro-magnetic valve installation, as a function of the first electric control signal from the reservoir pressure of the at least one compressed-air reservoir, modulates a first actual brake pressure at the first operating connector of the first pressure control channel; and the second electro-magnetic valve installation, as a function of the second electric control signal from the reservoir pressure of the at least one compressed-air reservoir, modulates a second actual brake pressure for the second operating connector of the second pressure control channel; and d3) at least one first pressure sensor and at least one second pressure sensor are integrated, wherein the first pressure sensor for a comparison with the first nominal brake pressure feeds into the central electronic brake control apparatus a first pressure measurement signal which represents the measured first actual brake pressure, and the second pressure sensor for a comparison with the second nominal brake pressure feeds into the central electronic brake control apparatus a second pressure measurement signal which represents the measured second actual brake pressure, wherein the central electronic brake control apparatus in this instance is furthermore configured such that the central electronic brake control apparatus for the first pressure control channel performs a reconciliation between the first actual brake pressure and the first nominal brake pressure, and for the second pressure control channel performs a reconciliation between the second actual brake pressure and the second nominal brake pressure and, as a function of this reconciliation, actuates the first and the second electromagnetic valve installation so that the first nominal brake pressure is present at the first operating connector, and the second nominal brake pressure is present at the second operating connector;

wherein:

e) the central electronic brake control apparatus is furthermore configured such that the central electronic brake control apparatus, as a function of output signals of at least one inertial sensor, feeds actuating signals into the first electro-magnetic valve installation and/or into the second electro-magnetic valve installation so as to carry out braking corresponding to a driving dynamics or driving stability control system by at least one service brake cylinder; and wherein f) the central electronic brake control apparatus has a circuit board which supports electric and electronic components, wherein routines at least for the brake pressure control and for the driving dynamics control are implemented in the electric and electronic components, wherein g) the at least one inertial sensor is disposed on the circuit board and is connected in an electrically conducting manner to at least some of the electric and electronic components on the circuit board such that the output signals of the at least one inertial sensor are able to be fed into the at least some electric and electronic components for the driving dynamics control to be carried out, and wherein an electric contacting device for resiliently electrically contacting the circuit board, by way of the at least one inertial sensor or by at least one solenoid valve of the first or the second electro-magnetic valve installation, is provided, the electrical contacting device including at least one spring element which extends from the circuit board up to the at least one inertial sensor or up to the at least one solenoid valve, the circuit board and the at least one inertial sensor or the at least one solenoid valve is mounted by the spring element so as to be sprung in relation to one another in at least one degree of freedom of movement and at the same time being connected to one another in an electrically conducting manner.

13. The pressure control module of claim 12, wherein the at least one degree of freedom of movement includes a translatory and/or a rotary degree of freedom of movement.

14. The pressure control module of claim 12, wherein the at least one spring element includes a coil spring which is mounted to as to be clamped between the circuit board and the at least one inertial sensor or the at least one solenoid valve.

15. The pressure control module of claim 1, wherein at least one electro-magnetic valve of the first electro-magnetic valve installation and/or the second electro-magnetic valve installation is formed by a tilting armature valve.

16. An electro-pneumatic central pressure control module, comprising:

an electro-pneumatic central pressure control device having at least two-channels, embodied as a functional unit, for an electro-pneumatic service brake installation of a vehicle, having at least two pressure control channels which are electrically controllable in terms of a brake pressure;

wherein:

a) for each pressure control channel, a controlled service brake pressure for at least one service brake cylinder of the service brake installation is generated based on an operating air emanating from at least one compressed-air reservoir as a function of electric brake request signals of an electric channel of a foot brake valve; and wherein b) a first pressure control channel of the at least two electric pressure control channels that are able to be controlled as separate circuits controls a first service brake pressure in service brake cylinders on at least one first axle, and a second pressure control channel of the at least two electric pressure control channels that are able to be controlled as separate circuits controls a second service brake pressure in service brake cylinders on at least one second axle; and wherein c) the pressure control module has at least the following: at least one reservoir connector for connecting the at least one compressed-air reservoir; at least one first operating connector for connecting at least one service brake cylinder of the at least one first axle; at least one second operating connector for connecting at least one service brake cylinder of the at least one second axle; at least one first electric communications port for feeding the electric brake request signals;

and at least one ventilation; as well as at least one first voltage supply connector for supplying the pressure control module with an electric voltage; and wherein d) in the pressure control module:

d1) a central electronic brake control apparatus of the service brake installation is integrated, the central electronic brake control apparatus being configured such that the electronic brake control apparatus, as a function of an electric brake request signal that is present at the first electric communications port, for the first pressure control channel generates a first electric control signal, corresponding to a first nominal brake pressure, for a first electro-magnetic valve installation of the first pressure control channel; and for the second pressure control channel generates a second electric control signal, corresponding to a second nominal brake pressure, for a second electro-magnetic valve installation of the second pressure control channel that is independent of the first electromagnetic valve installation; and d2) the first electro-magnetic valve installation and the second electro-magnetic valve installation are integrated, wherein the first electro-magnetic valve installation, as a function of the first electric control signal from the reservoir pressure of the at least one compressed-air reservoir, modulates a first actual brake pressure at the first operating connector of the first pressure control channel; and the second electro-magnetic valve installation, as a function of the second electric control signal from the reservoir pressure of the at least one compressed-air reservoir, modulates a second actual brake pressure for the second operating connector of the second pressure control channel; and d3) at least one first pressure sensor and at least one second pressure sensor are integrated, wherein the first pressure sensor for a comparison with the first nominal brake pressure feeds into the central electronic brake control apparatus a first pressure measurement signal which represents the measured first actual brake pressure, and the second pressure sensor for a comparison with the second nominal brake pressure feeds into the central electronic brake control apparatus a second pressure measurement signal which represents the measured second actual brake pressure, wherein the central electronic brake control apparatus in this instance is furthermore configured such that the central electronic brake control apparatus for the first pressure control channel performs a reconciliation between the first actual brake pressure and the first nominal brake pressure, and for the second pressure control channel performs a reconciliation between the second actual brake pressure and the second nominal brake pressure and, as a function of this reconciliation, actuates the first and the second electro-magnetic valve installation so that the first nominal brake pressure is present at the first operating connector, and the second nominal brake pressure is present at the second operating connector;

wherein:

e) the central electronic brake control apparatus is furthermore configured such that the central electronic brake control apparatus, as a function of output signals of at least one inertial sensor, feeds actuating signals into the first electro-magnetic valve installation and/or into the second electro-magnetic valve installation so as to carry out braking corresponding to a driving dynamics or driving stability control system by at least one service brake cylinder; and wherein f) the central electronic brake control apparatus has a circuit board which supports electric and electronic components, wherein routines at least for the brake pressure control and for the driving dynamics control are implemented in the electric and electronic components, wherein g) the at least one inertial sensor is disposed on the circuit board and is connected in an electrically conducting manner to at least some of the electric and electronic components on the circuit board such that the output signals of the at least one inertial sensor are able to be fed into the at least some electric and electronic components for the driving dynamics control to be carried out;

wherein at least one electro-magnetic valve of the first electro-magnetic valve installation and/or the second electro-magnetic valve installation is formed by a tilting armature valve, and wherein the tilting armature valve includes:

a) a half shell;

b) a cover element which covers the half shell in a fluid-tight manner so as to form a valve chamber, wherein the cover element has at least one control aperture and a passage for directing a fluid through the valve chamber;

c) a magnetically conducting tilting armature having at least one sealing element, wherein the tilting armature in the valve chamber is mounted so as to be movable between an opening position and a closing position, wherein the sealing element in the closing position closes the control aperture in a fluid-tight manner and in the opening position releases the latter; and d) a coil installation which is disposed on a base of the half shell that is outside the valve chamber and opposite the cover element and is configured so as to move the tilting armature between the opening position and the closing position;

wherein e) the coil installation has a magnetically conducting coil core and at least one coil that is wound about the coil core, wherein the coil core in the longitudinal direction is disposed so as to be substantially parallel to the base.

17. The pressure control module of claim 16, wherein at least one damper element which is disposed on a side of the tilting armature that faces the base or on a side of the base that faces the tiling armature so as to attenuate a mechanical oscillation, which is a vibration and/or a shock and/or an impact, of the tilting armature when the tilting armature moves to the opening position thereof, wherein the damper element is fastened to the tilting armature or to the base while using an adhesive material.

18. The pressure control module of claim 1, wherein the pressure control module has at least one second electric voltage supply connector for supplying an electric voltage to at least one further pressure control module and at least one second communications port for communicating with the at least one further pressure control module, wherein a) the at least one further pressure control module controls in a self-acting manner the brake pressure in connected service brake cylinders of at least one further axle, and wherein b) the central electronic brake control apparatus of the service brake installation, as a function of the electric brake request signals which are present at the first communications port feeds into the second communications port at least one third electric control signal, corresponding to a nominal brake pressure for the at least one further axle for the at least one further pressure control module so that the further pressure control module adjusts the brake pressure in at least one service brake cylinder connected thereto.

19. The pressure control module of claim 1, wherein the pressure control module has the at least one third electric voltage supply connector for supplying a voltage to at least one trailer control module, and at least one third communications port for communicating with the at least one trailer control module, wherein a) the at least one trailer control module with integrated electronic trailer brake control electronics controls the brake pressure in service brake cylinders of a trailer, and wherein b) the central electronic brake control apparatus of the service brake installation, as a function of the electric brake request signals which are present at the first electric communications port, feeds into the third communications port a fourth electric control signal, corresponding to a nominal brake pressure, for the at least one trailer control module so as to control the brake pressure in service brake cylinders of the trailer that are connected to the at least one trailer control module.

20. The pressure control module of claim 1, wherein the pressure control module has at least one control connector for solenoid valves of the at least one trailer control module, and at least one sensor connector for at least one pressure sensor of the at least one trailer control module, wherein the central electronic brake control apparatus feeds a fourth electric control signal into the control connector for the solenoid valves of the at least one trailer control module so as to control the brake pressure in service brake cylinders of a trailer.

21. The pressure control module of claim 1, wherein the inertial sensor includes at least one of the following sensors: an acceleration sensor which measures the acceleration in one axis, in two, or in three axes, and/or a yaw rate sensor.

22. The pressure control module of claim 1, wherein the pressure control module has at least one vehicle data bus port for connecting to a vehicle data bus.

23. The pressure control module of claim 1, wherein the pressure control module has output stages for ABS pressure control valves that are provided for being disposed between the first operating connector of the first axle and the service brake cylinders of the first axle, and between the second operating connector of the second axle and the service brake cylinders of the second axle, wherein routines are implemented in the central electronic brake control apparatus, by which routines control signals for the ABS pressure control valves are emitted and by which, based on the service brake pressures which are controlled in an axle-wise manner in the pressure control channels of the first axle and of the second axle, service brake pressures which are individual for each wheel on the first axle and on the second axle are in each case generated with the ABS pressure control valves, for carrying out the driving dynamics control.

24. The pressure control module of claim 1, wherein the first electro-magnetic valve installation and the second electro-magnetic valve installation have in each case one relay valve installation which is pneumatically controlled by an electro-magnetic inlet/outlet valve combination, wherein the relay valve installations on the output side are controlled by the first and second operating connectors, and the electro-magnetic inlet/outlet valve combinations are controlled by the central electronic brake control apparatus.

25. The pressure control module of claim 1, wherein the pressure control module has inputs for wheel rotating speed sensors of the wheels of the vehicle, and/or for brake wear sensors.

26. An electro-pneumatic service brake installation of a vehicle, comprising:

at least two electric pressure control channels that are controllable as separate circuits, including a central pressure control module;

wherein the electro-pneumatic central pressure control module, includes:

an electro-pneumatic central pressure control device having at least two-channels, embodied as a functional unit, for an electro-pneumatic service brake installation of a vehicle, having at least two pressure control channels which are electrically controllable in terms of a brake pressure;

wherein:

a) for each pressure control channel, a controlled service brake pressure for at least one service brake cylinder of the service brake installation is generated based on an operating air emanating from at least one compressed-air reservoir as a function of electric brake request signals of an electric channel of a foot brake valve; and wherein b) a first pressure control channel of the at least two electric pressure control channels that are able to be controlled as separate circuits controls a first service brake pressure in service brake cylinders on at least one first axle, and a second pressure control channel of the at least two electric pressure control channels that are able to be controlled as separate circuits controls a second service brake pressure in service brake cylinders on at least one second axle; and wherein c) the pressure control module has at least the following: at least one reservoir connector for connecting the at least one compressed-air reservoir; at least one first operating connector for connecting at least one service brake cylinder of the at least one first axle; at least one second operating connector for connecting at least one service brake cylinder of the at least one second axle; at least one first electric communications port for feeding the electric brake request signals;

and at least one ventilation; as well as at least one first voltage supply connector for supplying the pressure control module with an electric voltage; and wherein d) in the pressure control module:

d1) a central electronic brake control apparatus of the service brake installation is integrated, the central electronic brake control apparatus being configured such that the electronic brake control apparatus, as a function of an electric brake request signal that is present at the first electric communications port, for the first pressure control channel generates a first electric control signal, corresponding to a first nominal brake pressure, for a first electro-magnetic valve installation of the first pressure control channel; and for the second pressure control channel generates a second electric control signal, corresponding to a second nominal brake pressure, for a second electro-magnetic valve installation of the second pressure control channel that is independent of the first electromagnetic valve installation; and d2) the first electro-magnetic valve installation and the second electro-magnetic valve installation are integrated, wherein the first electro-magnetic valve installation, as a function of the first electric control signal from the reservoir pressure of the at least one compressed-air reservoir, modulates a first actual brake pressure at the first operating connector of the first pressure control channel; and the second electro-magnetic valve installation, as a function of the second electric control signal from the reservoir pressure of the at least one compressed-air reservoir, modulates a second actual brake pressure for the second operating connector of the second pressure control channel; and d3) at least one first pressure sensor and at least one second pressure sensor are integrated, wherein the first pressure sensor for a comparison with the first nominal brake pressure feeds into the central electronic brake control apparatus a first pressure measurement signal which represents the measured first actual brake pressure, and the second pressure sensor for a comparison with the second nominal brake pressure feeds into the central electronic brake control apparatus a second pressure measurement signal which represents the measured second actual brake pressure, wherein the central electronic brake control apparatus in this instance is furthermore configured such that the central electronic brake control apparatus for the first pressure control channel performs a reconciliation between the first actual brake pressure and the first nominal brake pressure, and for the second pressure control channel performs a reconciliation between the second actual brake pressure and the second nominal brake pressure and, as a function of this reconciliation, actuates the first and the second electromagnetic valve installation so that the first nominal brake pressure is present at the first operating connector, and the second nominal brake pressure is present at the second operating connector;

wherein:

e) the central electronic brake control apparatus is furthermore configured such that the central electronic brake control apparatus, as a function of output signals of at least one inertial sensor, feeds actuating signals into the first electro-magnetic valve installation and/or into the second electro-magnetic valve installation so as to carry out braking corresponding to a driving dynamics or driving stability control system by at least one service brake cylinder; and wherein f) the central electronic brake control apparatus has a circuit board which supports electric and electronic components, wherein routines at least for the brake pressure control and for the driving dynamics control are implemented in the electric and electronic components, wherein g) the at least one inertial sensor is disposed on the circuit board and is connected in an electrically conducting manner to at least some of the electric and electronic components on the circuit board such that the output signals of the at least one inertial sensor are able to be fed into the at least some electric and electronic components for the driving dynamics control to be carried out, and wherein h) the pressure control module has at least one third electric voltage supply connector for supplying a voltage to at least one trailer control module, and at least one third communications port for communicating with the at least one trailer control module, wherein the at least one trailer control module, with the aid of integrated electronic trailer brake control electronics, controls the brake pressure in service brake cylinders of a trailer, and wherein the central electronic brake control apparatus of the service brake installation, as a function of the electric brake request signals which are present at the first electric communications port, feeds into the at least one third communications port a fourth electric control signal, corresponding to a nominal brake pressure, for the at least one trailer control module so as to control the brake pressure in the service brake cylinders of the trailer that are connected to the at least one trailer control module.

27. The service brake installation of claim 26, wherein an electric channel of a foot brake valve is connected to the at least one first communications port of the central pressure control module.

28. The service brake installation of claim 26, wherein a control apparatus of a system for at least partially autonomous driving is connected to the at least one first communications port of the central pressure control module, wherein the control apparatus, by the at least one first communications port, feeds brake request signals into the central pressure control module.

29. The service brake installation of claim 26, wherein the at least one further pressure control module is connected to the second communications port of the central pressure control module, wherein the at least one further pressure control module is one of the following pressure control modules: a 1-channel pressure control module which adjusts the same brake pressure on wheels on different sides of at least one axle; a 2-channel pressure control module which on wheels on different sides of at least one axle adjusts an individual brake pressure on each side.

30. The service brake installation of claim 29, wherein the at least one further pressure control module controls in a self-acting manner the brake pressure in connected service brake cylinders of the at least one further axle, wherein the central electronic brake control apparatus of the service brake installation, as a function of the electric brake request signals present at the first communications port, feeds into the second communications port the at least one third electric control signal, corresponding to the nominal brake pressure for the at least one further axle, for the at least one further pressure control module so that the further pressure control module adjusts the brake pressure in the connected service brake cylinders.

31. The service brake installation of claim 26, wherein the at least one trailer control module which with electronic integrated trailer control electronics controls the brake pressure in service brake cylinders of a trailer is connected to the third communications port of the central pressure control module.

32. The service brake installation of claim 26, wherein at least one first compressed-air reservoir is connected to the first reservoir pressure connector of the central pressure control module, and at least one second compressed-air reservoir, which is separate in terms of the first compressed-air reservoir, is connected to the second reservoir pressure connector of the central pressure control module.

33. A vehicle, comprising:
an electro-pneumatic service brake installation, including:

at least two electric pressure control channels that are controllable as separate circuits, including a central pressure control module;
wherein the electro-pneumatic central pressure control module, includes:
an electro-pneumatic central pressure control device having at least two-channels, embodied as a functional unit, for an electro-pneumatic service brake installation of a vehicle, having at least two pressure control channels which are electrically controllable in terms of a brake pressure;
wherein:
a) for each pressure control channel, a controlled service brake pressure for at least one service brake cylinder of the service brake installation is generated based on an operating air emanating from at least one compressed-air reservoir as a function of electric brake request signals of an electric channel of a foot brake valve; and wherein
b) a first pressure control channel of the at least two electric pressure control channels that are able to be controlled as separate circuits controls a first service brake pressure in service brake cylinders on at least one first axle, and a second pressure control channel of the at least two electric pressure control channels that are able to be controlled as separate circuits controls a second service brake pressure in service brake cylinders on at least one second axle; and wherein
c) the pressure control module has at least the following: at least one reservoir connector for connecting the at least one compressed-air reservoir; at least one first operating connector for connecting at least one service brake cylinder of the at least one first axle; at least one second operating connector for connecting at least one service brake cylinder of the at least one second axle; at least one first electric communications port for feeding the electric brake request signals;
and at least one ventilation; as well as at least one first voltage supply connector for supplying the pressure control module with an electric voltage; and wherein
d) in the pressure control module:
d1) a central electronic brake control apparatus of the service brake installation is integrated, the central electronic brake control apparatus being configured such that the electronic brake control apparatus, as a function of an electric brake request signal that is present at the first electric communications port, for the first pressure control channel generates a first electric control signal, corresponding to a first nominal brake pressure, for a first electro-magnetic valve installation of the first pressure control channel; and for the second pressure control channel generates a second electric control signal, corresponding to a second nominal brake pressure, for a second electro-magnetic valve installation of the second pressure control channel that is independent of the first electromagnetic valve installation; and
d2) the first electro-magnetic valve installation and the second electro-magnetic valve installation are integrated, wherein the first electro-magnetic valve installation, as a function of the first electric control signal from the reservoir pressure of the at least one compressed-air reservoir, modulates a first actual brake pressure at the first operating connector of the first pressure control channel; and the second electro-magnetic valve installation, as a function of the second electric control signal from the reservoir pressure of the at least one compressed-air reservoir, modulates a second actual brake pressure for the second operating connector of the second pressure control channel; and d3) at least one first pressure sensor and at least one second pressure sensor are integrated, wherein the first pressure sensor for a comparison with the first nominal brake pressure feeds into the central electronic brake control apparatus a first pressure measurement signal which represents the measured first actual brake pressure, and the second pressure sensor for a comparison with the second nominal brake pressure feeds into the central electronic brake control apparatus a second pressure measurement signal which represents the measured second actual brake pressure, wherein the central electronic brake control apparatus in this instance is furthermore configured such that the central electronic brake control apparatus for the first pressure control channel performs a reconciliation between the first actual brake pressure and the first nominal brake pressure, and for the second pressure control channel performs a reconciliation between the second actual brake pressure and the second nominal brake pressure and, as a function of this reconciliation, actuates the first and the second electro-magnetic valve installation so that the first nominal brake pressure is present at the first operating connector, and the second nominal brake pressure is present at the second operating connector;

wherein:

e) the central electronic brake control apparatus is furthermore configured such that the central electronic brake control apparatus, as a function of output signals of at least one inertial sensor, feeds actuating signals into the first electro-magnetic valve installation and/or into the second electro-magnetic valve installation so as to carry out braking corresponding to a driving dynamics or driving stability control system by at least one service brake cylinder; and wherein f) the central electronic brake control apparatus has a circuit board which supports electric and electronic components, wherein routines at least for the brake pressure control and for the driving dynamics control are implemented in the electric and electronic components, wherein g) the at least one inertial sensor is disposed on the circuit board and is connected in an electrically conducting manner to at least some of the electric and electronic components on the circuit board such that the output signals of the at least one inertial sensor are able to be fed into the at least some electric and electronic components for the driving dynamics control to be carried out, and wherein h) the pressure control module has at least one third electric voltage supply connector for supplying a voltage to at least one trailer control module, and at least one third communications port for communicating with the at least one trailer control module, wherein the at least one trailer control module, with the aid of integrated electronic trailer brake control electronics, controls the brake pressure in service brake cylinders of a trailer, and wherein the central electronic brake control apparatus of the service brake installation, as a function of the electric brake request signals which are present at the first electric communications port, feeds into the at least one third communications port a fourth electric control signal, corresponding to a nominal brake pressure, for the at least one trailer control module so as to control the brake pressure in the service brake cylinders of the trailer that are connected to the at least one trailer control module.

34. The pressure control module of claim 1, wherein:

i) the pressure control module has at least one control connector for solenoid valves of the at least one trailer control module, and at least one sensor connector for at least one pressure sensor of the at least one trailer control module, wherein the central electronic brake control apparatus feeds a fourth electric control signal into the control connector for the solenoid valves of the at least one trailer control module so as to control the brake pressure in service brake cylinders of a trailer.

* * * * *